(12) United States Patent
Neeter

(10) Patent No.: US 10,977,868 B2
(45) Date of Patent: Apr. 13, 2021

(54) REMOTE COLLABORATION METHODS AND SYSTEMS

(71) Applicant: FactualVR, Inc., Jersey City, NJ (US)

(72) Inventor: Eduardo J. Neeter, Jersey City, NJ (US)

(*) Notice: Subject to any disclaimer, the term of this patent is extended or adjusted under 35 U.S.C. 154(b) by 0 days.

(21) Appl. No.: 16/458,037

(22) Filed: Jun. 29, 2019

(65) Prior Publication Data

US 2020/0005538 A1    Jan. 2, 2020

Related U.S. Application Data

(60) Provisional application No. 62/691,888, filed on Jun. 29, 2018.

(51) Int. Cl.
*G06T 19/00* (2011.01)
*H04L 29/06* (2006.01)
(Continued)

(52) U.S. Cl.
CPC .......... *G06T 19/006* (2013.01); *G06F 3/011* (2013.01); *G06K 9/00624* (2013.01);
(Continued)

(58) Field of Classification Search
CPC ..... G06T 19/006; G06T 19/003; G06T 19/20; G06T 2219/2004; G06T 7/33; G06T 7/70;
(Continued)

(56) References Cited

U.S. PATENT DOCUMENTS

| | | | |
|---|---|---|---|
| 2008/0244418 A1* | 10/2008 | Manolescu | G06Q 10/00 715/753 |
| 2013/0063487 A1* | 3/2013 | Spiegel | G06Q 30/02 345/633 |

(Continued)

*Primary Examiner* — Daniel F Hajnik
(74) *Attorney, Agent, or Firm* — McCarter & English, LLP

(57) ABSTRACT

Apparatus and associated methods relate to immersive collaboration based on configuring a real scene VRE operable from a real scene and a remote VRE operable remote from the real scene with an MR scene model of the real scene, creating an MR scene in each of the real scene VRE and remote VRE based on augmenting the MR scene model with an object model, calibrating the remote MR scene to correspond in three-dimensional space with the real scene MR scene model, and automatically providing immersive collaboration based on the MR scene in the remote VRE and updating the real scene VRE with changes to the remote VRE. In an illustrative example, the MR scene model of the real scene may be determined as a function of sensor data scanned from the real scene. In some embodiments, the MR scene model may be augmented with an object model identified from the real scene. The object model identified from the real scene may be, for example, selected from a known object set based on matching sensor data scanned from the real scene with an object from a known object set. In some embodiments, the remote MR scene may be calibrated based on applying a three-dimensional transform calculated as a function of the real MR scene and remote MR scene geometries. Some designs may recreate a subset of the real scene in the remote VRE and update the real scene VRE with changes to the remote VRE. Various embodiments may (Continued)

advantageously provide seamless multimedia collaboration based on updates to the remote VRE in response to physical changes to the real scene, and updating the real scene VRE in response to changes in the remote VRE.

20 Claims, 56 Drawing Sheets

(51) Int. Cl.
    *G06K 9/00*     (2006.01)
    *G06T 19/20*     (2011.01)
    *G06T 7/73*     (2017.01)
    *G06F 3/01*     (2006.01)
    *G06T 7/33*     (2017.01)
    *G06T 7/70*     (2017.01)
    *G06K 9/62*     (2006.01)

(52) U.S. Cl.
    CPC .............. *G06K 9/6201* (2013.01); *G06T 7/33* (2017.01); *G06T 7/70* (2017.01); *G06T 7/73* (2017.01); *G06T 19/003* (2013.01); *G06T 19/20* (2013.01); *H04L 65/403* (2013.01); *H04L 65/4015* (2013.01); *G06T 2219/2004* (2013.01)

(58) Field of Classification Search
    CPC .. G06T 7/73; G06K 9/00671; G06K 9/00624; G06K 9/6201; G06F 3/011; H04L 65/4015; H04L 65/403
    See application file for complete search history.

(56) References Cited

U.S. PATENT DOCUMENTS

| | | | |
|---|---|---|---|
| 2014/0118339 A1* | 5/2014 | Davies | G06T 15/10 345/419 |
| 2015/0016714 A1* | 1/2015 | Chui | G06K 9/72 382/154 |
| 2016/0092732 A1* | 3/2016 | Black | G06T 11/60 382/103 |
| 2016/0350595 A1* | 12/2016 | Solomin | G06K 9/6263 |
| 2018/0018805 A1* | 1/2018 | Kutliroff | G06T 7/90 |
| 2018/0324229 A1* | 11/2018 | Ross | G06T 19/006 |
| 2019/0108683 A1* | 4/2019 | Valli | G06T 15/20 |

* cited by examiner

300

500

705

710

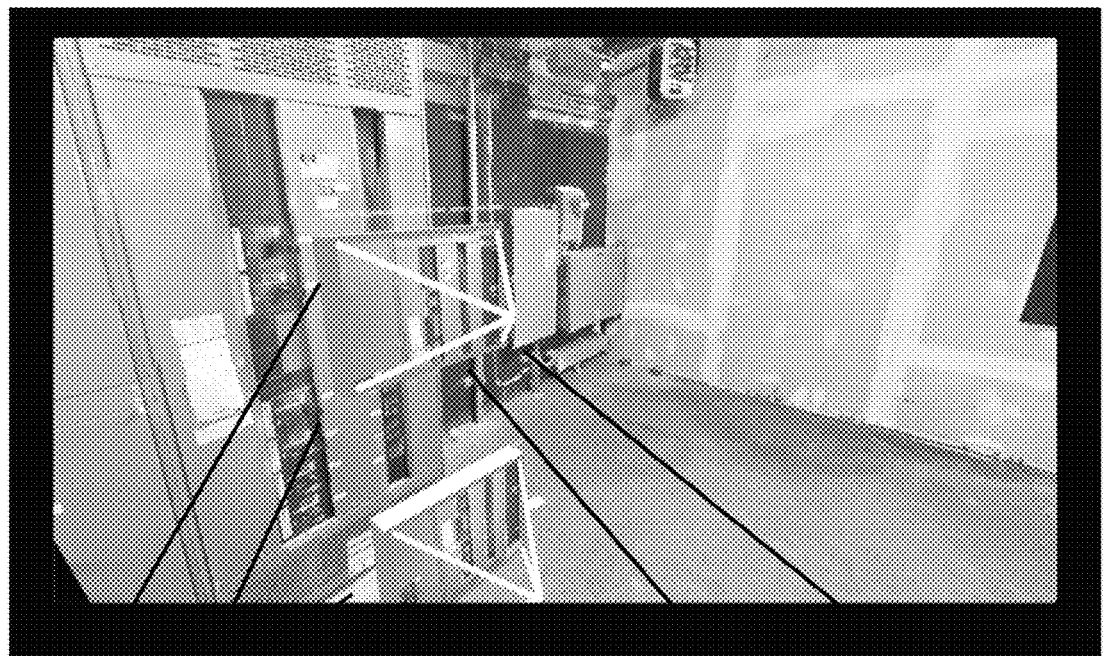
810  805  FIG. 8  815  820
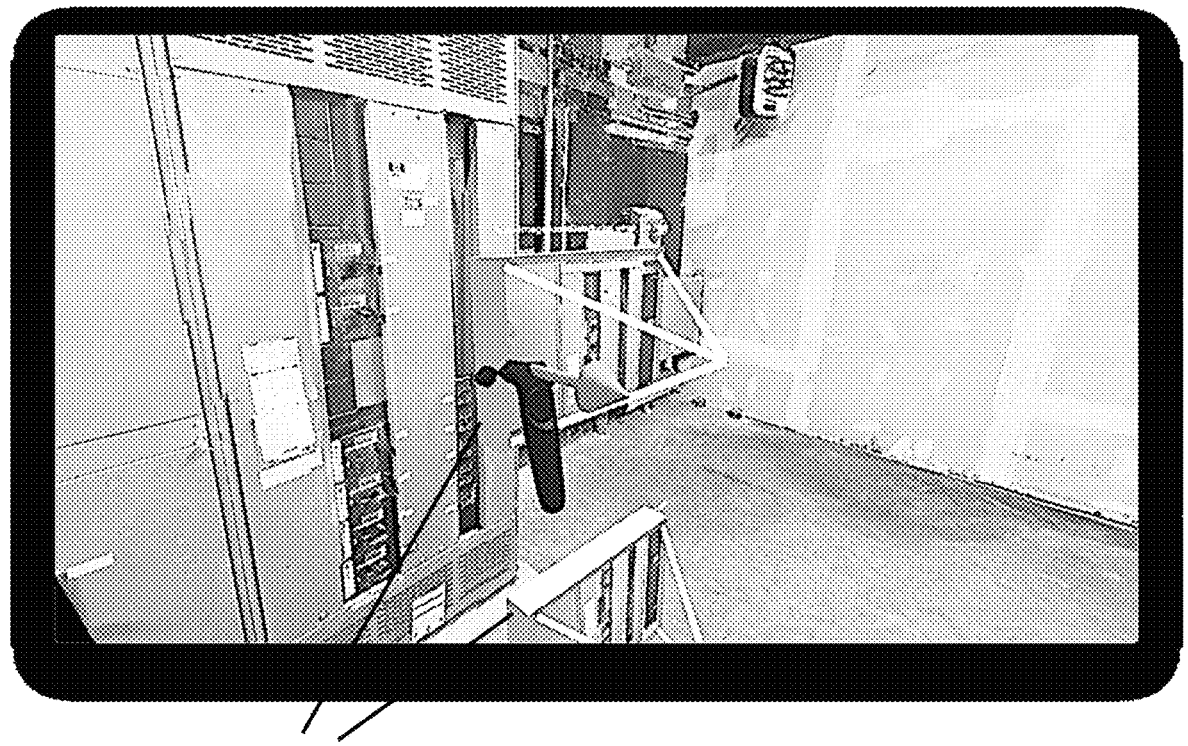
805  FIG. 9A

805  FIG. 9D
FIG. 9E
805

1005    FIG. 10A    1010
1005    1010    FIG. 10B

REMOTE COLLABORATION METHODS AND SYSTEMS

CROSS-REFERENCE TO RELATED APPLICATIONS

This application claims the benefit of U.S. Provisional Application No. 62/691,888, titled "Systems and Methods for a Mixed Reality Remote Collaboration System," filed by Applicant: Eduardo Neeter, Inventor: Eduardo Neeter, on 29 Jun. 2018.

This application incorporates the entire contents of the above-referenced application herein by reference.

GOVERNMENT LICENSE RIGHTS

This invention was made with government support under DE-SC0018732 awarded by Department of Energy, United States of America. The government has certain rights in the invention.

TECHNICAL FIELD

Various embodiments relate generally to remote collaboration.

BACKGROUND

Virtual reality is a simulated experience. In some scenarios, virtual reality may simulate a scene. In various examples, a scene simulated using virtual reality may be based on a digital model of the scene. Some virtual reality scene models may represent artificial scenes that cannot physically exist. In various examples, a virtual reality scene model may represent a real scene that exists in the physical world. In an illustrative example, a Virtual Reality Environment (VRE) may be configured with a virtual reality scene model. For example, a VRE configured with a virtual reality scene model may simulate the scene based on the virtual reality scene model.

Some VRE simulations may facilitate an immersive user experience in a simulated scene created in a VRE. In some scenarios, a user may desire an experience that may be prohibitively costly, or dangerous. Some experiences may require substantial skill to enjoy or perform effectively. For example, a user may desire to climb a mountain, or repair electrical equipment. In an illustrative example, a VRE simulating malfunctioning electrical equipment could be configured to provide the user with training to repair the electrical equipment.

Some VRE experiences may include subsets of real and virtual scenes. In an illustrative example, a virtual reality model of a real scene may be augmented with a virtual reality model of an artificial object to create a Mixed Reality (MR) model of the scene. In some examples, an MR scene model may include a scanned virtual model of a real object located outside the scene. In various scenarios, multiple users located in different physical locations may desire to jointly experience an MR scene in a VRE configured in each user's physical environment. Each user may be required to periodically adjust their VRE to spatially correspond with the joint MR scene.

SUMMARY

Apparatus and associated methods relate to immersive collaboration based on configuring a real scene VRE operable from a real scene and a remote VRE operable remote from the real scene with an MR scene model of the real scene, creating an MR scene in each of thereal scene VRE and remote VRE based on augmenting the MR scene model with an object model, calibrating the remote MR scene to correspond in three-dimensional space with the real scene MR scene model, and automatically providing immersive collaboration based on the MR scene in the remote VRE and updating the real scene VRE with changes to the remote VRE. In an illustrative example, the MR scene model of the real scene may be determined as a function of sensor data scanned from the real scene. In some embodiments, the MR scene model may be augmented with an object model identified from the real scene. The object model identified from the real scene may be, for example, selected from a known object set based on matching sensor data scanned from the real scene with an object from a known object set. In some embodiments, the remote MR scene may be calibrated based on applying a three-dimensional transform calculated as a function of the real MR scene and remote MR scene geometries. Some designs may recreate a subset of the real scene in the remote VRE and update the real scene VRE with changes to the remote VRE. Various embodiments may advantageously provide seamless multimedia collaboration based on updates to the remote VRE in response to physical changes to the real scene, and updating the real scene VRE in response to changes in the remote VRE.

Various embodiments may achieve one or more advantages. For example, some embodiments may improve a user's ease of access to remote collaboration. This facilitation may be a result of reducing the user's effort scanning and digitizing a remote scene, and configuring a scene model in a distant user's VRE based on transmitting the scanned remote scene. In some embodiments, a real scene may be automatically recreated in a VRE remote from the real scene. Such automatic scene recreation may be a result of rendering a 3D scene model in a remote VRE as a triangular mesh connecting reconstructed 3D points. Such automatic rendering of a 3D scene model in a remote VRE may improve a user's immersive experience in the user's VRE as aresult of continuously updating a texture-mapped triangular mesh rendering of the 3D real scene model in the remote user's VRE. Some embodiments may identify and match a particular object selected from a real scene against a set of known objects related to the real scene. Such object identification based on matching real scene objects with known objects may improve the accuracy of a user's experience in a VRE simulating a real scene. For example, an object encountered in a real scene may be identified as known equipment, permitting 3D object model retrieval from a CAD model database to improve the accuracy of object identification and enhance the usefulness of the user's VRE experience.

In some embodiments, the quality of collaboration between VRE users remotely sharing MR scene models may be improved. This facilitation may be a result of reducing each user's effort required to configure the user's VRE for accurate collaboration, based on automatically calibrating an MR scene so that a remote MR scene model corresponds in three-dimensional space with a real scene MR model. Various implementations may improve a remote user's experience interacting with a real scene recreated in the remote user's VRE. Such improved user interaction experience may be a result of configuring the remote user's VRE with an Apex picture representing an object from the real scene. In an illustrative example, an Apex picture maintains its position androtation within the 3D scene, increasing a user's understanding of and quality of interaction with the object. Some embodiments may enhance a user's flexibility in the use of VRE collaboration. This facilitation may be a result of a remote collaboration method including Enactment recording and playback. For example, in various designs, a user may record an Enactment simulating interaction with a scene in motion as a function of time, add selected objects to the Enactment at arbitrary points on an Enactment timeline, and play back the Enactment in a VRE configured to permit another user interaction in a VRE configured with the recorded Enactment.

The details of various embodiments are set forth in the accompanying drawings and the description below. Other features and advantages will be apparent from the description and drawings, and from the claims.

BRIEF DESCRIPTION OF THE DRAWINGS

FIG. 8 depicts an exemplary Apex Picture, illustrating an embodiment model of image sensor data in a 3D scene.

FIGS. 9A-9E together depict exemplary scenarios illustrative of the design and usage of various Apex Picture designs in accordance with various embodiments of the present disclosure.

FIGS. 10A-10D together depict exemplary Voice Memo scenarios illustrative of the design and usage of audio sensor data in a 3D scene in accordance with various embodiments of the present disclosure.

Like reference symbols in the various drawings indicate like elements.

DETAILED DESCRIPTION OF ILLUSTRATIVE EMBODIMENTS

To aid understanding, this document is organized as follows. First, exemplary remote collaboration methods are briefly introduced with reference to FIGS. 1-2. Second, with reference to FIGS. 3-6, the discussion turns to introducing exemplary embodiments directed to remote collaboration. Specifically, exemplary scanning, sharing, matching, and calibration embodiment techniques are introduced. Then, with reference to FIG. 7, an illustrative example of using world coordinates to compose a shared environment is described. Then, with reference to FIGS. 8-10, design and use of object models determined as a function of the three-dimensional position and orientation in an MR scene are disclosed. Then, with reference to FIGS. 11-16, exemplary enactment methods are presented. Specifically, methods to record, playback, and edit an enactment are disclosed. Then, with reference to FIGS. 17-24, exemplary object recognition and scene augmentation embodiments are presented. Finally, with reference to FIGS. 25-31, exemplary embodiment remote collaboration hardware, network, and process designs are disclosed.

Figure 1:
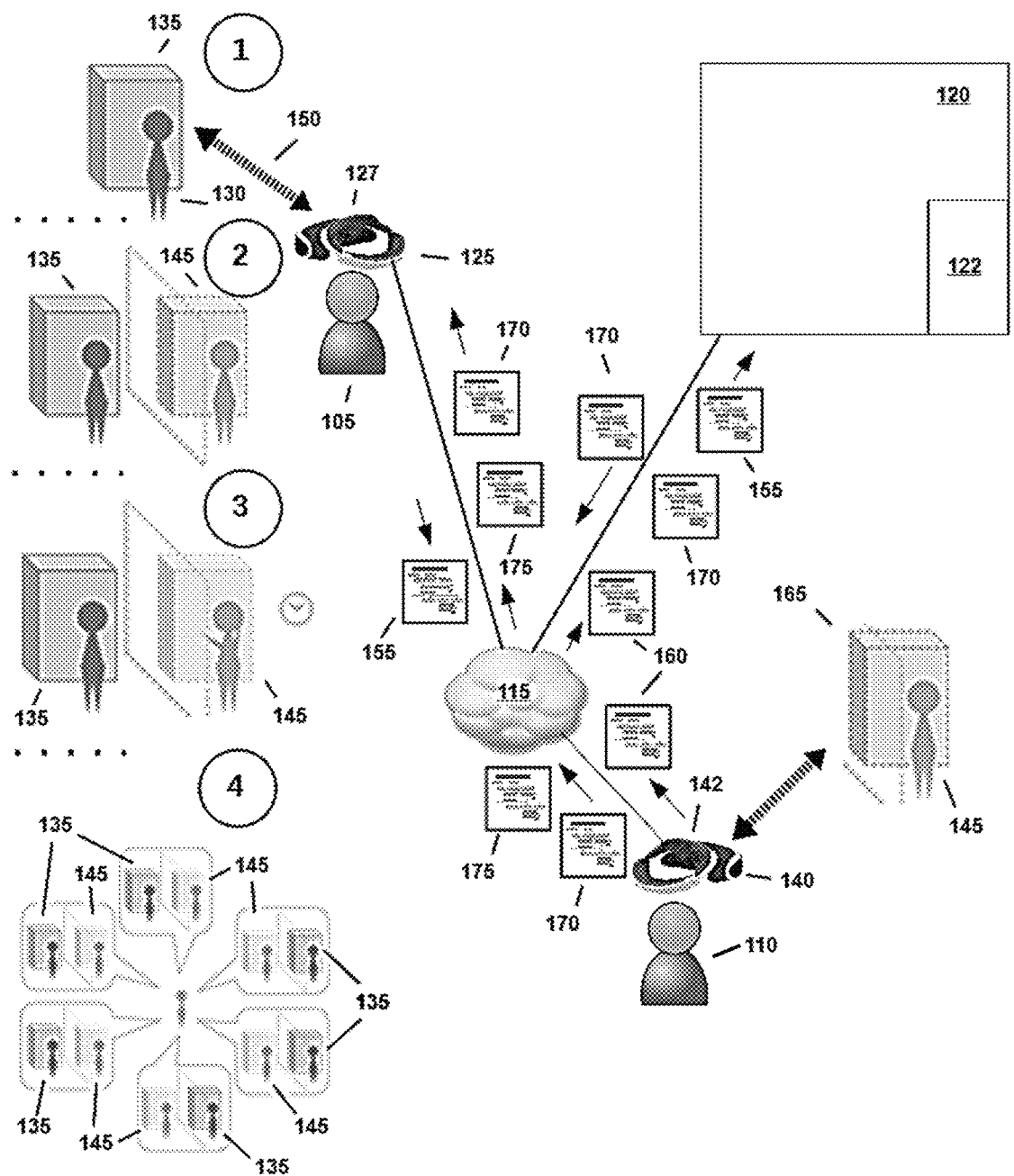
FIG. 1 depicts an illustrative operational scenario wherein an expert worker collaborates with a remote novice worker using an exemplary collaboration system configured to provide immersive collaboration based on configuring a real scene VRE operable from a real scene and a remote VRE operable remote from the real scene with an MR scene model of the real scene, creating an MR scene in each of the real scene VRE and remote VRE based on augmenting the MR scene model with an object model, calibrating the remote MR scene to correspond in three-dimensional space with the real scene MR scene model, and automatically providing immersive collaboration based on the MR scene in the remote VRE and updating the real scene VRE with changes to the remote VRE.
Figure 2A:
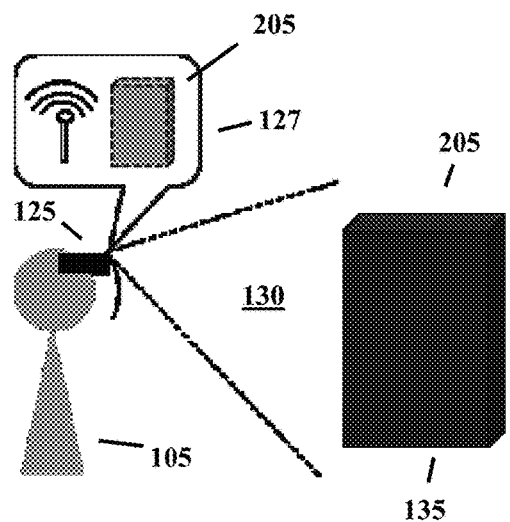
FIGS. 2A-2G together depict detail views of illustrative phases of an operational scenario wherein an expert worker collaborates with a remote novice worker using an exemplary collaboration system configured to provide immersive collaboration based on configuring a real scene VRE operable from a real scene and a remote VRE operable remote from the real scene with an MR scene model of the real scene, creating an MR scene in each of the real scene VRE and remote VRE based on augmenting the MR scene model with an object model, calibrating the remote MR scene to correspond in three-dimensional space with the real scene MR scene model, and automatically providing immersive collaboration based on the MR scene in the remote VRE and updating the real scene VRE with changes to the remote VRE.
Figure 2B:
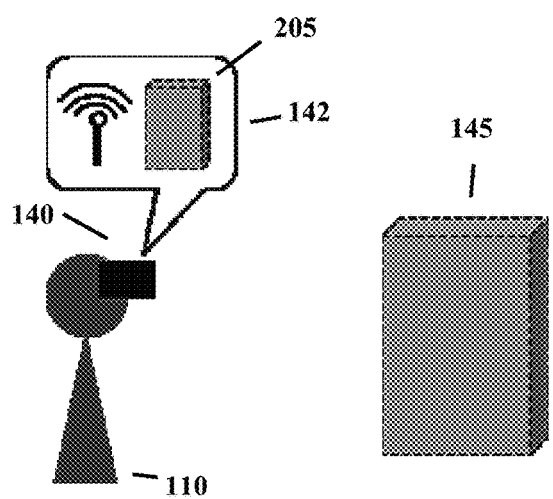
Figure 2C:
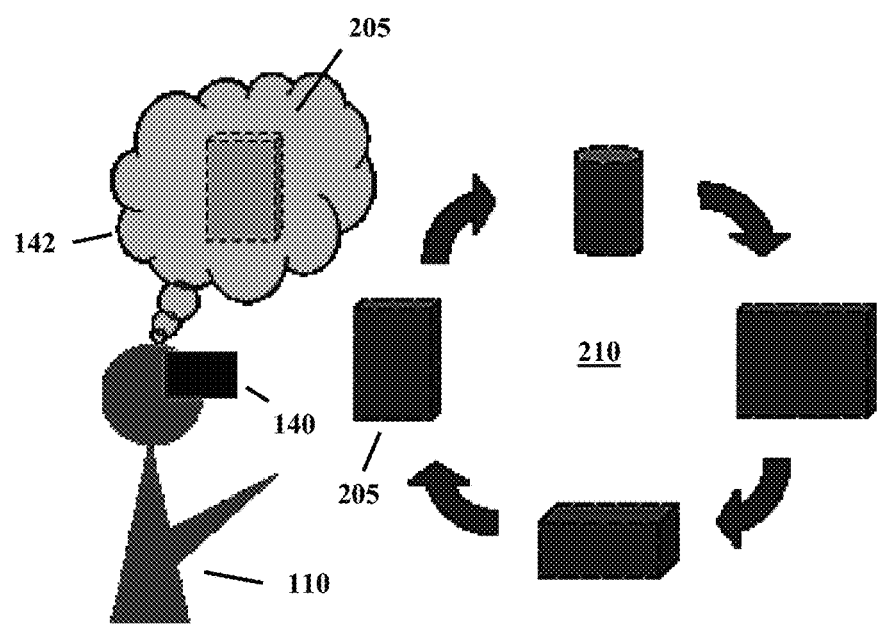
Figure 2D:
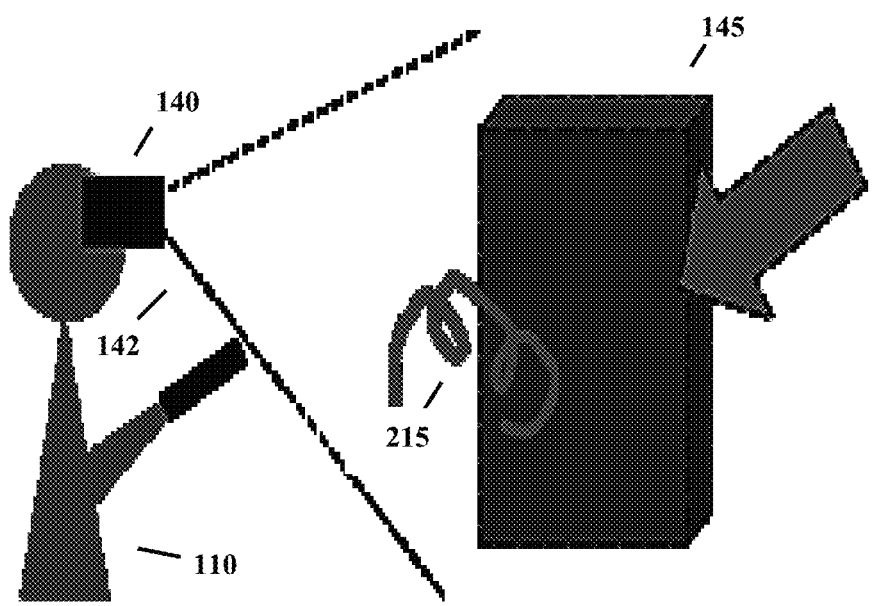
Figure 2E:
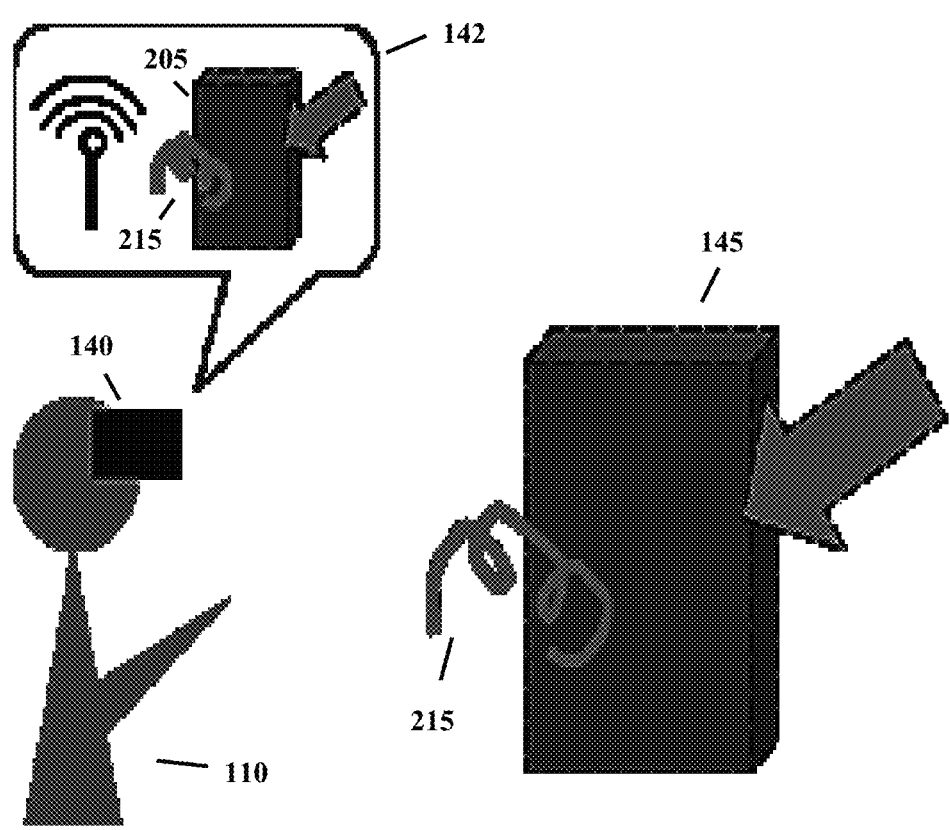
Figure 2F:
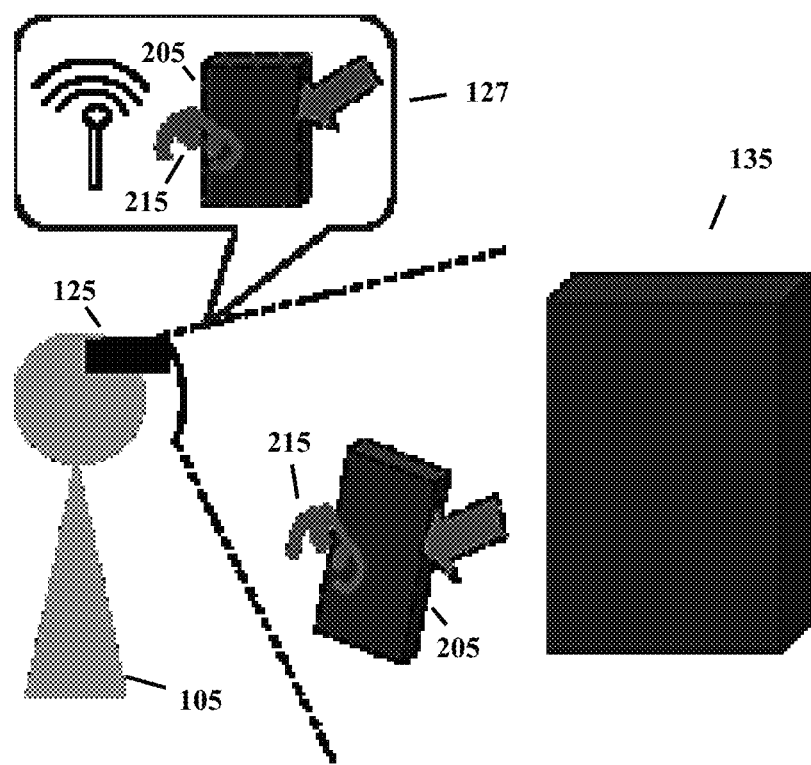
Figure 2G:
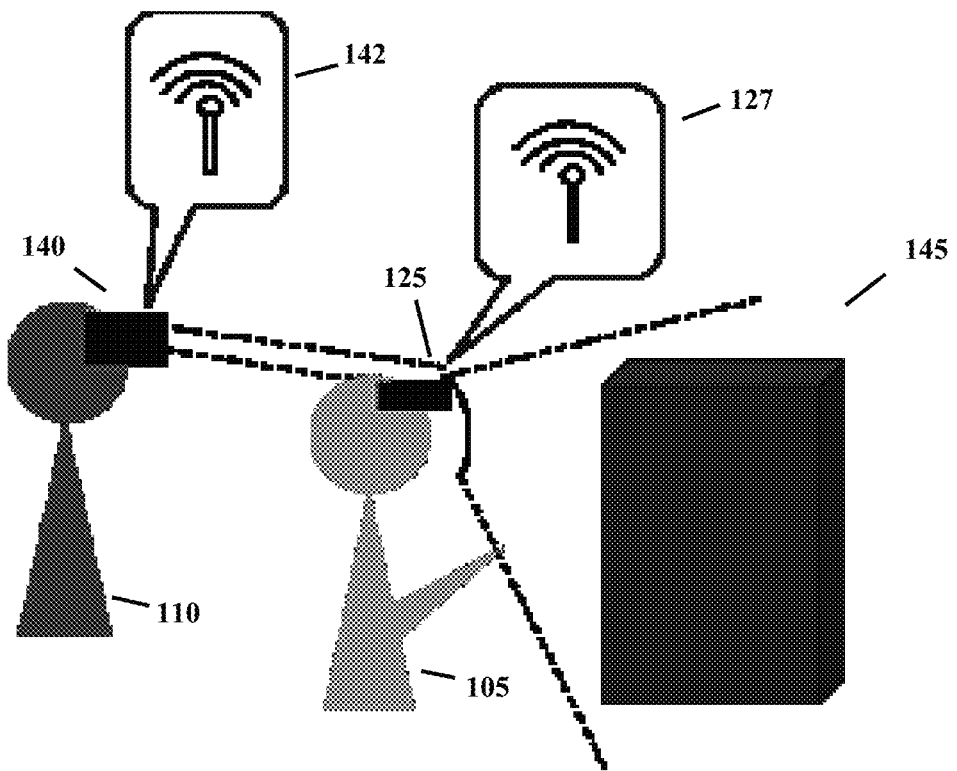

FIG. 1 depicts an illustrative operational scenario wherein an expert worker collaborates with a remote novice worker using an exemplary collaboration system configured to provide immersive collaboration based on configuring a real scene VRE operable from a real scene and a remote VRE operable remote from the real scene with an MR scene model of the real scene, creating an MR scene in each of the real scene VRE and remote VRE based on augmenting the MR scene model with an object model, calibrating the remote MR scene to correspond in three-dimensional space with the real scene MR scene model, and automatically providing immersive collaboration based on the MR scene in the remote VRE and updating the real scene VRE with changes to the remote VRE. In FIG. 1, the user 105 invokes the help of the collaborator 110 through the network cloud 115 and the collaboration server 120. In the depicted example, the collaboration server 120 includes the backend engine 122. In the illustrated example, the collaborator 110 is an expert worker. In the depicted example, the user 105 is a novice worker. In the illustrated example, the novice worker 105 is remote from the expert worker 110. In the depicted example, the novice worker 105 uses the client virtual reality device 125 to scan the real scene 130 with sensors configured in the client virtual reality device 125. In some embodiments, the sensors may be configured outside client virtual reality device 125. In various designs, the sensors may be operably and communicatively coupled with the collaboration server 120 to relay sensor data to the collaboration server 120. In an illustrative example, the sensors may be configured in a wearable device. For example, a sensor including a body motion tracker may be worn by the user 105 in a wearable article such as a smart watch, or an article of clothing, such as, for example, a uniform. In the illustrated example, the virtual reality device 125 includes the user interface 127 configured to provide the user 105 a VRE operable from the real scene 130. In the illustrated example, the real scene 130 includes a work location remote from the expert worker 110. In the depicted example, the novice worker 105 needs to solve a problem at the real scene 130, and the novice worker 105 needs the help of the expert worker 110 to solve the problem. In the depicted example, the client virtual reality device 125 creates a real scene model based on the sensor data captured from the scan of the real scene 130. In some examples, the real scene model may be based on stored data. In various designs, the real scene model may be based on synthetic data. In the depicted example, the client virtual reality device 125 configures the VRE operable from the real scene 130 with the real scene MR scene model 135 generated from the real scene model based on the 3D geometry of the real scene 130. In the illustrated example, the client virtual reality device 125 uploads the real scene MR scene model 135 to the collaboration server 120 for processing and sharing. In the depicted example, the expert worker 110 uses the remote client virtual reality device 140 to configure a remote VRE operable remote from the real scene 130 via the user interface 142 configured in the remote client virtual reality device 140. In the illustrated example, the client virtual reality device 125 at the real scene 130 shares the real scene MR scene model 135 with the remote client virtual reality device 140 via the collaboration server 120. In some embodiments, the collaboration server 120 may retain a copy of the real scene MR scene model 135 and/or the remote MR scene 145. In the illustrated embodiment, the remote client virtual reality device 140 creates the remote MR scene 145 based on the real scene MR scene model 135. In the depicted embodiment, the client virtual reality device 125 identifies an object in the real scene 130 based on object matching 150 with a set of known objects. In various embodiments, the object matching 150 may be implemented by the remote client virtual reality device 140 or the collaboration server 120. In the illustrated example, the client virtual reality device 125 updates the real scene MR scene model 135 with the model of the identified object. In some examples, the model of the identified object may be based on stored data or synthetic data. In various designs, the real scene model may be based on synthetic data. In the depicted example, the client virtual reality device 125 shares the updated real scene MR scene model 135 with the remote client virtual reality device 140 via the collaboration server 120. In the illustrated embodiment, the remote client virtual reality device 140 updates the remote MR scene 145 based on the updated real scene MR scene model 135. In the illustrated example, collaboration server 120 calibrates the remote MR scene 145 to correspond in three-dimensional space with the real scene MR scene model 135. In the depicted example, the remote MR scene 145 is calibrated based on matching real scene 130 calibration points 155 with remote MR scene 145 calibration points 160, and transforming the remote MR scene 145 based on a 3D transform calculated as a function of the real scene 130 calibration points 155 and remote MR scene 145 calibration points 160. In some embodiments, calibration of the remote MR scene 145 may not be required and may be omitted. In an illustrative example, when creating a remote MR scene based on real time scanning at the real scene, calibration may be unnecessary, which may be a result of the models remaining in sync. In the illustrated example the remote client virtual reality device 140 transmits the calibrated remote MR scene 165 to the client virtual reality device 125 via the collaboration server 120, permitting the expert worker 110 to appear next to the novice worker 105 in the real scene VRE operable from the real scene. In the depicted example, the expert worker 110 performs simulated VR actions 170 to show the specific tasks and hand motions that the novice worker 105 would need to perform to solve the problem at the real scene 130. In the illustrated example, the expert worker 110 actions 170 and instructions 175 are recorded in VR, transmitted in real time, and reproduced in MR by the novice user 105 in the real scene VRE operable from the real scene 130. In the depicted example, the expert worker 110 is able to alternate between multiple VR instances of different remote locations, allowing the expert worker 110 to easily teleport from one VR scene to another, and even continue multiple concurrent threads of support. In some embodiments, either or both of the user 105 or expert worker 110 may be embodied by a computer-implemented process, such as, for example, an AI agent.

FIGS. 2A-2G together depict detail views of illustrative phases of an operational scenario wherein an expert worker collaborates with a remote novice worker using an exemplary collaboration system configured to provide immersive collaboration based on configuring a real scene VRE operable from a real scene and a remote VRE operable remote from the real scene with an MR scene model of the real scene, creating an MR scene in each of the real scene VRE and remote VRE based on augmenting the MR scene model with an object model, calibrating the remote MR scene to correspond in three-dimensional space with the real scene MR scene model, and automatically providing immersive collaboration based on the MR scene in the remote VRE and updating the real scene VRE with changes to the remote VRE. In the example depicted by FIG. 2A, the user 105 is performing a maintenance procedure to the real electric panel 205 at the real scene 130. In the illustrated example, the user 105 is equipped with the exemplary client virtual reality device 125 configured with the user interface 127. In the depicted example, the user 105 requests support to perform the procedure. In the depicted example, the client virtual reality device 125 scans the real scene 130 including the real electric panel 205, creates a model of the scene based on the scan, and sends the data for collaboration. In the example illustrated by FIG. 2B, the collaborator 110 is equipped with the remote client virtual reality device 140 configured with the user interface 142. In the depicted example, the user interface 142 presents the user 110 with the data captured by the client virtual reality device 125 at the real scene 130, which may include, for example, images, 360 degree videos, 3D scans, or audio. In the illustrated example, the data captured by the client virtual reality device 125 at the real scene 130 is presented to the collaborator 110 in a VR system configured in the user interface 142, recreating the real scene 130 in VR at the collaborator 110 location. In the depicted example, the real scene 130 is recreated in the remote MR scene 145. In the example depicted by FIG. 2C, the collaborator 110 either verifies that the panel 205 has been correctly identified, or selects a specific panel model from an available 3D model library 210, by providing model number, or by searching among a set of models available, based on identifying and matching a particular object from the real scene 130 against a set of known objects. In the example illustrated by FIG. 2D, the collaborator 110 simulates hand actions and annotations 215 on the VR electric panel 205, placing VR annotations such as, for example, pointers, arrows, or labels, around the VR electric panel 205, simulating user actions and capturing annotations on the virtual work scene. In the example depicted by FIG. 2E, the collaborator 110 actions 215 are recorded in VR along with voice instructions, synchronized to the required sequence of actions to accomplish the procedure, and the collaborator 110 actions and voice instructions 215 are sent to the client virtual reality device 125 to be presented to the user 105. In the example illustrated by FIG. 2F, the user 105 receives the recording as a sequence of actions and instructions 215 performed on the VR electric panel 205, and played back in MR via the user interface 127. In the depicted example, the user 105 places the actions and instructions 215 performed on the VR electric panel 205 in a desired location around the user 105 workspace at the real scene 130. In some embodiments, the actions and instructions 215 performed on the VR electric panel 205 may be placed by the system at a predetermined location matching the real scene 130, with actions and instructions 215 superimposed on top of real scene MR scene model 135. In the example illustrated by FIG. 2G, supervisors continue to observe the user 105 actions on the real electric panel via remote observation, and may provide additional guidance if needed, as well as evaluate performance as desired, based on streaming and updating a VR room at a central location with continuous data captured remotely.

Figure 3:
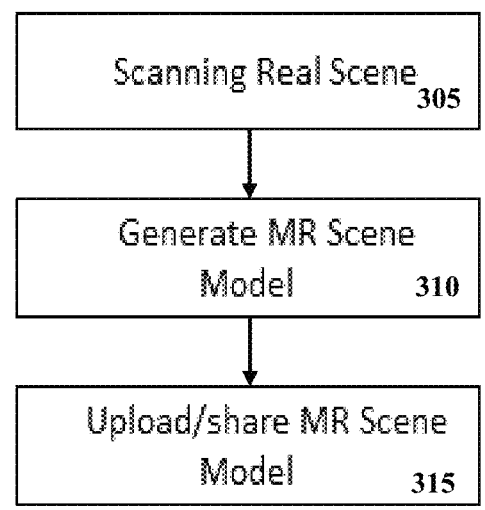
FIG. 3 depicts a high-level overview of an exemplary scene scanning and sharing process illustrative of various embodiments in accordance with the present disclosure.

FIG. 3 depicts a high-level overview of an exemplary scene scanning and sharing process illustrative of various embodiments in accordance with the present disclosure. In the example depicted by FIG. 3, the exemplary scene scanning and sharing process 300 begins at step 305 scanning a real scene using sensors to compose a real scene model. In the illustrated embodiment, the real scene model may be determined as a function of sensor data. In some embodiments, a real scene model may be composed from synthetic data or stored sampled data. In the depicted embodiment, the scene scanning and sharing process continues at step 310 generating an MR scene model using data from the real scene model to compose the MR scene model based on the geometry of the scene. Then, the scene scanning and sharing process continues at step 315 uploading and/or sharing the MR scene model based on packaging and sending the MR scene model over the network to the collaboration server, depicted in FIG. 1, for processing and sharing.

Figure 4A:
FIGS. 4A-4B together depict an exemplary scene scanning and sharing scenario illustrative of various embodiments in accordance with the present disclosure.
Figure 4B:
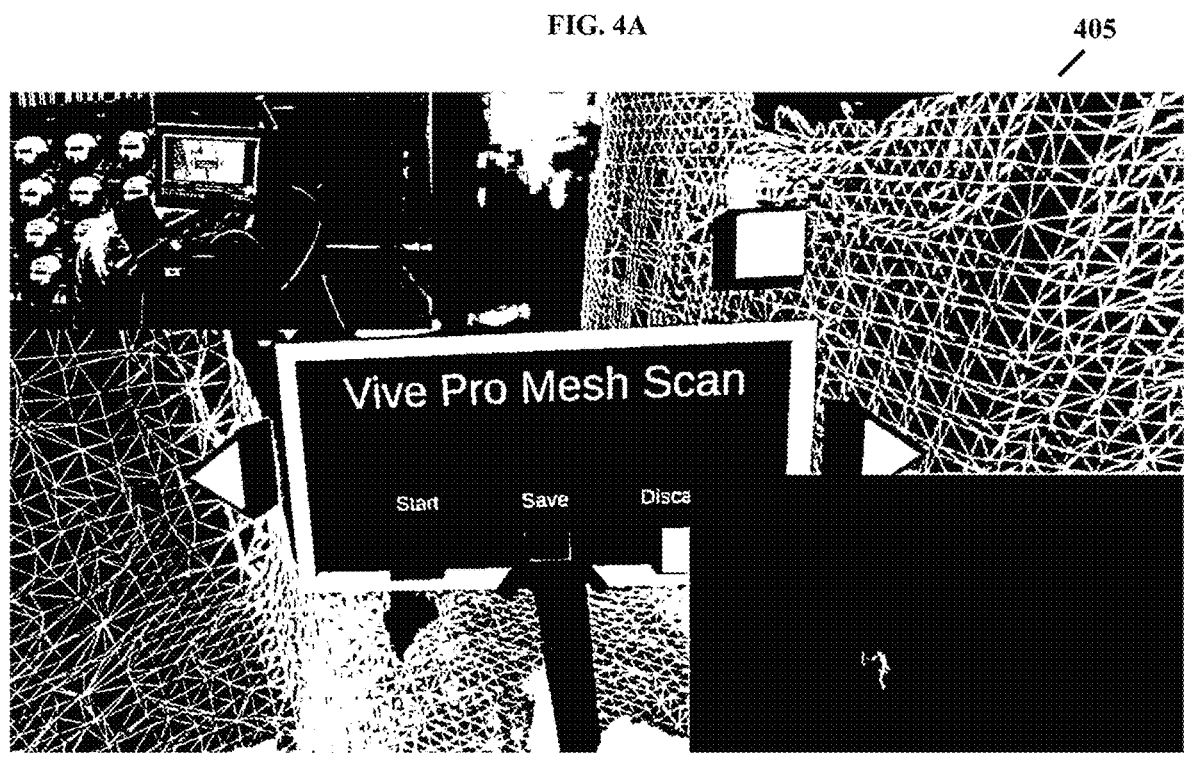

FIGS. 4A-4B together depict an exemplary scene scanning and sharing scenario illustrative of various embodiments in accordance with the present disclosure. In FIG. 4A, the user scans the real scene using sensors to compose a real scene model based on data captured from the sensors. In FIG. 4B, the sensor data captured from the sensor is illustrated by the mesh 405 determined as a function of the sensor data. In various embodiments, the model may be shared/and or uploaded for further processing.

Figure 5:
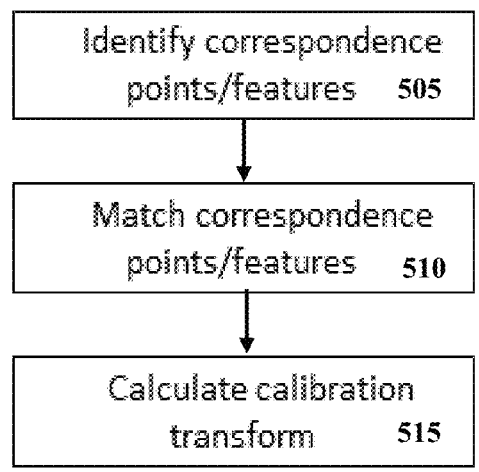
FIG. 5 depicts a high-level overview of an exemplary scene calibration process illustrative of various embodiments in accordance with the present disclosure.

FIG. 5 depicts a high-level overview of an exemplary scene calibration process illustrative of various embodiments in accordance with the present disclosure. In the example depicted by FIG. 5, the exemplary scene calibration process 500 begins at step 505 identifying correspondence points, calibration points, or features in a 3D space for each scene to be used for calibration. In the depicted embodiment, the scene calibration process continues at step 510 matching correspondence points, calibration points, or features in the real scene with correspondence points, calibration points, or features in the MR scene. Then, the exemplary calibration process continues at step 515 calculating a calibration transform based on the correspondence points, calibration points, or features matched from the two scenes (real scene and MR scene) to transform (position, orientation) the MR scene so the remote and HQ scene models match in 3D space.

Figure 6:
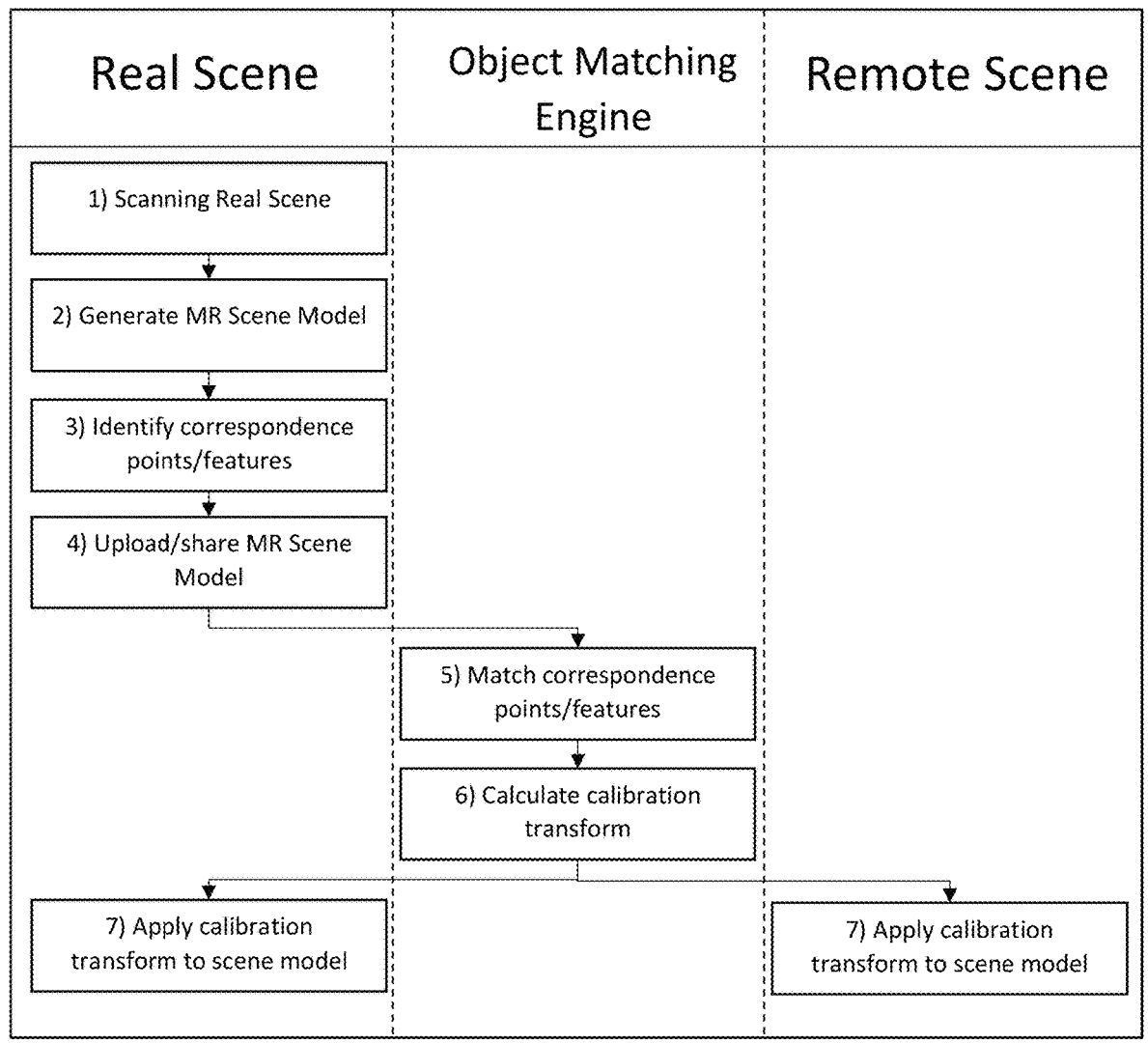
FIG. 6 depicts a process flow diagram illustrating an exemplary scene scanning, sharing, object matching, and calibration process, given as a function of time from the perspectives of exemplary collaboration system endpoints.

FIG. 6 depicts a process flow diagram illustrating an exemplary scene scanning, sharing, object matching, and calibration process, given as a function of time from the perspectives of exemplary collaboration system endpoints. In the depicted embodiment, Scanning Real Scene by the Remote Session includes using sensors to acquire data from the real scene to populate the "Real Scene Model" based on transient data about the scene. In the illustrated embodiment, Generate MR Scene Model by the Remote Session includes using data from the "Real Scene Model" to compose the "MR Scene Model" as a function of the 3D geometry of the scene and a reference coordinate. In the depicted example, identify correspondence points by the Remote Session includes Identifying candidate points/features in the 3D space for each scene that could be used for calibration. In the illustrated embodiment, Upload/share MR Scene Model by the Remote Session includes packaging and sending the MR scene model over the network to the server for processing and sharing. In the illustrated example, the Object Matching Engine Matches correspondence points/features, including matching specific calibration points in the Real scene with calibration points in the MR scene. In the depicted embodiment, the Object Matching Engine Calculates a calibration transform based on the correspondence points that have been matched from the 2 scenes (real scene and MR scene), to calculate the 3d transform (position, orientation) to be applied to the MR scene so the remote and HQ scene model match in 3D space. In the illustrated example, the HQ session applies the transform calculated by the Object Matching Engine to the "Remote Scene Model" and the "HQ Scene Model" so the remote and HQ scene model match in 3D space.

Figure 7A:
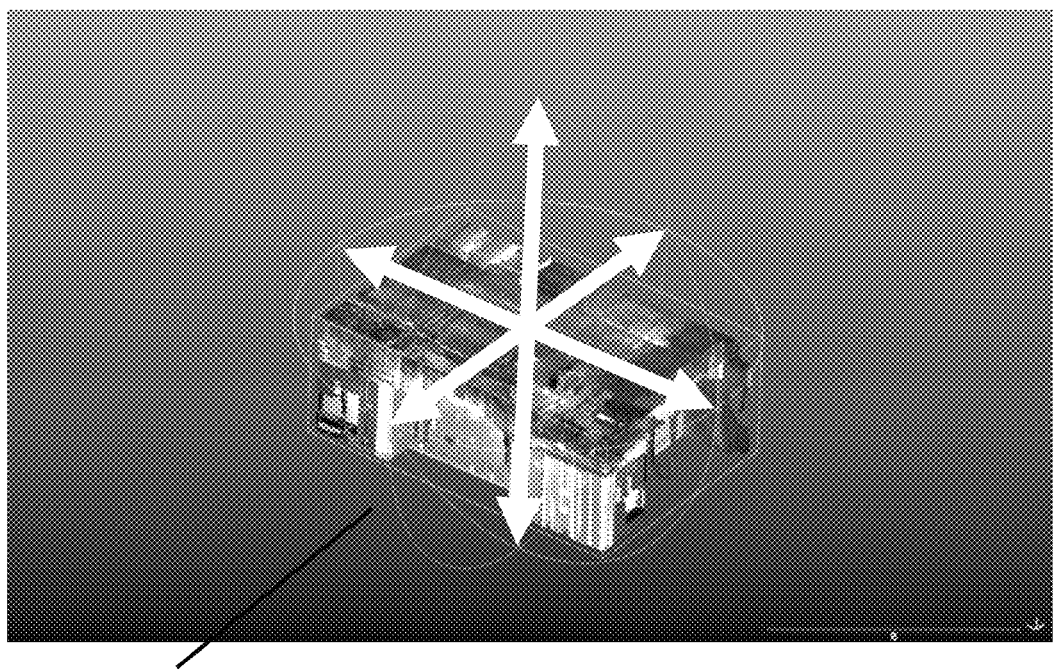
FIGS. 7A-7F together depict an exemplary scenario illustrating the use of world coordinates to compose a shared environment, in accordance with various embodiments of the present disclosure.
Figure 7B:
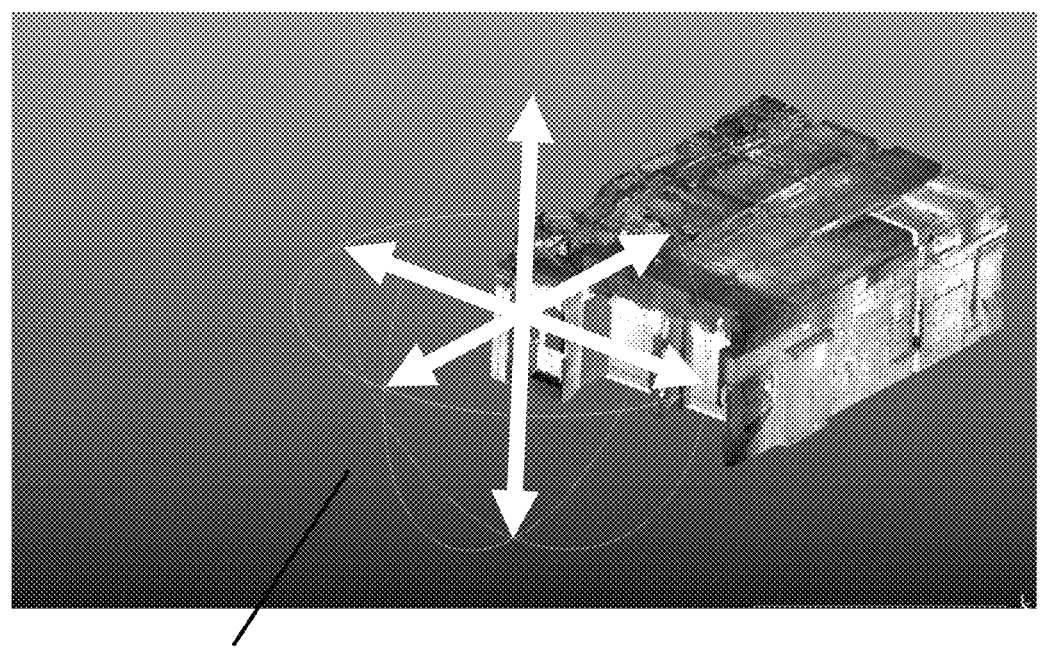
Figure 7C:
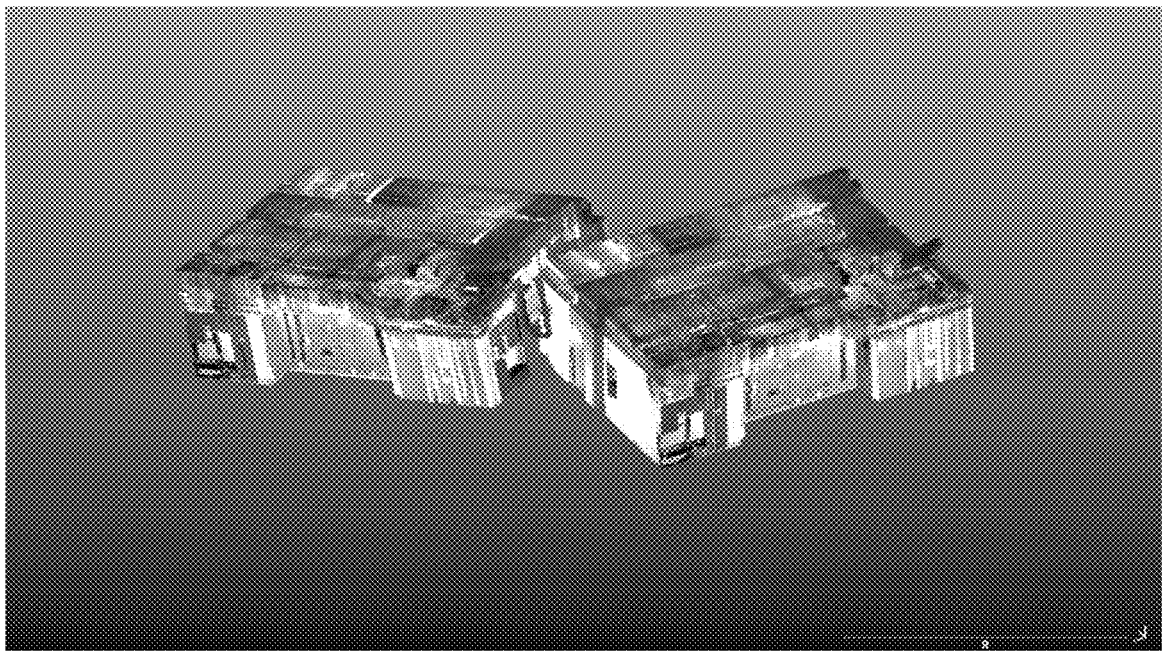
Figure 7D:
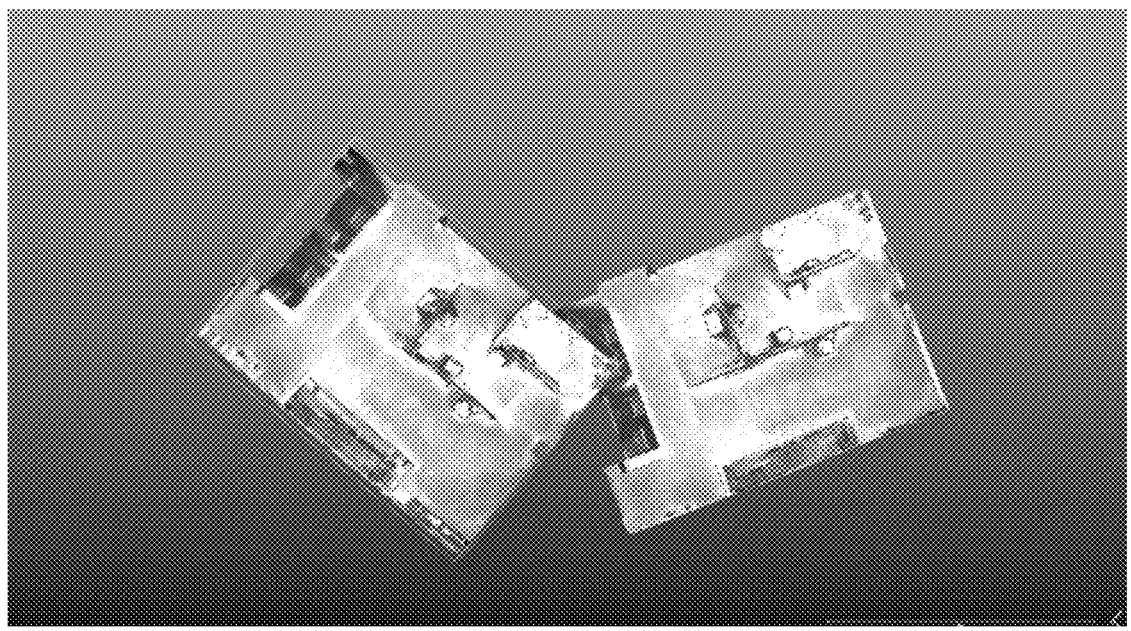
Figure 7E:
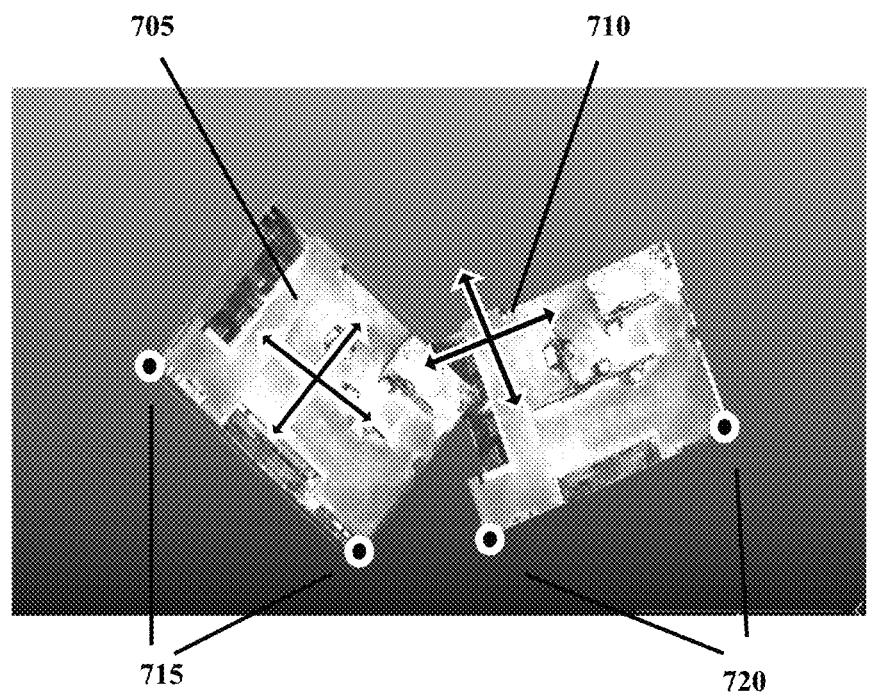
Figure 7F:
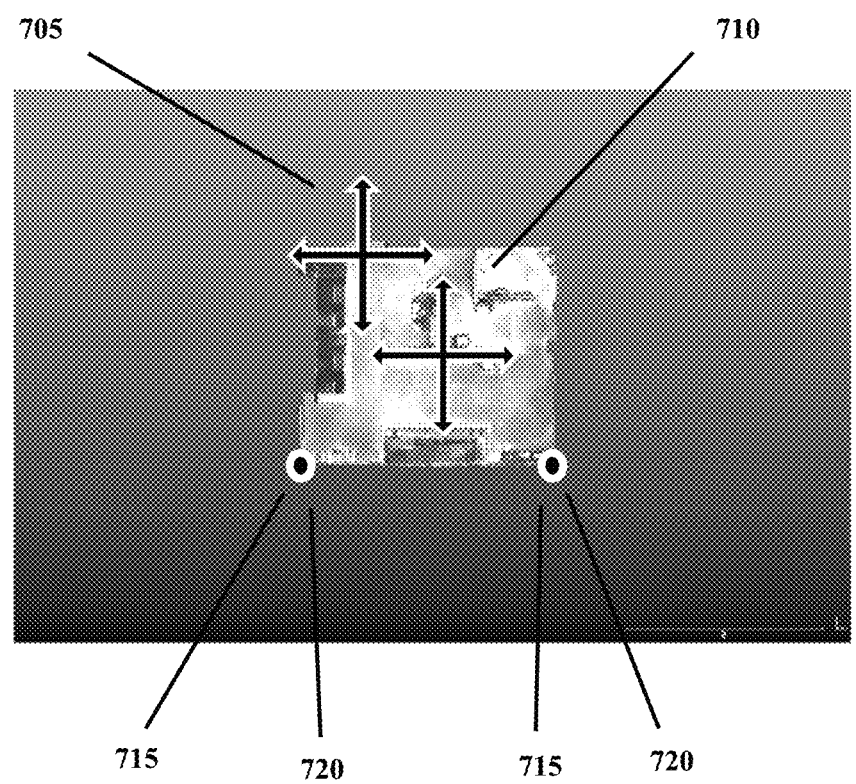

FIGS. 7A-7F together depict an exemplary scenario illustrating the use of world coordinates to compose a shared environment, in accordance with various embodiments of the present disclosure. FIG. 7A illustrates the HQ scene world coordinates 705 set to stored positional/rotational values when the experts in headquarters start their session. FIG. 7B depicts the Remote scene world coordinates 710 at an arbitrary positional/rotational offset to the reference VR Environment depicted in FIG. 7A for a technician in the field starting their session. FIGS. 7C-7D together depict the two scenes at an arbitrary relative position to each other, if each were to use the other's world coordinates to compose a shared environment, as a result of the arbitrary positional/rotational offset to the reference VR Environment for a technician in the field when starting the field session, as depicted in FIG. 7A. FIG. 7E illustrates the HQ scene world coordinates 705, the HQ scene Calibration/Correspondence Points 715, the Remote scene world coordinates 710, and the Remote scene Calibration/Correspondence Points 720. In FIG. 7F, the object matching engine calculates the 3D transformation (rotation, translation, scale, etc.) to be applied to the two scenes (remote scene and HQ scenes) in such manner that the shared environment is now registered, calibrated and synchronized between the position of scene objects in the real and the virtual scenes.

FIG. 8 depicts an exemplary Apex Picture, illustrating an embodiment model of image sensor data in a 3D scene. In FIG. 8, the exemplary Apex pictures 805 are examples of photographs (data from a sensor) placed in the 3D context of the scene. In various examples, an Apex picture may include sensor data in 3D scene context. In an illustrative example, an Apex picture is one example of a photograph (data from a sensor) placed in the 3D context of the scene (sensor pose at the scene). Another example of this concept is the voice memo. Audio captured from a microphone may be 3D placed at the scene based on the position of the microphone. Another example of this concept includes video. Video captured from surveillance cameras or from wearable/handheld devices can be positioned in the scene. In this case, when a video is played, the pose of the camera within the scene may be updated periodically, for example, every video frame, matching movement of the camera within the scene. In various designs, Apex images may be Imported from external sources. Some Apex pictures may be determined using a pose estimation engine to estimate camera pose. In some embodiments, Apex pictures may be captured with sensors at a real scene, using the sensor tracking information to provide the camera pose. Some Apex pictures may be created based on synthetic data. In various implementations, an Apex picture may be synthetically generated within an MR scene, for example, using the relative position of a virtual camera to provide the camera pose. In the illustrated example, Apex Pictures 805 are presented in the virtual Scene. In the depicted example, the frame 810 provides the construct to place the image in space. In the illustrated example, the four edges 815 represent the field of view and the image aspect ratio. In the depicted embodiment, the Apex 820 represents the Camera Pose.

Figure 9B:
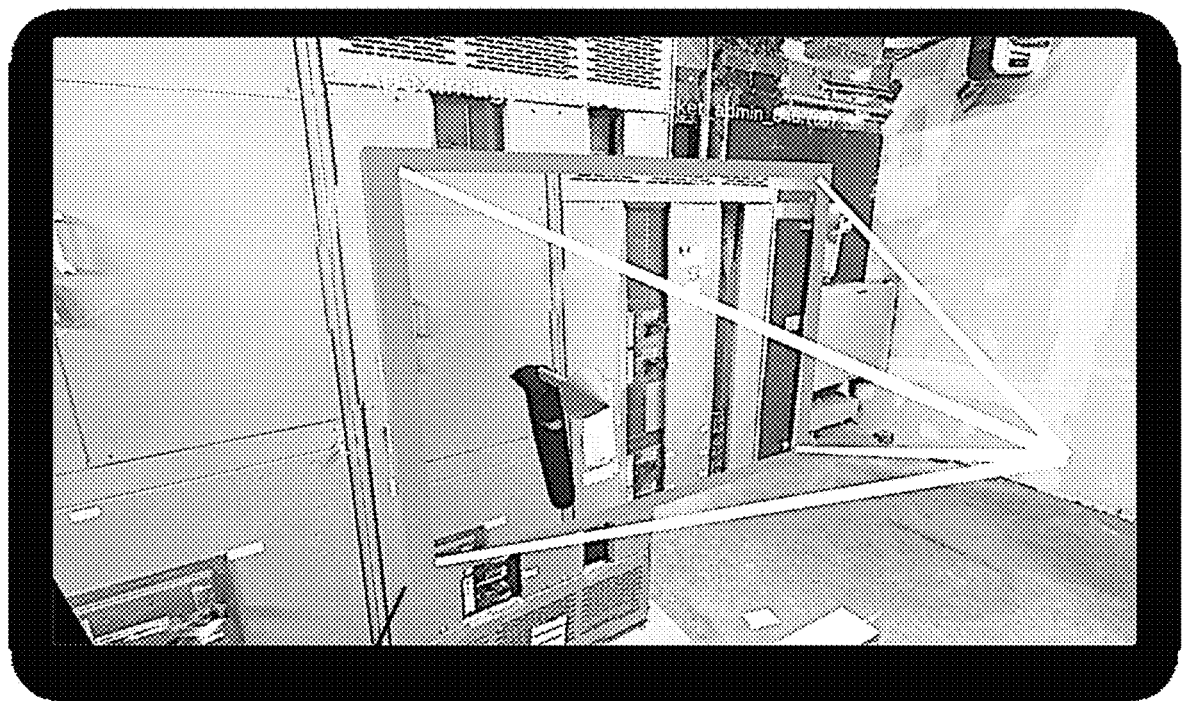
Figure 9C:

FIGS. 9A-9E together depict exemplary scenarios illustrative of the design and usage of various Apex Picture designs in accordance with various embodiments of the present disclosure. In FIG. 9A, when a user touches the Apex picture 805 frame, a controller appears indicating the axis direction for possible movement. In FIG. 9B, the user then grabs (side buttons) the controller and moves it in the desired direction, and the frame adjusts its position and size accordingly. In FIG. 9C, when a user again touches the apex, a controller appears indicating the axis direction for possible movement. FIGS. 9D-9E together illustrate the frame adjusting its position and size in response to the user grabbing the side buttons of the controller, moving the frame in the desired direction.

Figure 10C:
Figure 10D:

FIGS. 10A-10D together depict exemplary Voice Memo scenarios illustrative of the design and usage of audio sensor data in a 3D scene in accordance with various embodiments of the present disclosure. In an illustrative example of an exemplary Voice Memo embodiment, an audio file (data) may be captured by a microphone (sensor) and the data is added to the MR Scene objects and placed in the 3D context based on the position and orientation of the data set. If the position of the sensor in the scene is known and captured at the time of capturing the data (the sensor is 3D-tracked) then the captured data may be added to the MR scene model with the metadata containing the location and orientation of the data set within the 3D scene. In some embodiments, if the position of the sensor in the scene is not provided as input, the position of the sensor can be estimated by pose estimation engines. In FIG. 10A, a user records the voice memo 1005 using microphone 1010 while immersed and leaves the voice memo 1005 positioned in the proper place in the MR scene models. In FIG. 10B, the user activates the recording function. In FIG. 10C, the voice memo 1005 sound recording gets added to the scene and a representation of the audio file is positioned in the location where the sound was recorded, facing the same direction that the sensor was facing when the recording took place. In FIG. 10D, the user then interacts with the 3D representation of the data set—in the case of audio files, they can be played using the headset model 1015, stopped, reminded, fast-forwarded, or oriented in a desired direction. The frame adjusts its position and size accordingly, in response to the user interacting with the 3D representation of the data set modeled in the scene.

Figure 11:
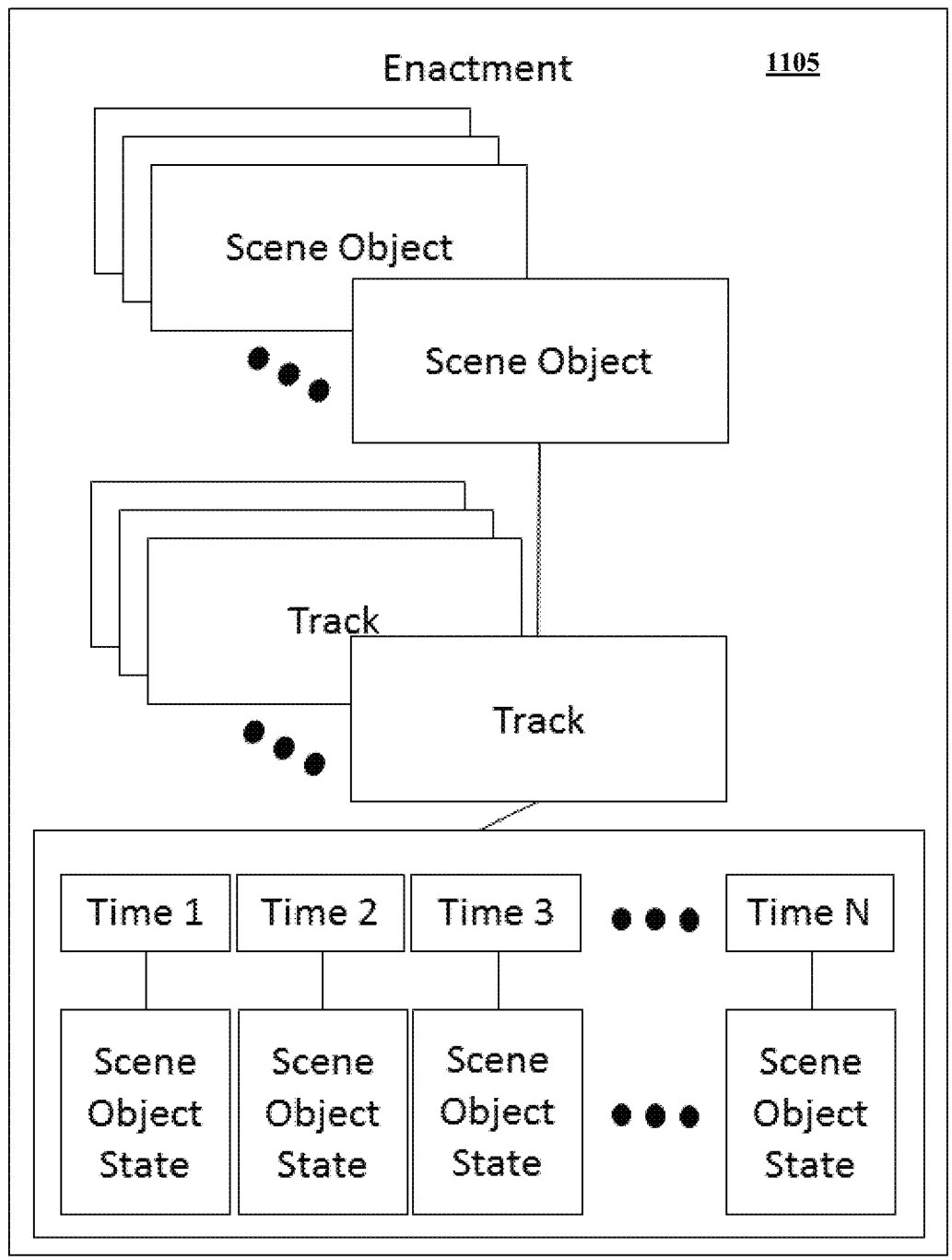
FIG. 11 depicts an exemplary Enactment data model illustrated as a function of time, in accordance with various embodiments of the present disclosure.

FIG. 11 depicts an exemplary Enactment data model illustrated as a function of time, in accordance with various embodiments of the present disclosure. In the depicted embodiment, the exemplary Enactment data model 1105 includes a list of Scene Objects identified within a Scene. In some examples, an Enactment model may include a list of "Tracks," wherein for each track, for each scene object, the scene object state (position, orientation, scale, etc.) is sampled and stored at a point in time (based on a timestamp).

Figure 12A:
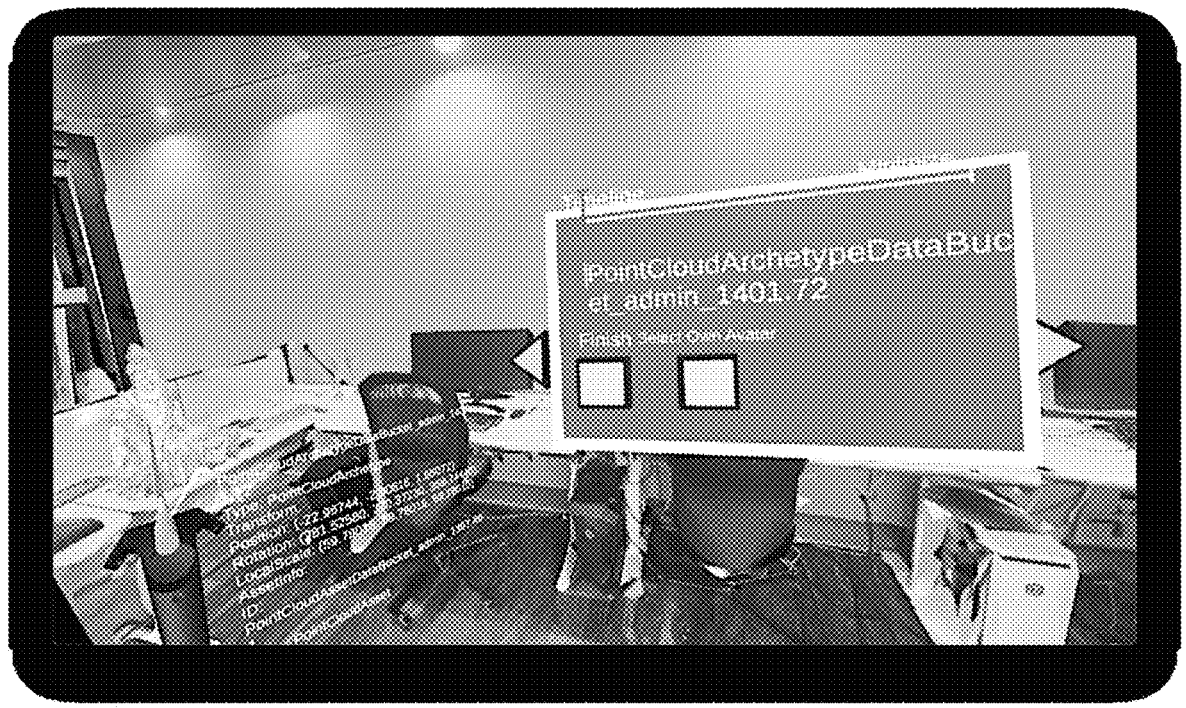
FIGS. 12A-12D together depict exemplary scenarios illustrative of creating an embodiment Enactment, in accordance with various embodiments of the present disclosure.
Figure 12B:
Figure 12C:
Figure 12D:
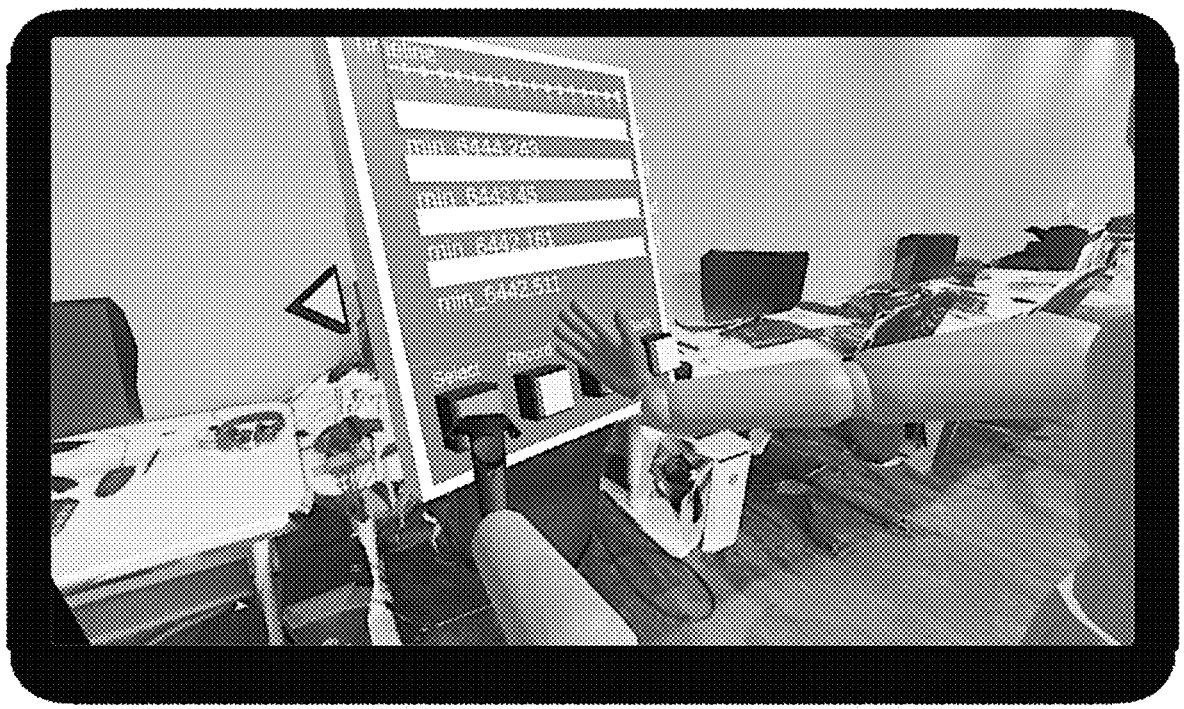

FIGS. 12A-12D together depict exemplary scenarios illustrative of creating an embodiment Enactment, in accordance with various embodiments of the present disclosure. In the depicted example, the exemplary Enactment Recorder scenario illustrates Selecting Scene Objects. In FIG. 12A, the first scene object is selected to be added to a new enactment. In FIG. 12B, the next scene object is selected to be added to the new enactment. In FIG. 12C, the user's own avatar (a specific kind of scene object) is added to the new enactment. In FIG. 12D, the user's own avatar (a specific kind of scene object) is added to an existing enactment.

Figure 13:
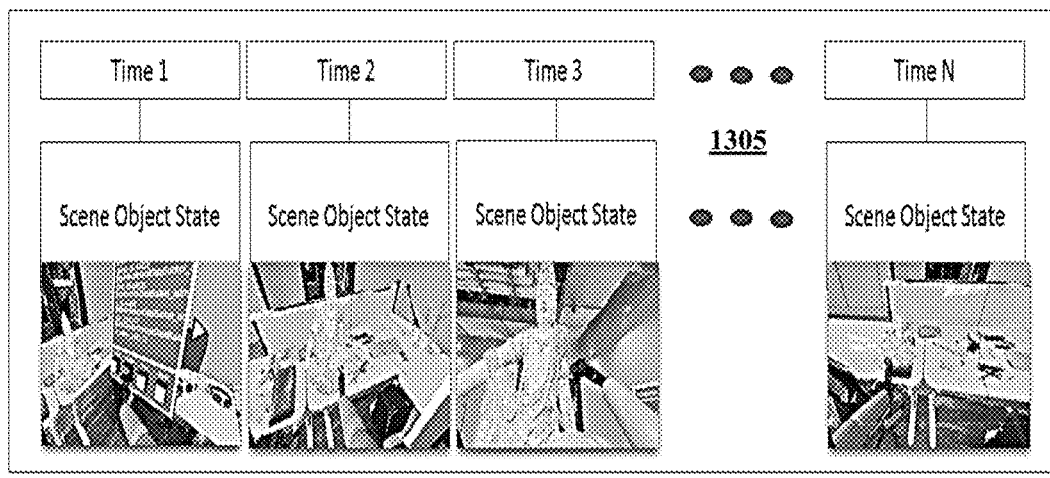
FIG. 13 depicts an exemplary summary of an embodiment Enactment Recorder scenario, organized along a timeline reference.
Figure 14A:
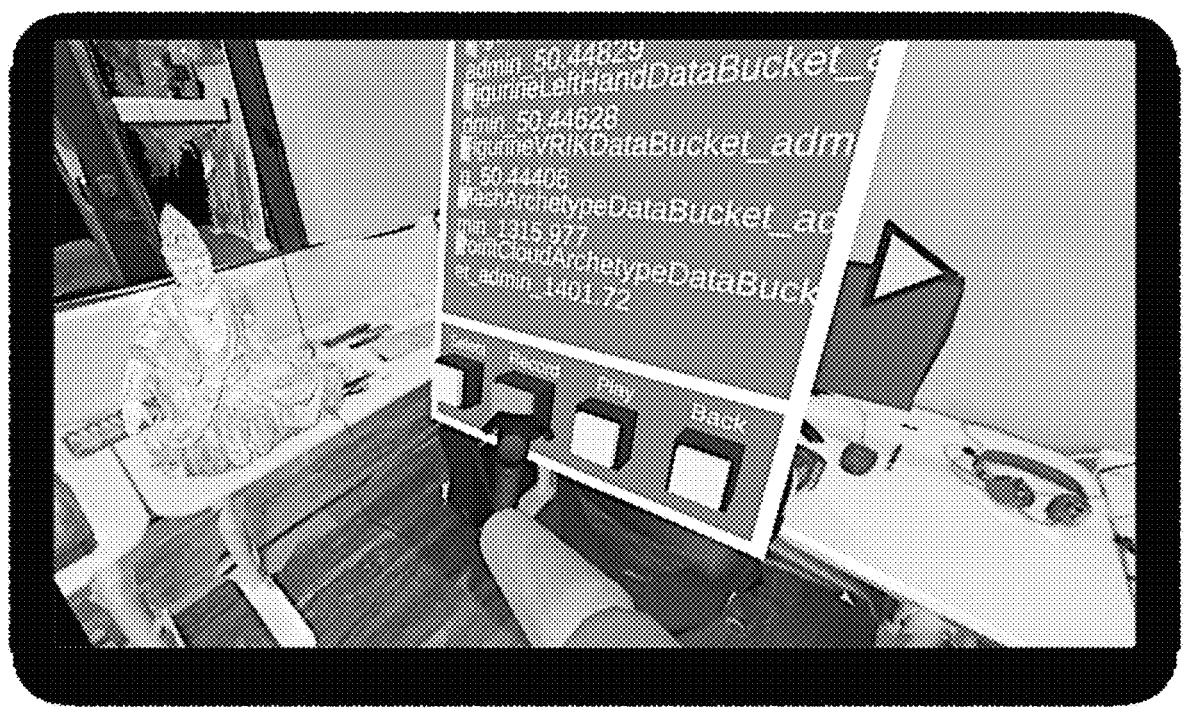
FIGS. 14A-14D together depict exemplary Enactment recording scenarios, in accordance with various Enactment Recorder embodiments of the present disclosure.
Figure 14B:
Figure 14C:
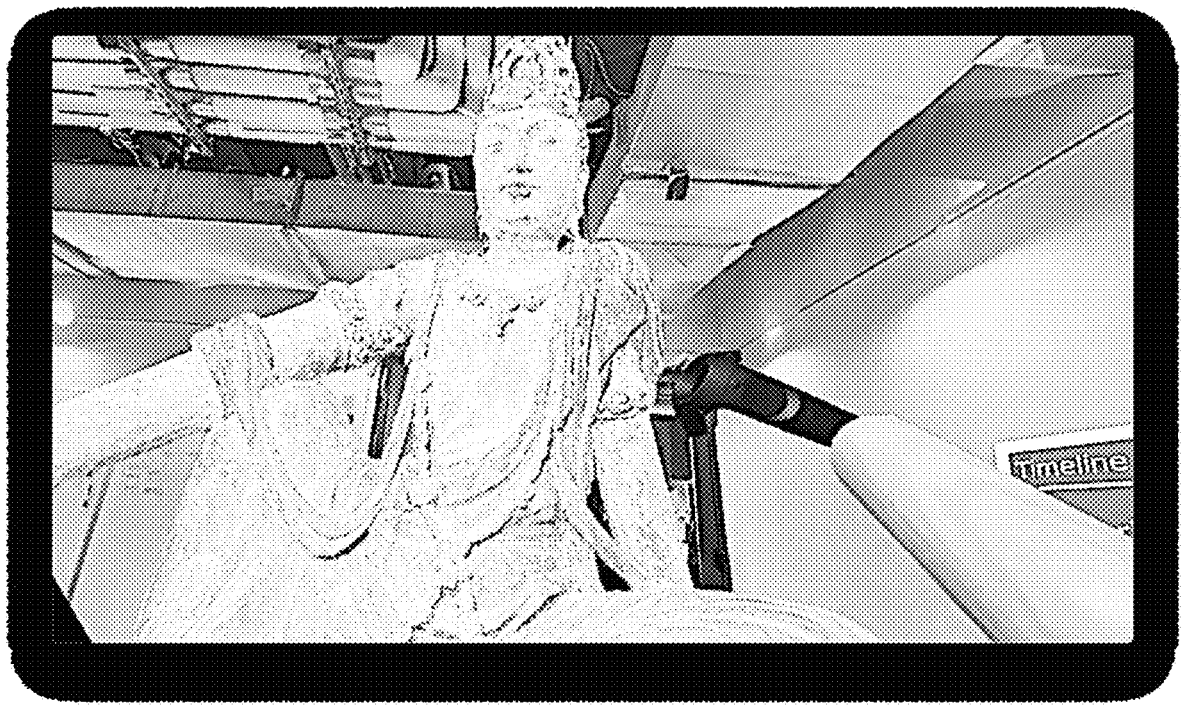
Figure 14D:

FIG. 13 depicts an exemplary summary of an embodiment Enactment Recorder scenario, organized along a timeline reference. In the depicted example, the exemplary Enactment Recorder scenario permits a user to record an enactment within a scene. In various embodiments, if a recording has no existing timeline (no tracks have been recorded yet), then a timeline may be created, otherwise, an existing timeline may be used as a baseline. In some examples, the baseline timeline may be extended if needed during a re-recording session. In the illustrated example, the exemplary Enactment Recorder design 1305 includes two states: Selecting Scene Objects, and, Recording.

FIGS. 14A-14D together depict exemplary Enactment recording scenarios, in accordance with various Enactment Recorder embodiments of the present disclosure. In the depicted example, each scene object status information (position, orientation, scale, color, metadata, etc.) is stored continuously over a timeline reference at a given rate (time per second) as the Enactment is recorded.

Figure 15:
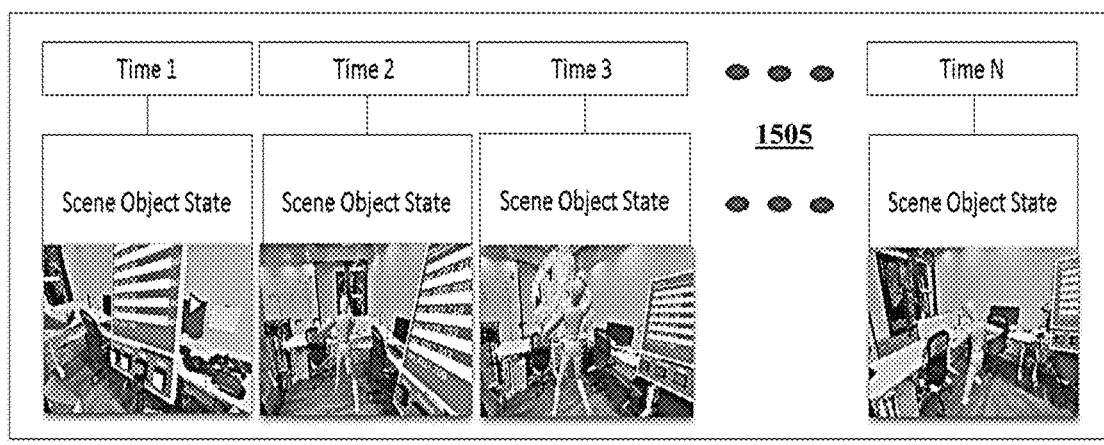
FIG. 15 depicts an exemplary summary of an embodiment Enactment Player scenario, organized along a timeline reference.
Figure 16A:
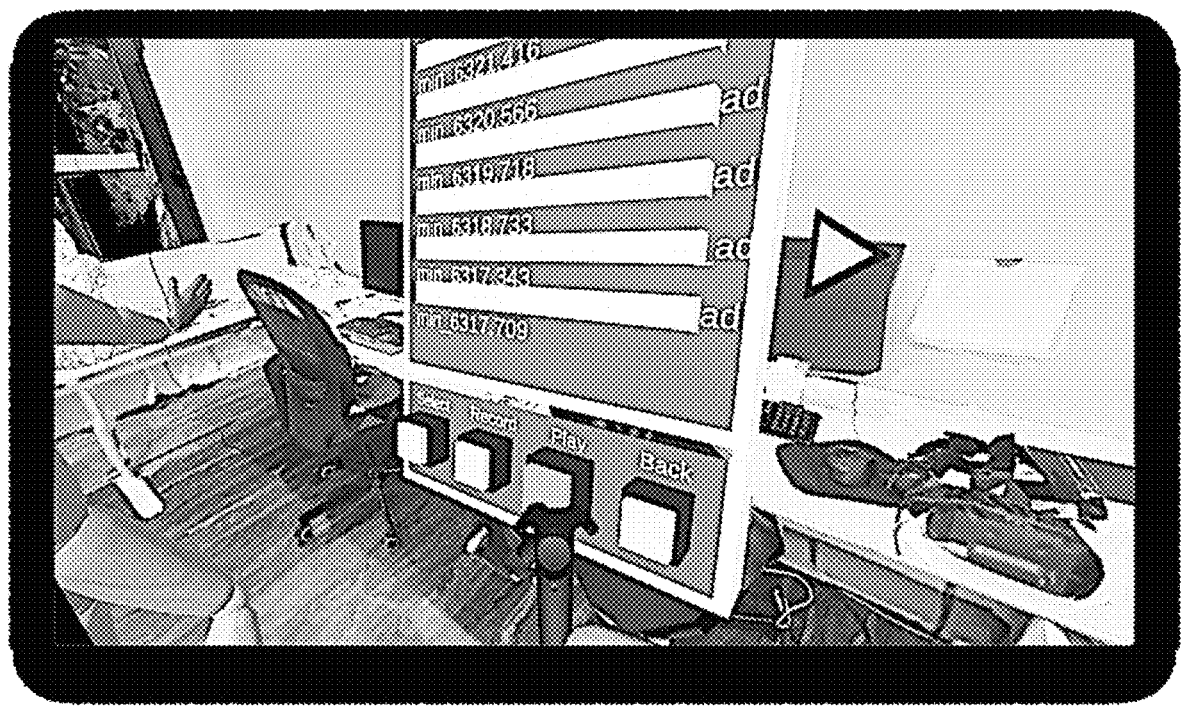
FIGS. 16A-16D together depict exemplary Enactment playing scenarios, in accordance with various Enactment Player embodiments of the present disclosure.
Figure 16B:
Figure 16C:
Figure 16D:

FIG. 15 depicts an exemplary summary of an embodiment Enactment Player scenario, organized along a timeline reference. In the depicted example, the exemplary Enactment Player design 1505 allows a user to play an enactment within a scene. In an illustrative example, upon activation, for each track in the enactment, the track may be "played back" by advancing continually over the timeline at a given rate (times/second) and each step.

FIGS. 16A-16D together depict exemplary Enactment playing scenarios, in accordance with various Enactment Player embodiments of the present disclosure. In the illustrated example, for each track in the enactment, the track is "played back" by advancing continually over the timeline at a given rate (times/second) and each step.

Figure 17:
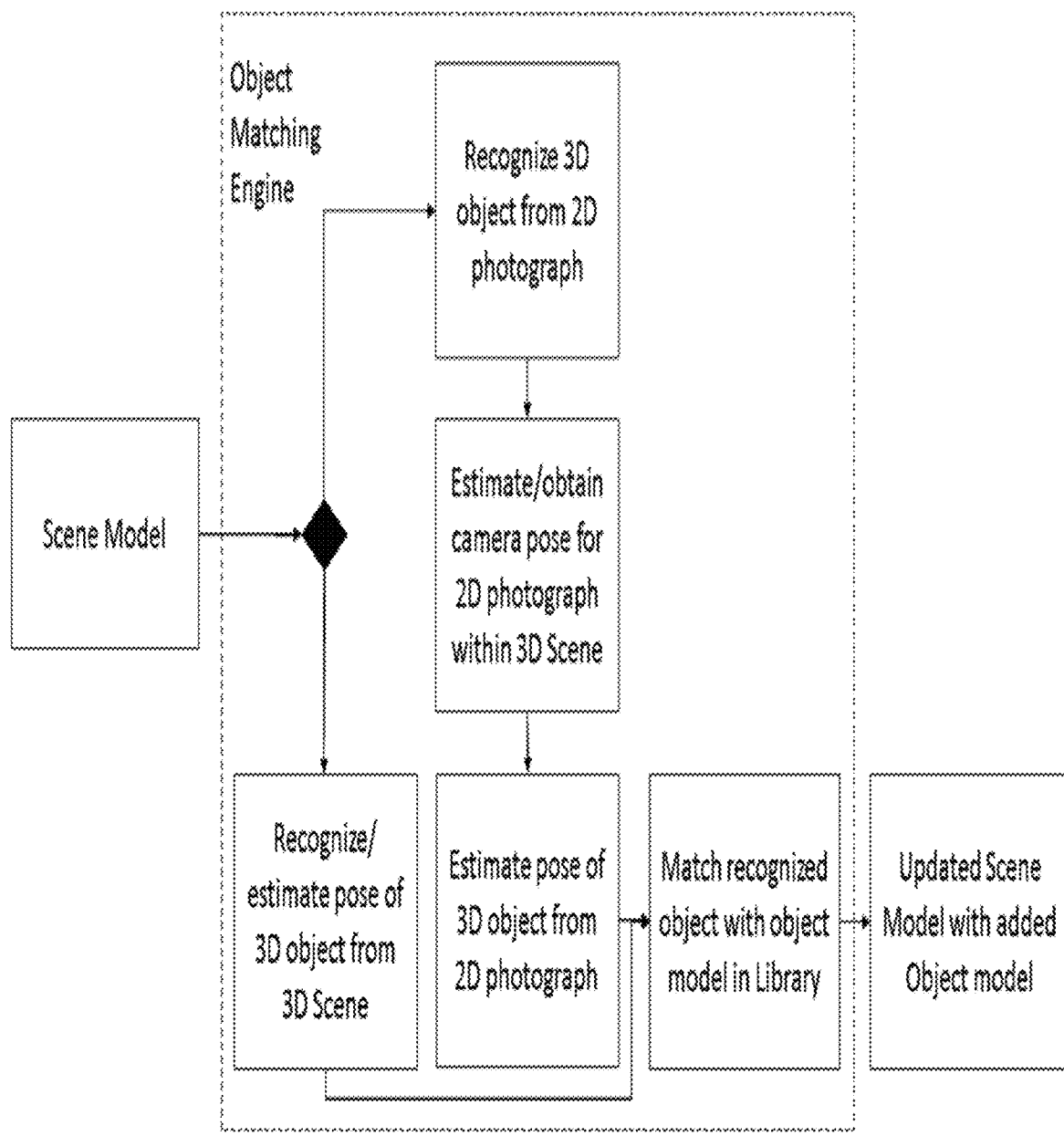
FIG. 17 is a flow diagram depicting an exemplary object recognition and scene augmentation process, in accordance with various embodiments of the present disclosure.

FIG. 17 is a flow diagram depicting an exemplary object recognition and scene augmentation process, in accordance with various embodiments of the present disclosure.

Figure 18A:
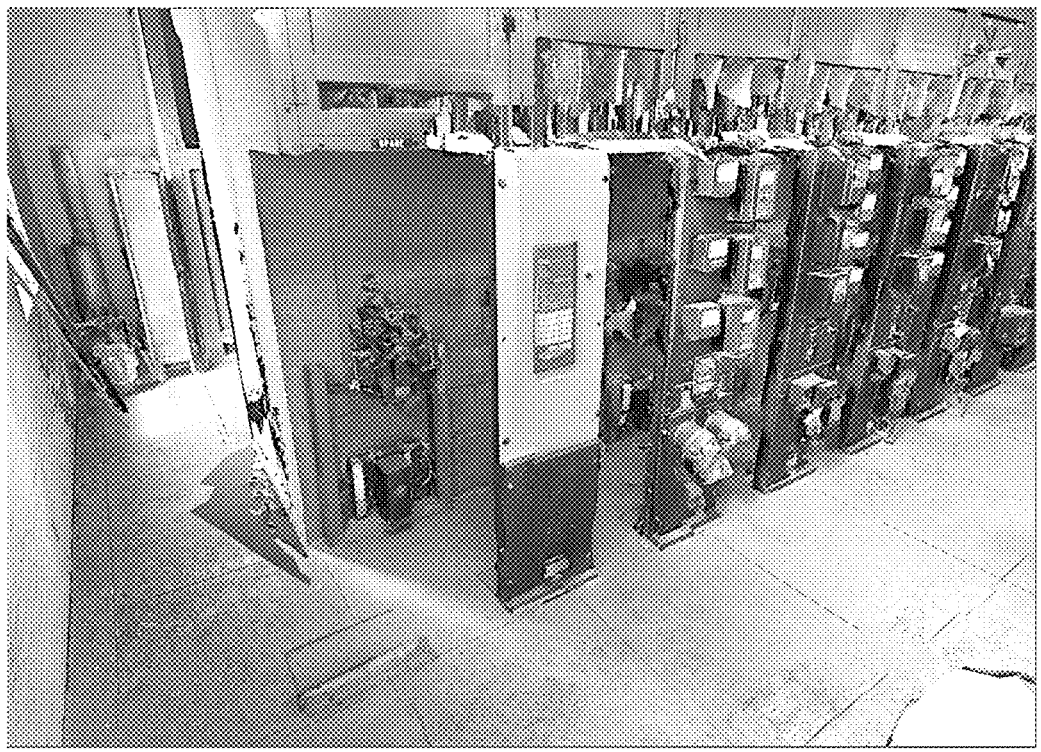
FIGS. 18A-18C together depict an exemplary object recognition scenario recognizing a 3D object from a 3D environment, in accordance with various embodiments of the present disclosure.
Figure 18B:
Figure 18C:
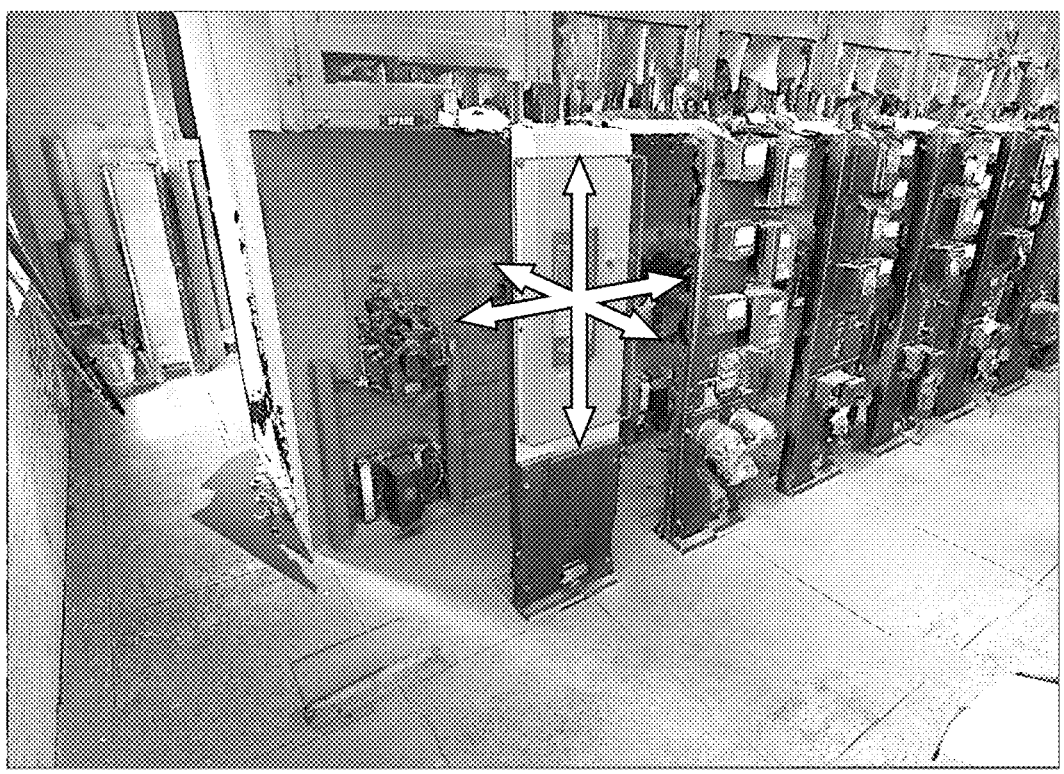

FIGS. 18A-18C together depict an exemplary object recognition scenario recognizing a 3D object from a 3D environment, in accordance with various embodiments of the present disclosure. FIG. 18A depicts an exemplary 3D Environment based on an initial data set provided as input. In various examples, the initial data set may be preloaded in the server from an external source. In some examples, the initial data set may be created/collected by a client while operating at a remote location. In an illustrative example, the initial data set may include a scene's 3D geometry data (e.g. mesh, point cloud). In some examples, the initial data set may be used to populate the 3D environment model. In FIG. 18B, given a target 3D object, the exemplary 3D Object recognition Engine recognizes the object in the 3D environment. In some examples, the recognition may be based on a CAD model in a library. In the depicted embodiment, the 3D Object recognition Engine Estimates a 3D outline (geometric shape) around the object. In FIG. 18C, the outline is placed in the scene, highlighting the section of the 3D environment where the object was recognized. In the illustrated example, the placement of the outline in the scene matches the placement of the recognized 3D object in the scene.

Figure 19A:
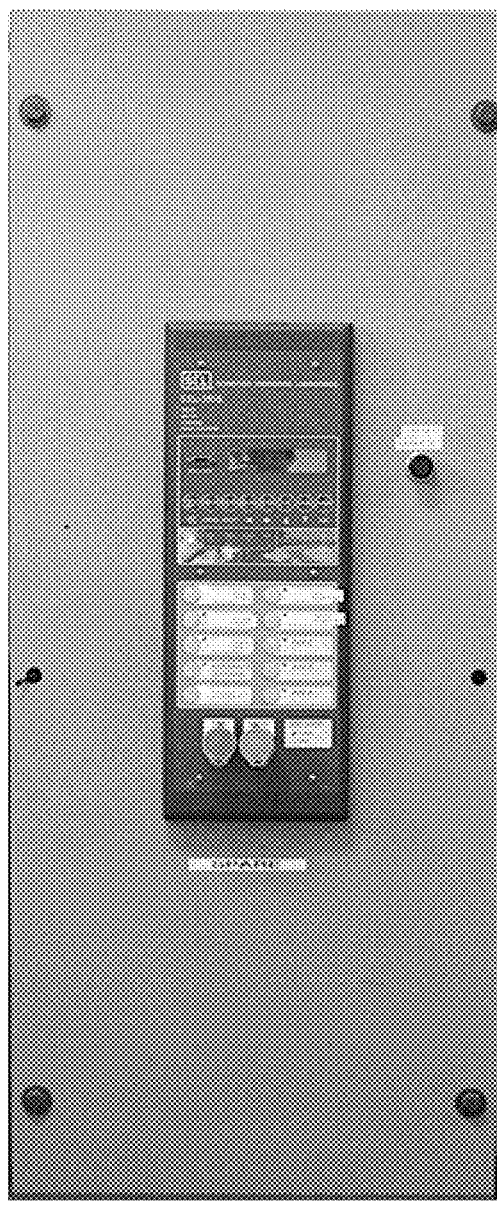
FIGS. 19A-19E together depict an exemplary object recognition scenario recognizing a 3D object from a 2D picture, in accordance with various embodiments of the present disclosure.
Figure 19B:
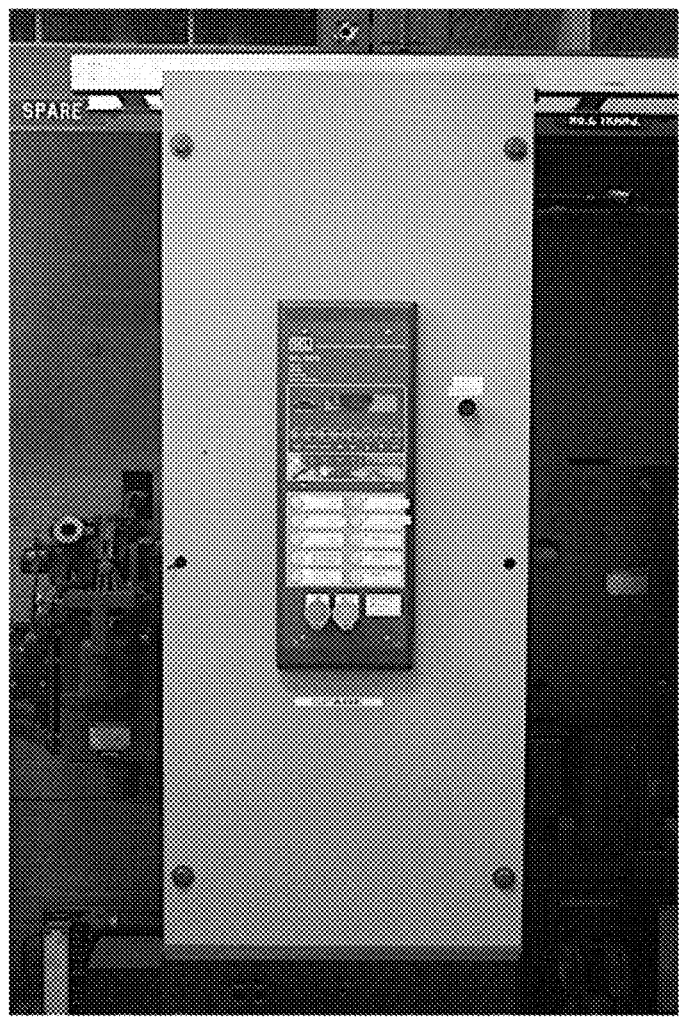
Figure 19C:
Figure 19D:
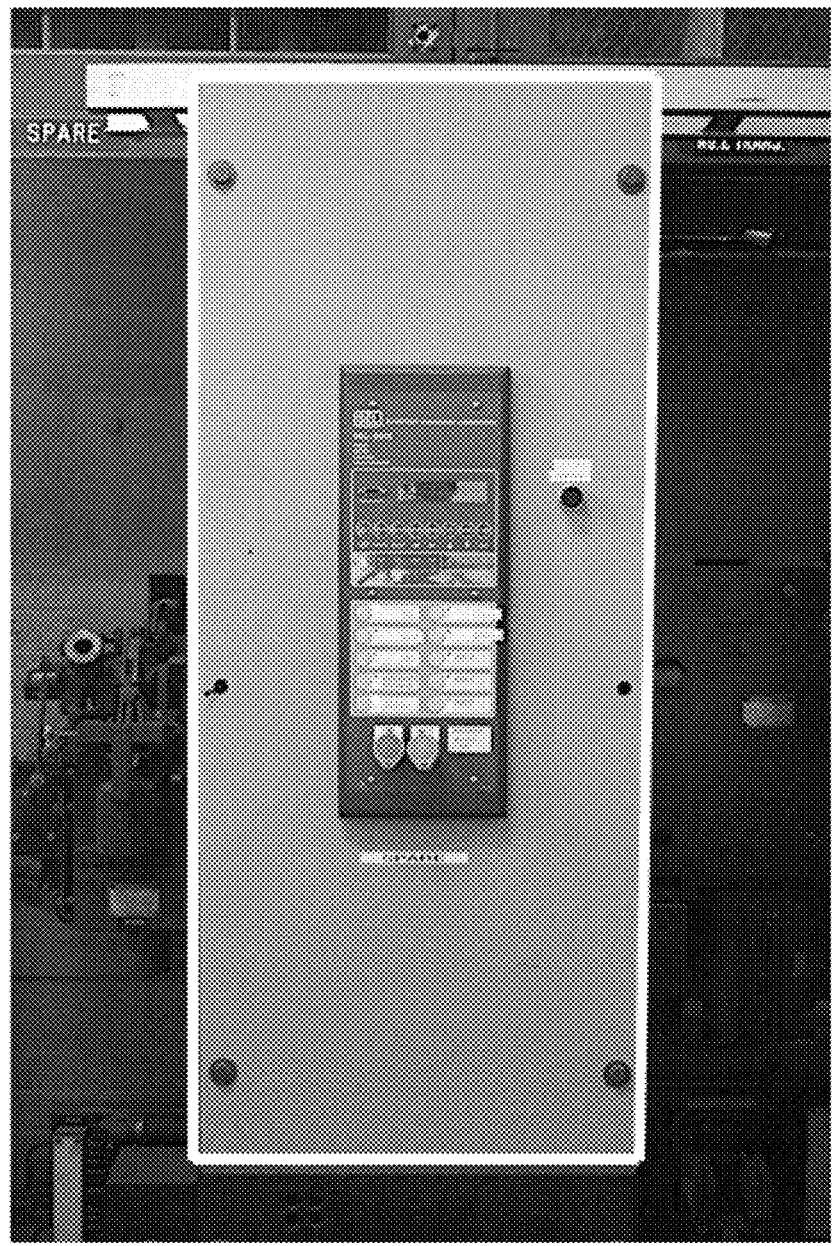
Figure 19E:

FIGS. 19A-19E together depict an exemplary object recognition scenario recognizing a 3D object from a 2D picture, in accordance with various embodiments of the present disclosure. In the illustrated example, given a target object, the exemplary 2D object recognition recognizes the object, and the object boundaries among a sample of pictures. FIG. 19A depicts a 2D model from a model library. FIG. 19B depicts a sample 2D picture representing a front view of an object. FIG. 19C depicts a sample 2D picture representing a side perspective view of an object. FIG. 19D and FIG. 19E respectively depict the recognition of the objects depicted in FIG. 19B and FIG. 19C, including recognition of the indicated object boundaries.

Figure 20A:
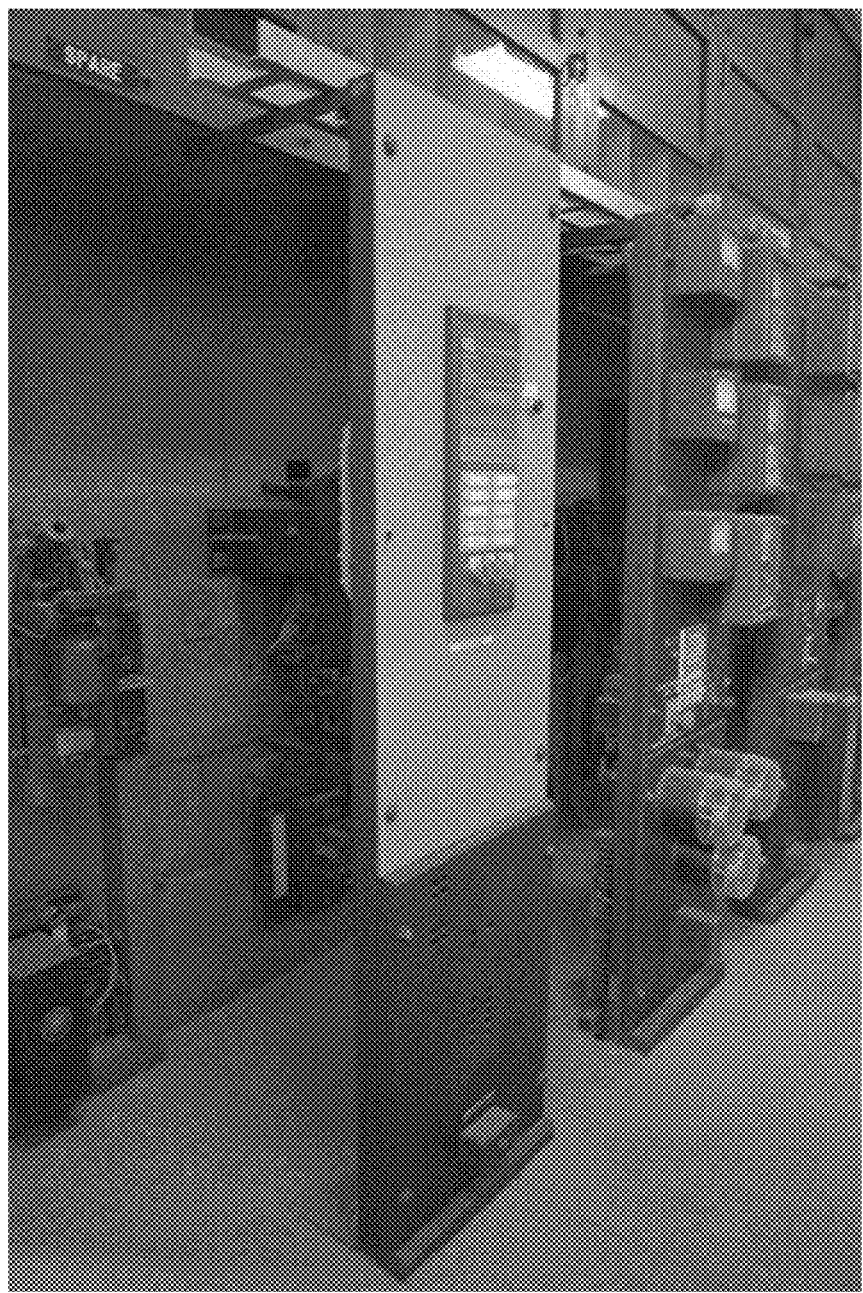
FIGS. 20A-20B together depict an exemplary object recognition scenario estimating a 3D object from a 2D picture, in accordance with various embodiments of the present disclosure.
Figure 20B:
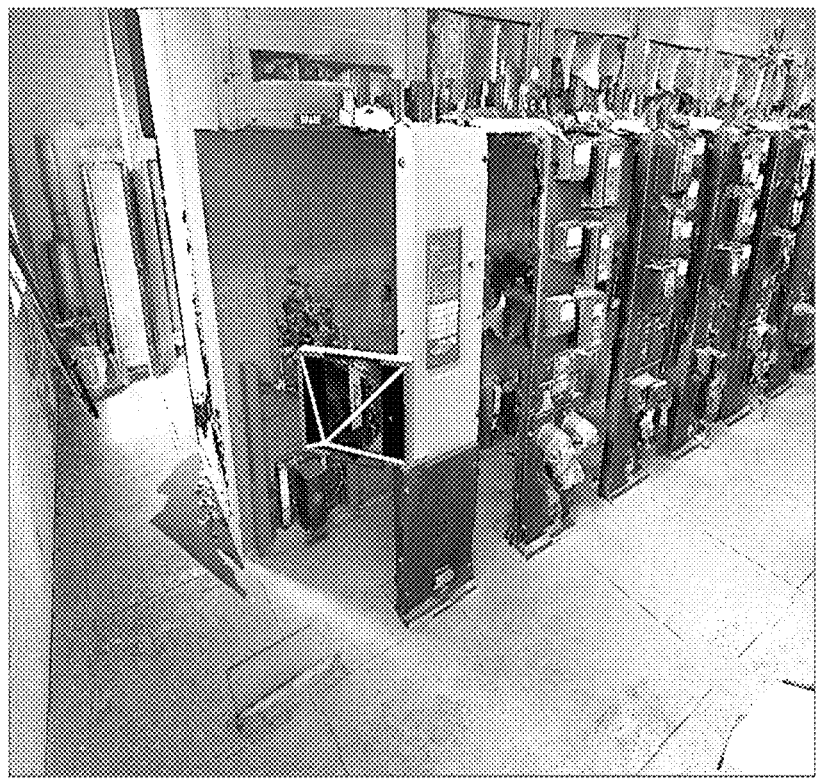

FIGS. 20A-20B together depict an exemplary object recognition scenario estimating a 3D object from a 2D picture, in accordance with various embodiments of the present disclosure. In the depicted example, given a picture of the target object, the exemplary object recognition obtains/estimates a camera pose within the scene. In an illustrative example, if a picture is taken by a 3D tracked sensor, the pose is known based on the 3D tracked sensor data. Otherwise, the pose may be estimated by the engine. FIG. 20A depicts the picture of the target object given to an exemplary Object Recognition Engine. In FIG. 20B, a picture of the target object is placed in the Scene based on the provided/estimated camera pose.

Figure 21A:
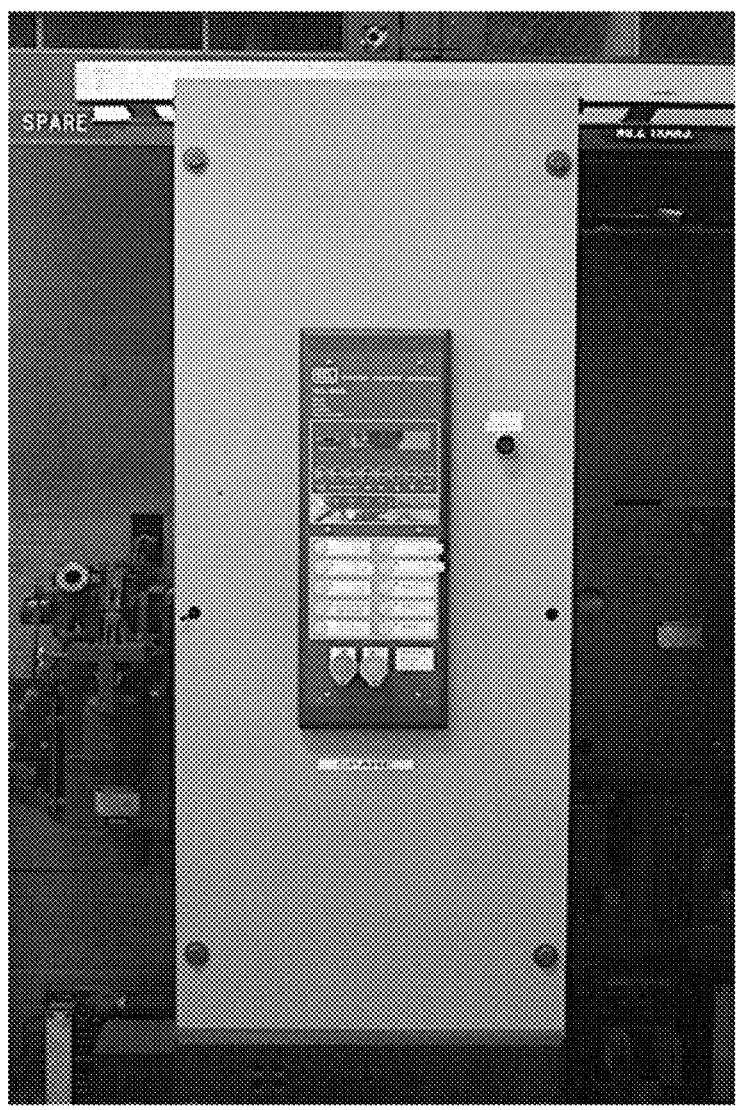
FIGS. 21A-21B together depict an exemplary object recognition scenario estimating a 3D object from a 2D picture given another picture of the target object, in accordance with various embodiments of the present disclosure.
Figure 21B:
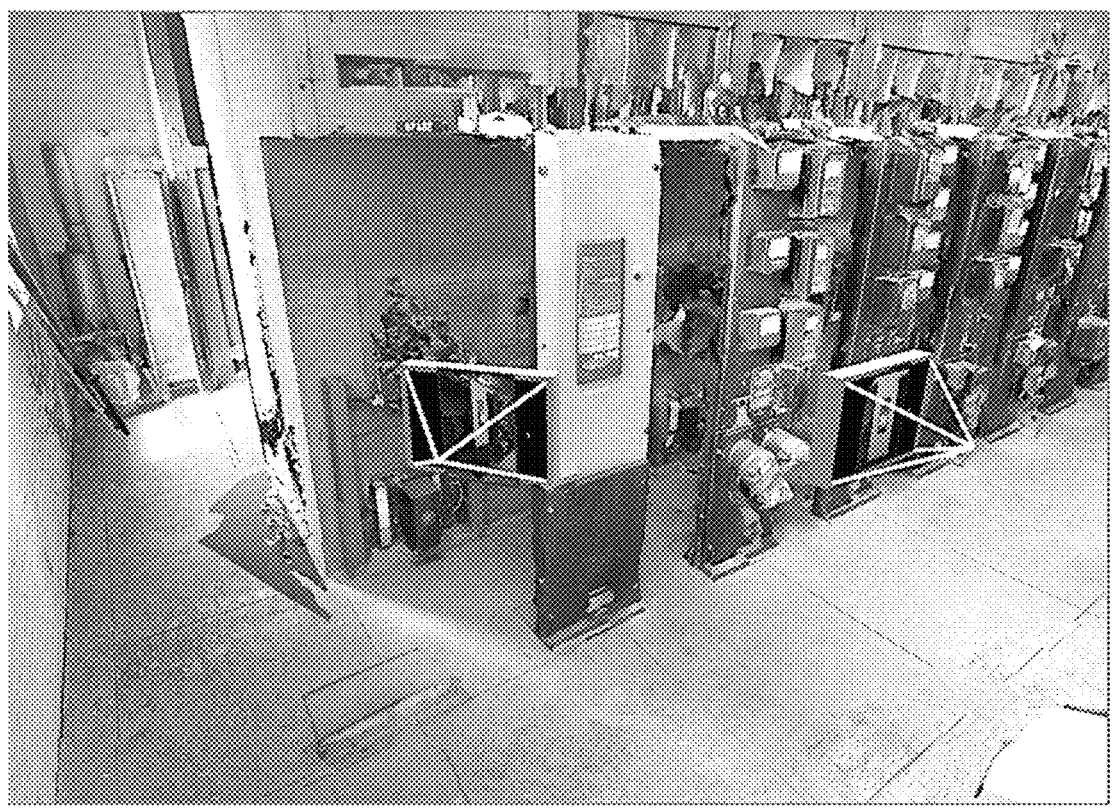

FIGS. 21A-21B together depict an exemplary object recognition scenario estimating a 3D object from a 2D picture given another picture of the target object, in accordance with various embodiments of the present disclosure. In the depicted example, given another picture of the target object, an exemplary Object Recognition Engine obtains/Estimates the camera pose within the scene. FIG. 21A depicts the picture of the target object given to an exemplary Object Recognition Engine. In FIG. 21B, an additional picture of the target object is provided to the Object Recognition Engine. In the depicted example, the additional picture of the target object includes a provided/estimated camera pose.

Figure 22A:
FIGS. 22A-22C together depict an exemplary object recognition scenario estimating a 3D object from a 2D picture given an object recognized in multiple pictures with apredetermined camera pose, in accordance with various embodiments of the present disclosure.
Figure 22B:
Figure 22C:
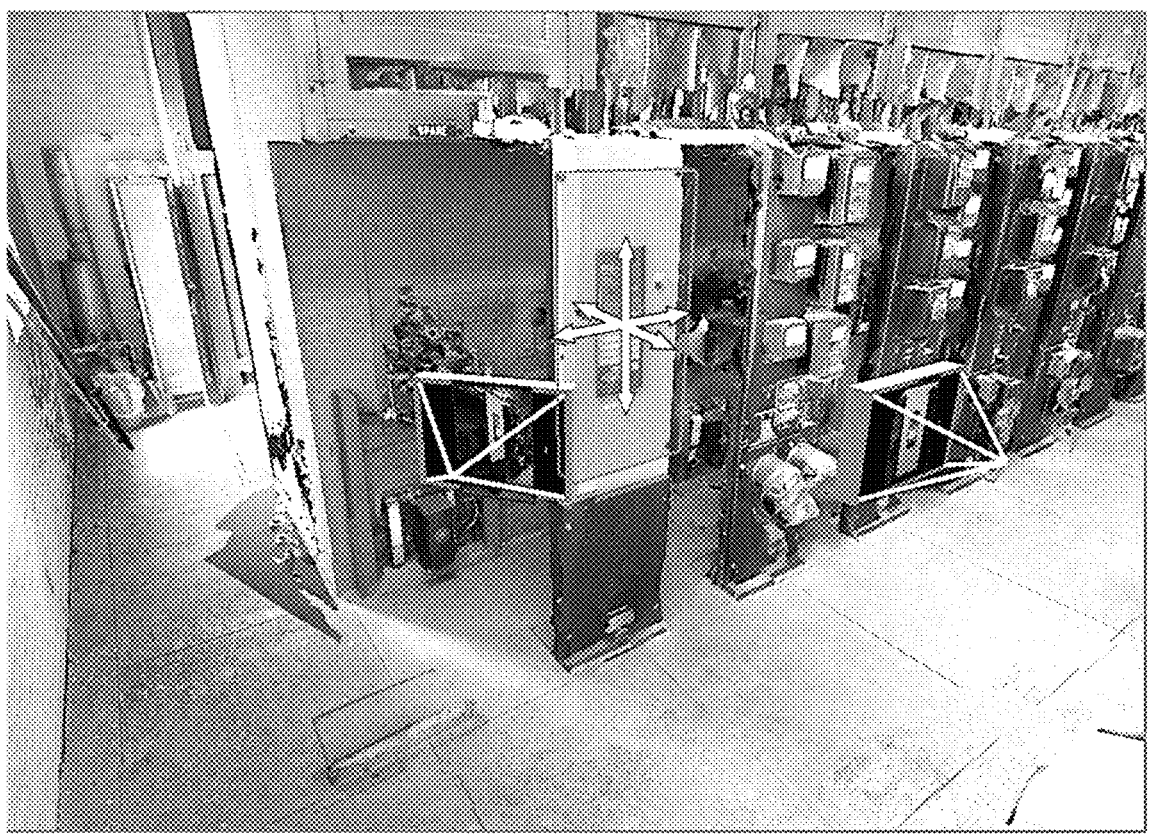
Figure 23A:
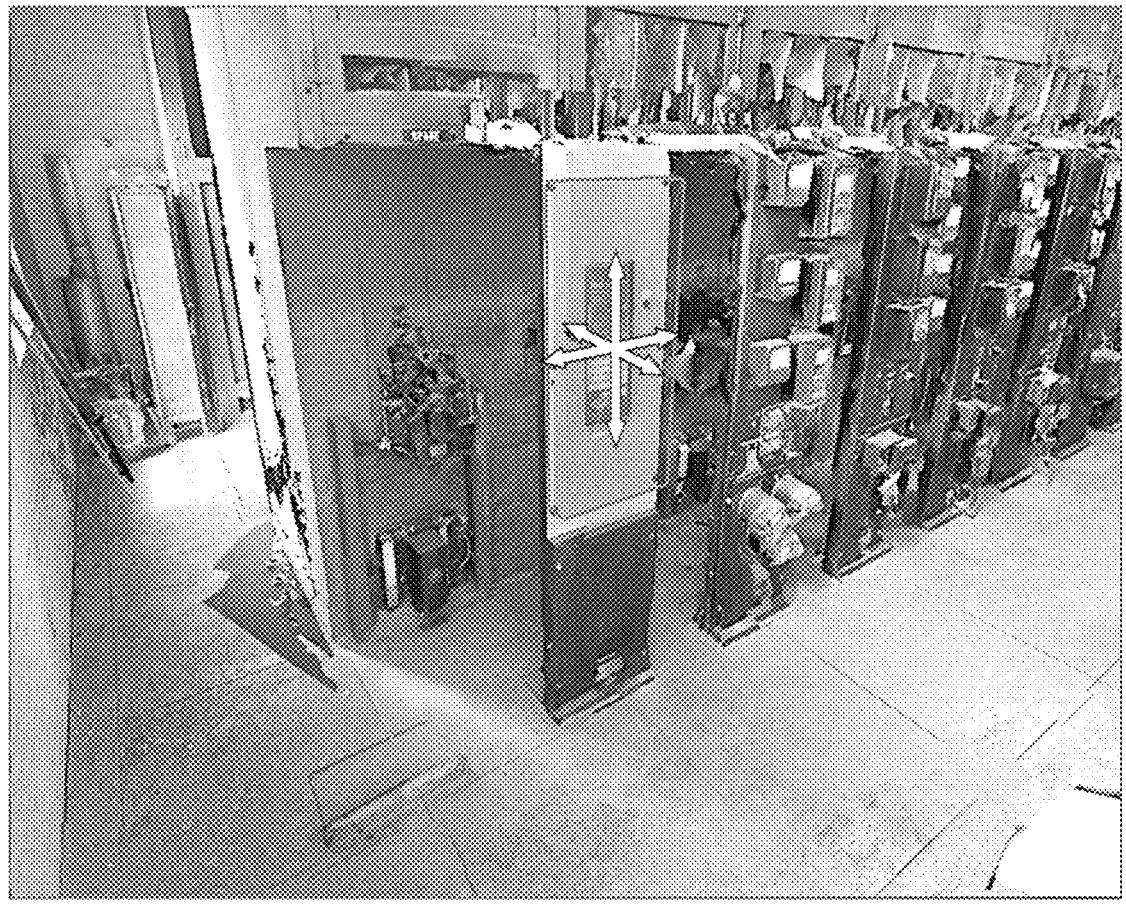
FIGS. 23A-23G together depict an exemplary object recognition scenario positioning a 3D object from a library in a scene, in accordance with various embodiments of the present disclosure.
Figure 23B:
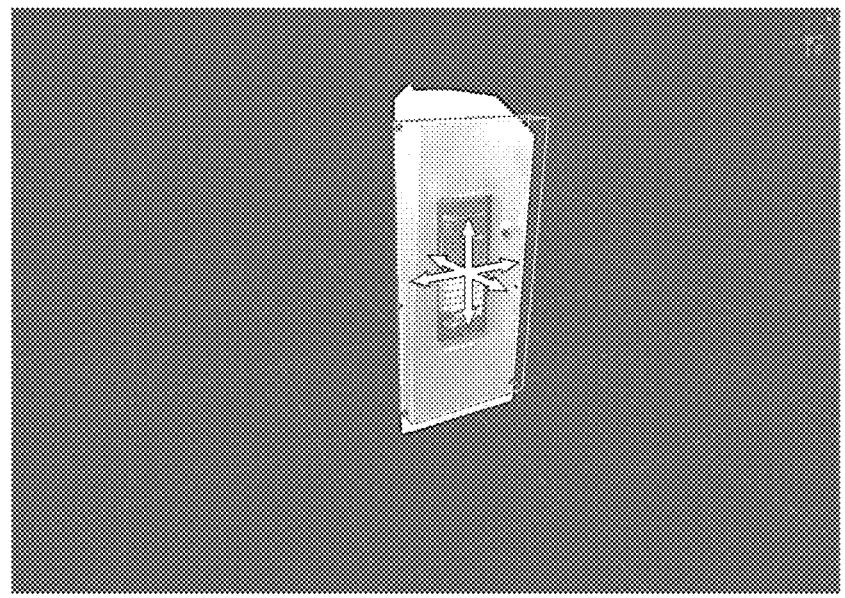
Figure 23C:
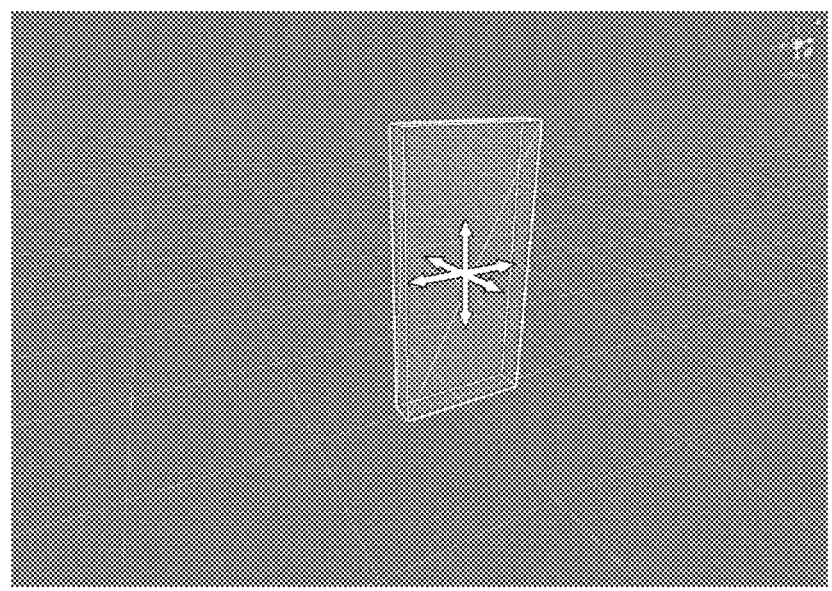
Figure 23D:
Figure 23E:
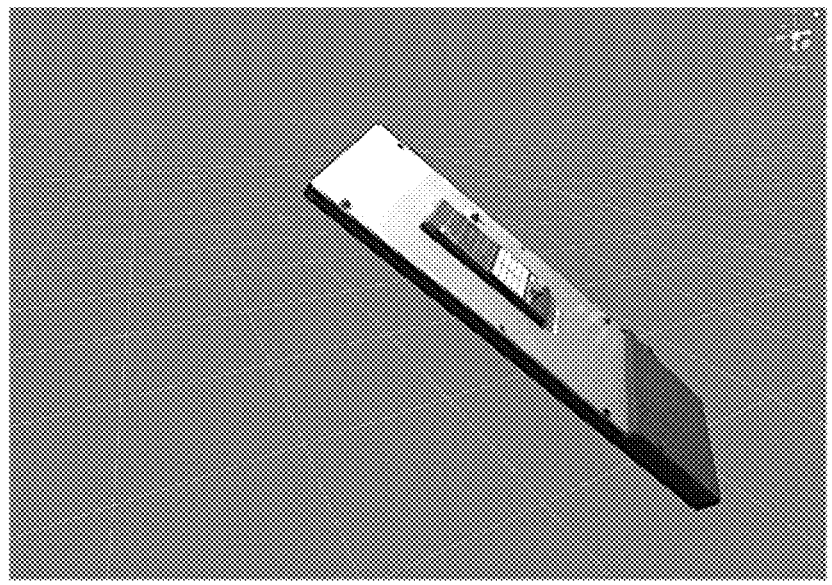
Figure 23F:
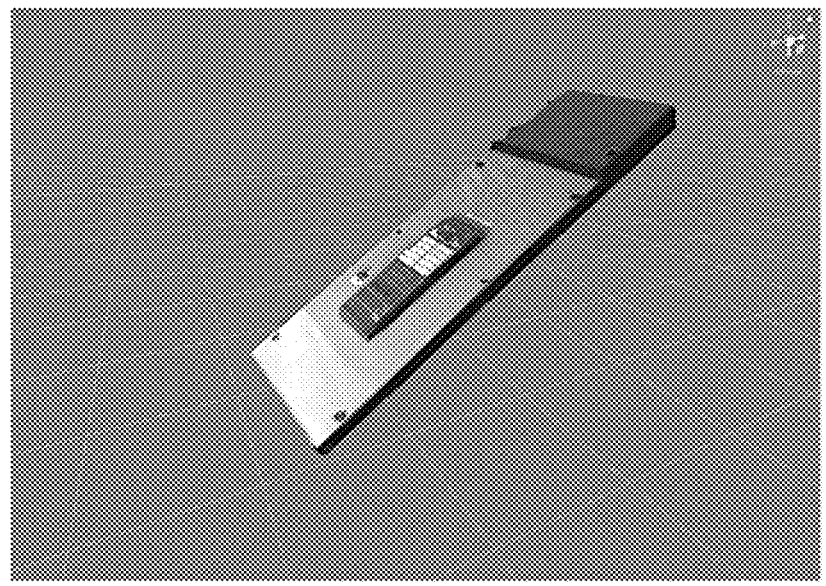
Figure 23G:
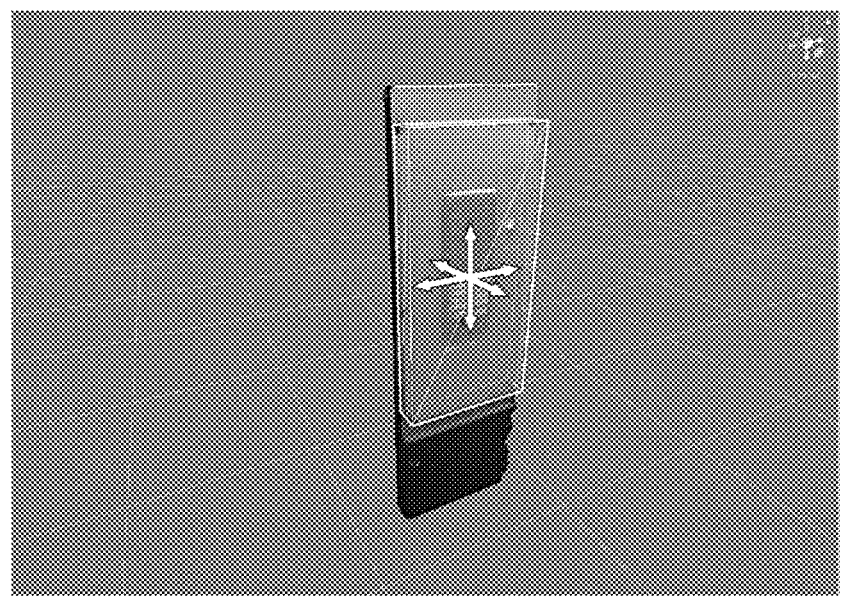
Figure 24A:
FIGS. 24A-24E together depict an exemplary object recognition scenario augmenting a 3D scene with a 3D object model, in accordance with various embodiments of the present disclosure.
Figure 24B:
Figure 24C:
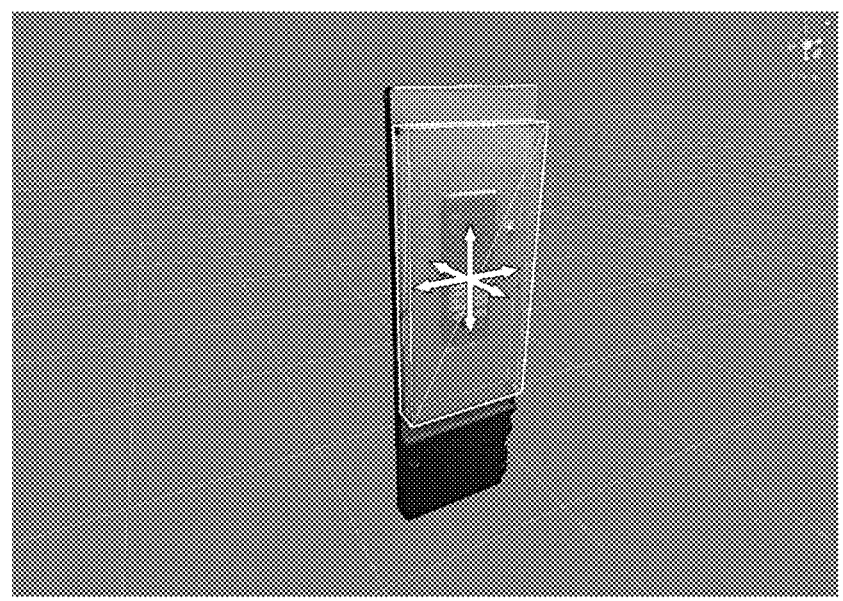
Figure 24D:
Figure 24E:

FIGS. 22A-22C together depict an exemplary object recognition scenario estimating a 3D object from a 2D picture given an object recognized in multiple pictures with apredetermined camera pose, in accordance with various embodiments of the present disclosure. In the depicted example, given an object recognized in multiple pictures with known/estimated camera pose, an exemplary Object Recognition Engine estimates the position/outline of the 3D target object and recognizes the object outline. FIG. 22A depicts the picture of the target object recognized by an exemplary Object Recognition Engine, with the recognized object outline illustrated. FIG. 22B depicts another picture of the target object recognized by the exemplary Object Recognition Engine in a different orientation, with the recognized object outline illustrated. In FIG. 23C, an exemplary outline is placed in the scene, highlighting the section of the 3D environment where the object was recognized. In an illustrative example, the placement of the outline in the scene is related to the placement of the recognized 2D object in the provided pictures.

FIGS. 23A-23G together depict an exemplary object recognition scenario positioning a 3D object from a library in a scene, in accordance with various embodiments of the present disclosure. In the illustrated example, an exemplary Object Recognition Engine Positions a 3D Object from a library inside the recognized Outline of a target object, based on Duplicating the outline of the object recognized within the scene/environment, and Placing the 3D object within the corresponding position inside the outline.

FIGS. 24A-24E together depict an exemplary object recognition scenario augmenting a 3D scene with a 3D object model, in accordance with various embodiments of the present disclosure. In the illustrated example, an exemplary Object Recognition Engine Augments a 3D environment (and/or real scene) with 3D object model. In various embodiments, the exemplary Object Recognition Engine may replace a 3D object model in a 3D environment (and/or real scene).

Figure 25:
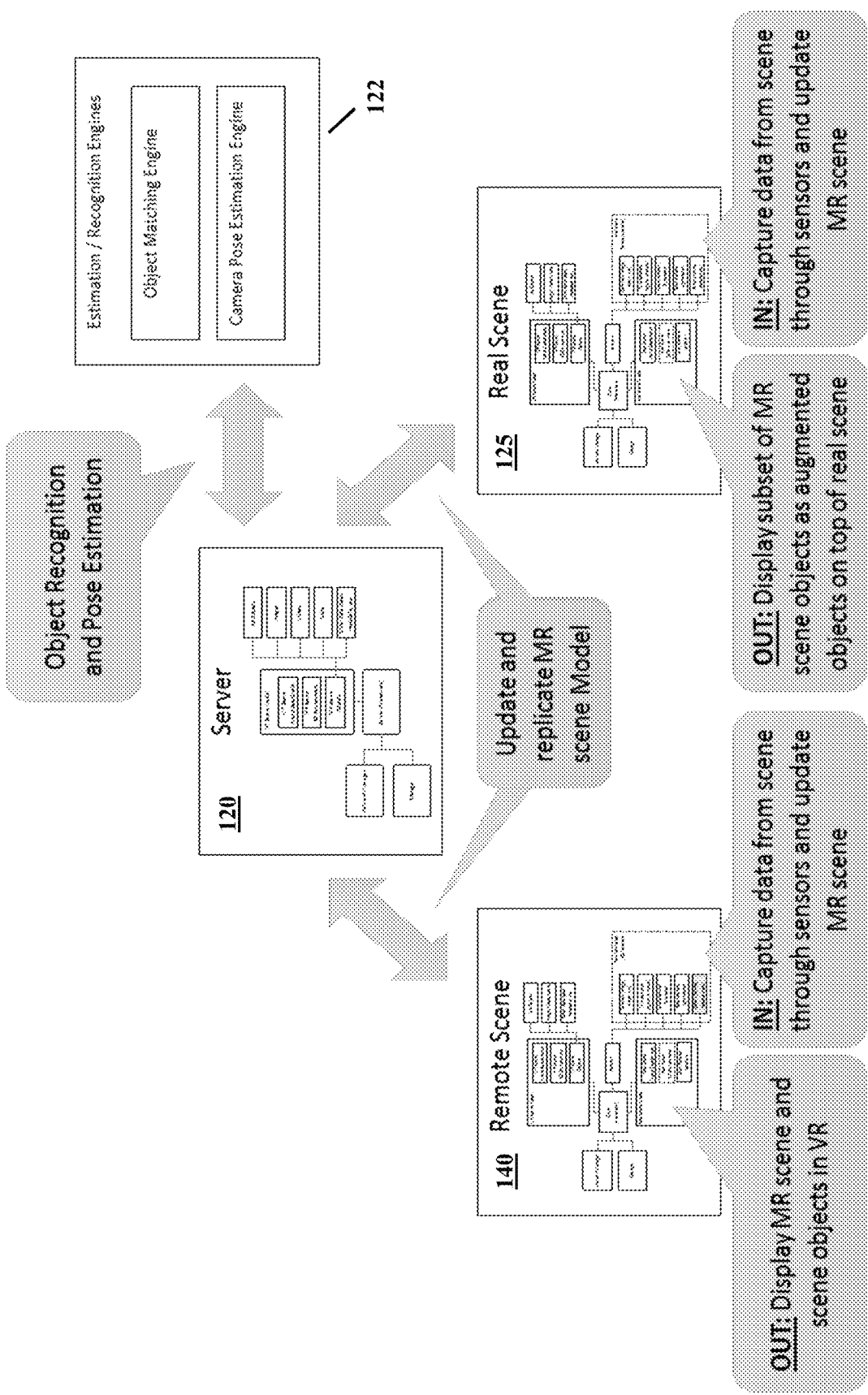
FIG. 25 depicts an exemplary collaboration system architectural design, in accordance with various embodiments of the present disclosure.

FIG. 25 depicts an exemplary collaboration system architectural design, in accordance with various embodiments of the present disclosure.

Figure 26:
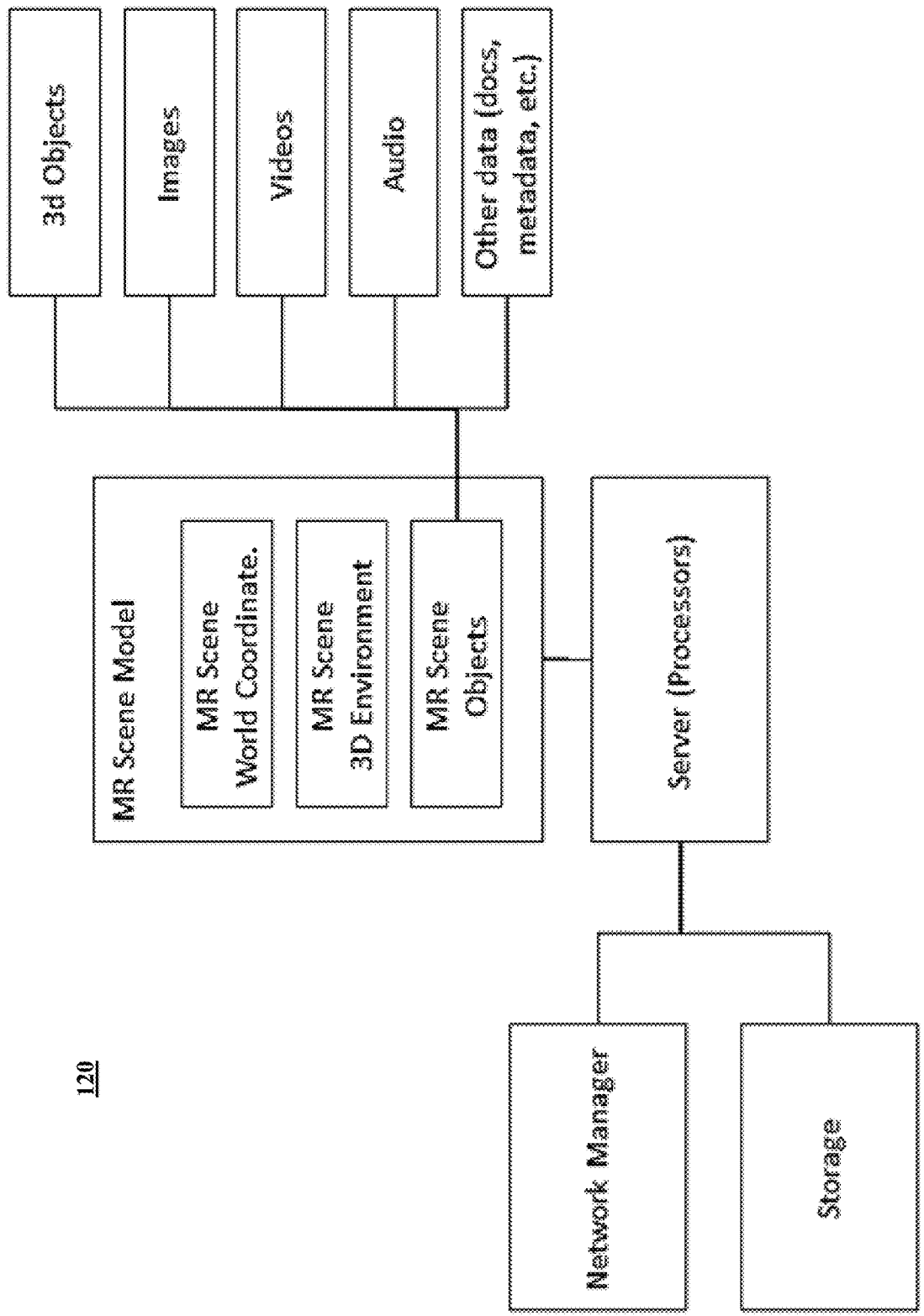
FIG. 26 depicts an exemplary collaboration server system design, in accordance with various embodiments of the present disclosure.

FIG. 26 depicts an exemplary collaboration server system design, in accordance with various embodiments of the present disclosure.

Figure 27:
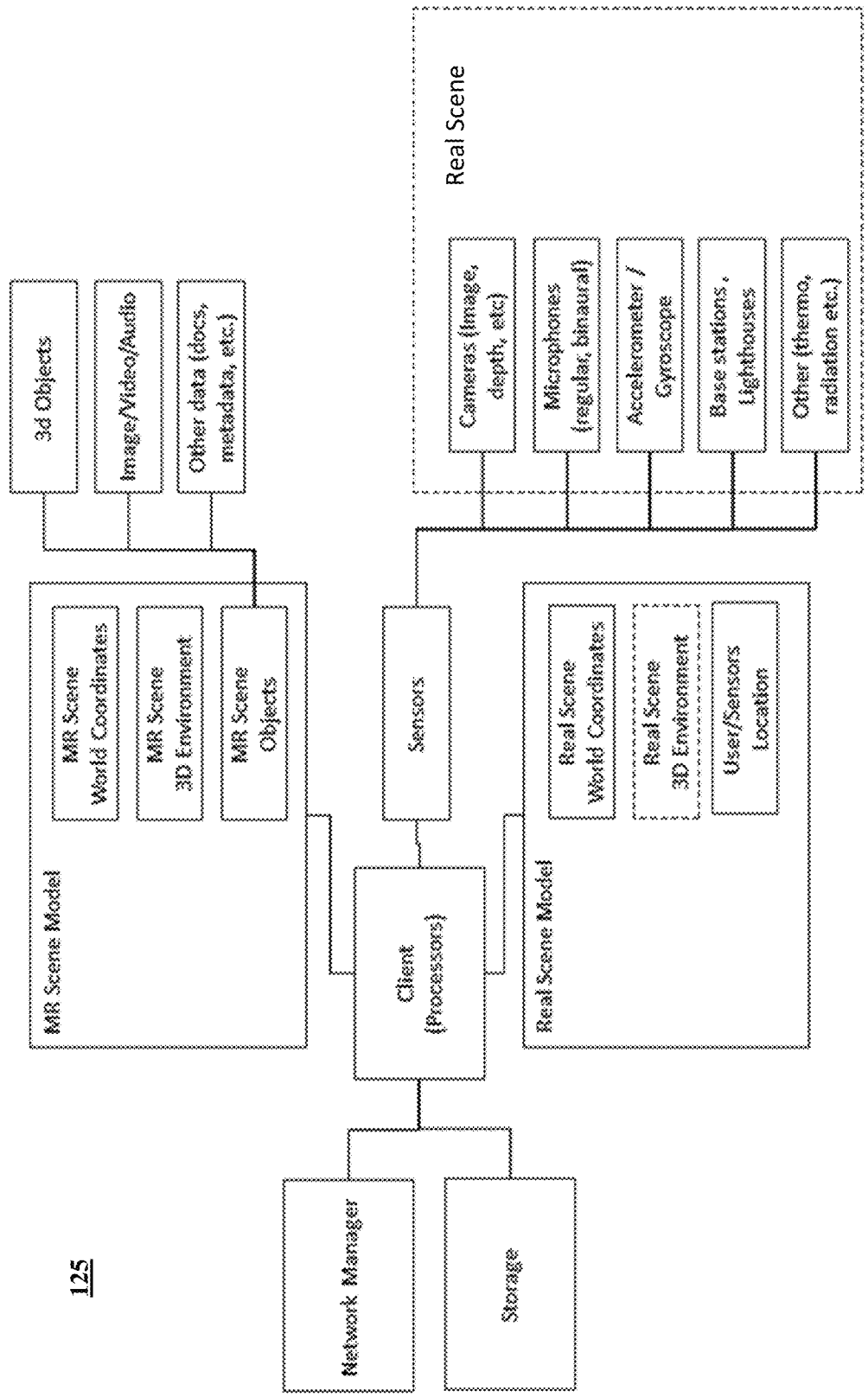
FIG. 27 depicts an exemplary client virtual reality device design, in accordance with various embodiments of the present disclosure.

FIG. 27 depicts an exemplary client virtual reality device design, in accordance with various embodiments of the present disclosure.

Figure 28:
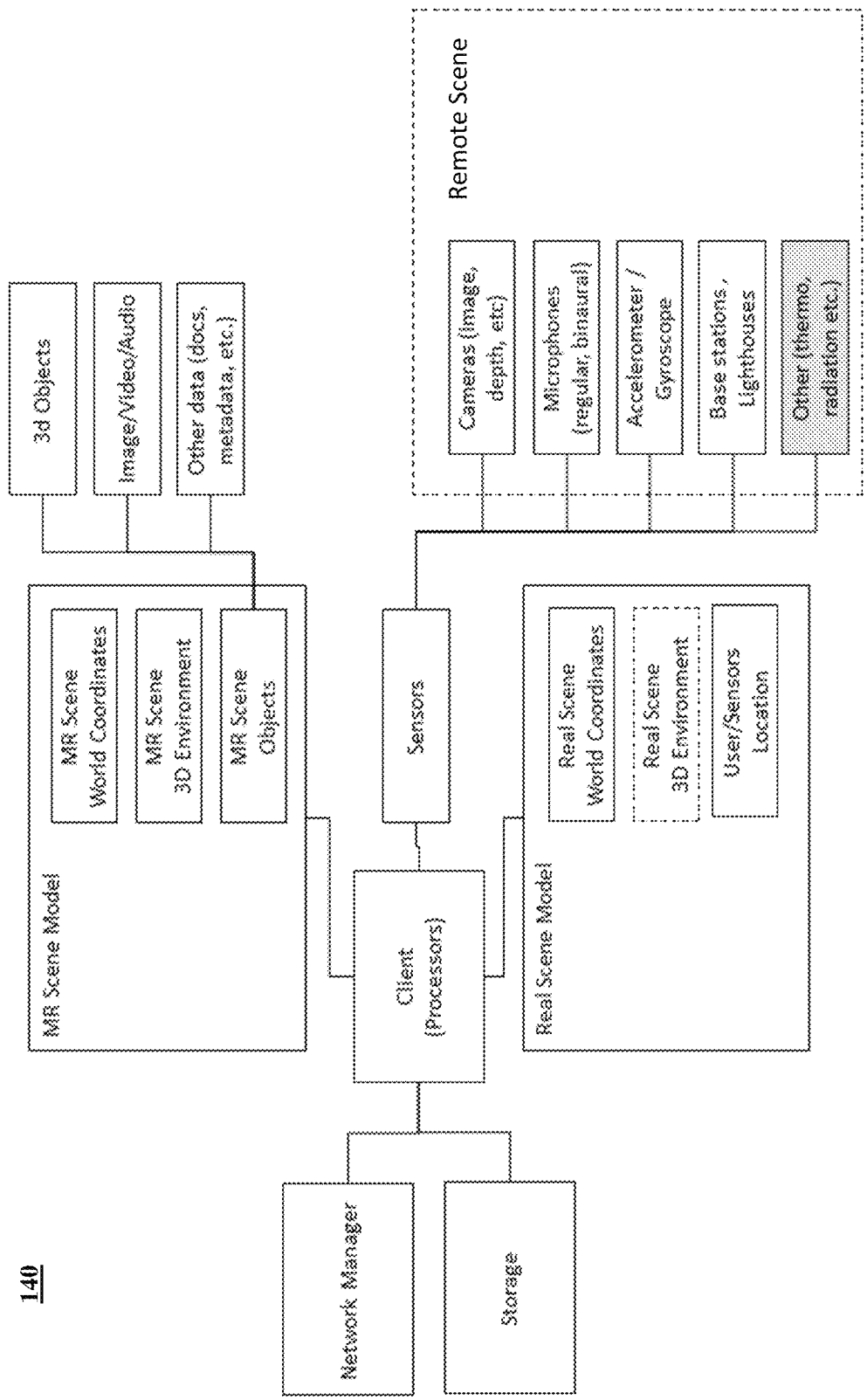
FIG. 28 depicts an exemplary remote client virtual reality device design, in accordance with various embodiments of the present disclosure.

FIG. 28 depicts an exemplary remote client virtual reality device design, in accordance with various embodiments of the present disclosure.

Figure 29:
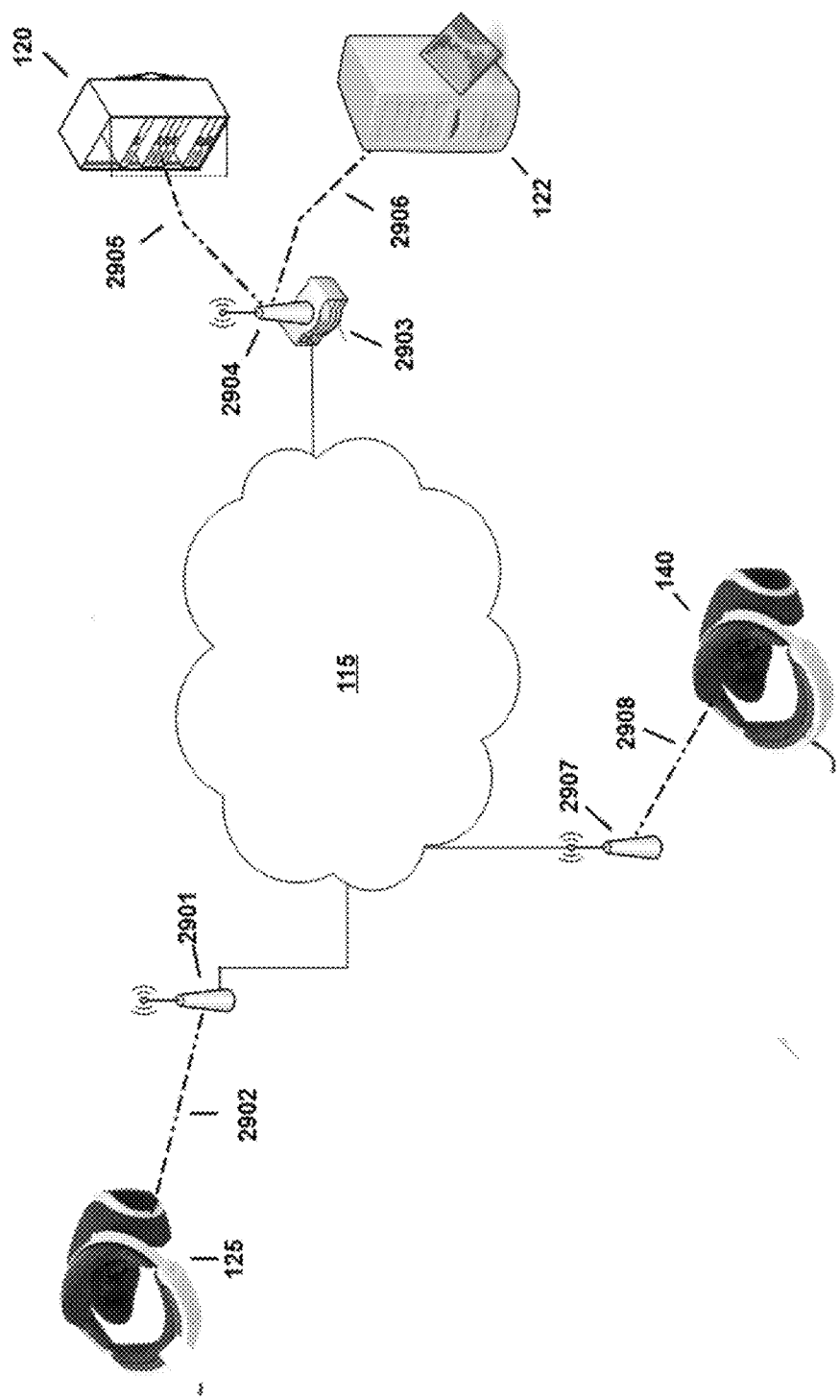
FIG. 29 depicts a schematic view of an exemplary collaboration network configured to provide immersive remote collaboration.

FIG. 29 depicts a schematic view of an exemplary collaboration network configured to provide immersive remote collaboration. In FIG. 29, according to an exemplary embodiment of the present disclosure, data may be transferred to the system, stored by the system and/or transferred by the system to users of the system across local area networks (LANs) or wide area networks (WANs). In accordance with various embodiments, the system may include numerous servers, data mining hardware, computing devices, or any combination thereof, communicatively connected across one or more LANs and/or WANs. One of ordinary skill in the art would appreciate that there are numerous manners in which the system could be configured, and embodiments of the present disclosure are contemplated for use with any configuration. Referring to FIG. 29, a schematic overview of a system in accordance with an embodiment of the present disclosure is shown. In the depicted embodiment, an exemplary system includes the exemplary client virtual reality device 125 configured to share an immersive VRE simulation of an experience at the client virtual reality device 125 location. In the illustrated embodiment, the remote client virtual reality device 140 is configured to provide an immersive VRE simulation of a shared experience remote from the client virtual reality device 140. In the depicted embodiment, the collaboration server 120 is a computing device configured to process, analyze, store, and automatically update MR scene models and related data. In the depicted example, the backend engine 122 is a computing device configured with an object matching engine and camera pose estimation engine. In the illustrated embodiment, the client virtual reality device 125 is communicatively and operably coupled by the wireless access point 2901 and the wireless communication link 2902 with the network cloud 115 (e.g., the Internet) to send, retrieve, or manipulate information in storage devices, servers, and network components, and exchange information with various other systems and devices via the network cloud 115. In the depicted example, the illustrative system includes the router 2903 configured to communicatively and operably couple the collaboration server 120 to the network cloud 115 via the wireless access point 2904 and the wireless communication link 2905. In the illustrated example, the router 2903 also communicatively and operably couples the backend engine 122 to the network cloud 115 via the wireless access point 2904 and the wireless communication link 2906. In the depicted embodiment, the remote client virtual reality device 140 is communicatively and operably coupled with the network cloud 115 by the wireless access point 2907 and the wireless communication link 2908. In various examples, one or more of: the client virtual reality device 125, the remote client virtual reality device 140, the collaboration server 120, or the backend engine 122 may include an application server configured to store or provide access to information used by the system. In various embodiments, one or more application server may retrieve or manipulate information in storage devices and exchange information through the network cloud 115. In some examples, one or more of: the client virtual reality device 125, the remote client virtual reality device 140, the collaboration server 120, or the backend engine 122 may include various applications implemented as processor-executable program instructions. In some embodiments, various processor-executable program instruction applications may also be used to manipulate information stored remotely and process and analyze data stored remotely across the network cloud 115 (e.g., the Internet). According to an exemplary embodiment, as shown in FIG. 29, exchange of information through the network cloud 115 or other network may occur through one or more high speed connections. In some cases, high speed connections may be over-the-air (OTA), passed through networked systems, directly connected to one or more network cloud 115 or directed through one or more router. In various implementations, one or more router may be optional, and other embodiments in accordance with the present disclosure may or may not utilize one or more router. One of ordinary skill in the art would appreciate that there are numerous ways any or all of the depicted devices may connect with the network cloud 115 for the exchange of information, and embodiments of the present disclosure are contemplated for use with any method for connecting to networks for the purpose of exchanging information. Further, while this application may refer to high speed connections, embodiments of the present disclosure may be utilized with connections of any useful speed. In an illustrative example, components or modules of the system may connect to one or more of: the client virtual reality device 125, the remote client virtual reality device 140, the collaboration server 120, or the backend engine 122 via the network cloud 115 or other network in numerous ways. For instance, a component or module may connect to the system i) through a computing device directly connected to the network cloud 115, ii) through a computing device connected to the network cloud 115 through a routing device, or iii) through a computing device connected to a wireless access point. One of ordinary skill in the art will appreciate that there are numerous ways that a component or module may connect to a device via network cloud 115 or other network, and embodiments of the present disclosure are contemplated for use with any network connection method. In various examples, one or more of: the client virtual reality device 125, the remote client virtual reality device 140, the collaboration server 120, or the backend engine 122 could include a personal computing device, such as a smartphone, tablet computer, wearable computing device, cloud-based computing device, virtual computing device, or desktop computing device, configured to operate as a host for other computing devices to connect to. In some examples, one or more communications means of the system may be any circuitry or other means for communicating data over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Figure 30:
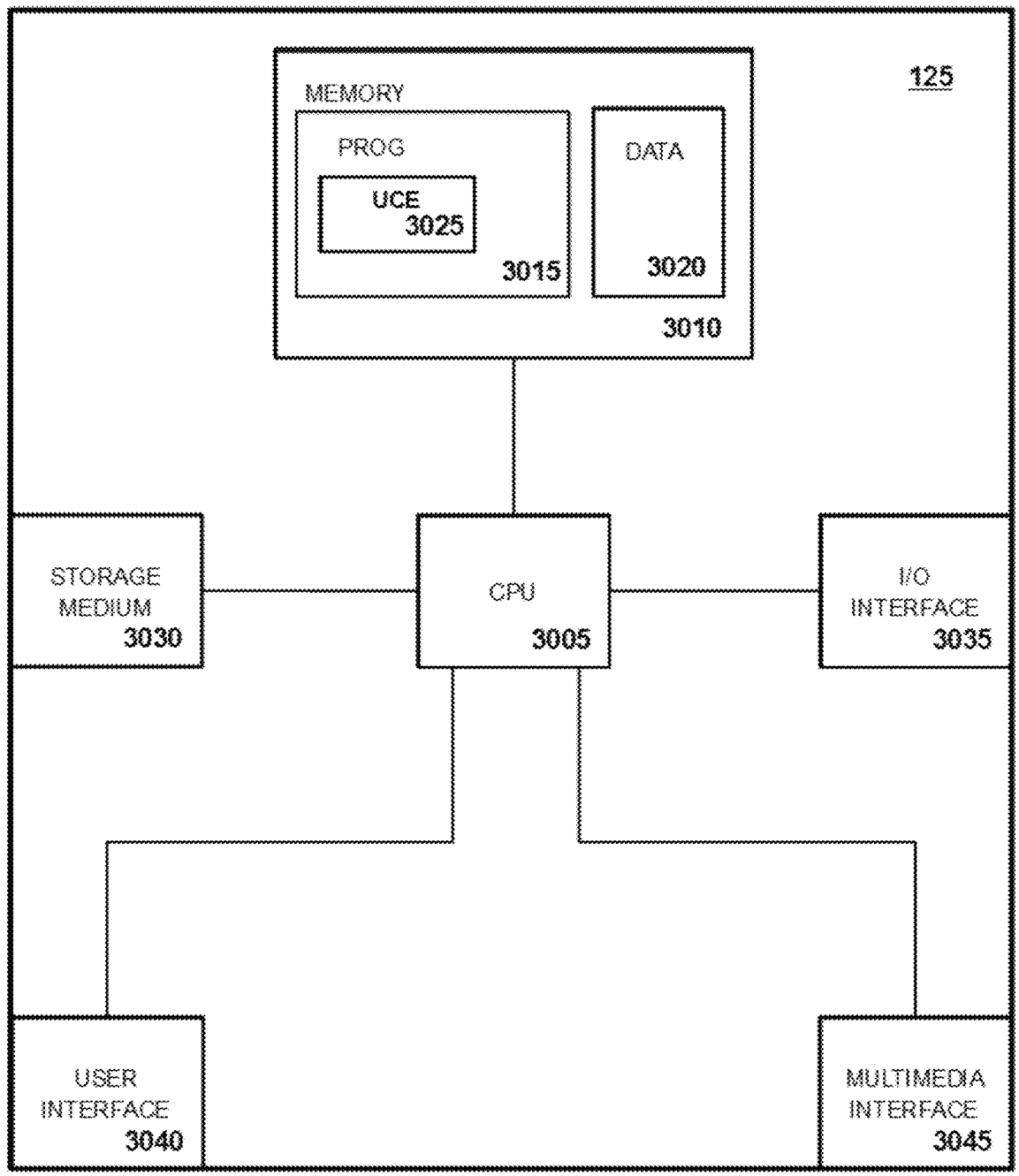
FIG. 30 depicts a structural view of an exemplary virtual reality device configured to provide immersive remote collaboration.

FIG. 30 depicts a structural view of an exemplary virtual reality device configured to provide immersive remote collaboration. In FIG. 30, the block diagram of the exemplary client virtual reality device 125 includes processor 3005 and memory 3010. In an illustrative example, the structural view of the exemplary client virtual reality device 125 depicted in FIG. 30 may also be understood as an exemplary implementation of an embodiment remote client virtual reality device 140, depicted in at least FIG. 1 and FIG. 29. In the depicted embodiment, the processor 3005 is in electrical communication with the memory 3010. The depicted memory 3010 includes program memory 3015 and data memory 3020. The depicted program memory 3015 includes processor-executable program instructions implementing the UCE (User Collaboration Engine) 3025. In some embodiments, the illustrated program memory 3015 may include processor-executable program instructions configured to implement an OS (Operating System). In various embodiments, the OS may include processor executable program instructions configured to implement various operations when executed by the processor 3005. In some embodiments, the OS may be omitted. In some embodiments, the illustrated program memory 3015 may include processor-executable program instructions configured to implement various Application Software. In various embodiments, the Application Software may include processor executable program instructions configured to implement various operations when executed by the processor 3005. In some embodiments, the Application Software may be omitted. In the depicted embodiment, the processor 3005 is communicatively and operably coupled with the storage medium 3030. In the depicted embodiment, the processor 3005 is communicatively and operably coupled with the I/O (Input/Output) interface 3035. In the depicted embodiment, the I/O module 3035 includes a network interface. In various implementations, the network interface may be a wireless network interface. In some designs, the network interface may be a Wi-Fi interface. In some embodiments, the network interface may be a Bluetooth interface. In an illustrative example, the client virtual reality device 125 may include more than one network interface. In some designs, the network interface may be a wireline interface. In some designs, the network interface may be omitted. In the depicted embodiment, the processor 3005 is communicatively and operably coupled with the user interface 3040. In various implementations, the user interface 3040 may be adapted to receive input from a user or send output to a user. In some embodiments, the user interface 3040 may be adapted to an input-only or output-only user interface mode. In various implementations, the user interface 3040 may include an imaging display. In some embodiments, the user interface 3040 may include an audio interface. In some designs, the audio interface may include an audio input. In various designs, the audio interface may include an audio output. In some implementations, the user interface 3040 may be touch-sensitive. In some designs, the client virtual reality device 125 may include an accelerometer operably coupled with the processor 3005. In various embodiments, the client virtual reality device 125 may include a GPS module operably coupled with the processor 3005. In an illustrative example, the client virtual reality device 125 may include a magnetometer operably coupled with the processor 3005. In some designs, the client virtual reality device 125 may include a depth sensor operably coupled with the processor 3005. In some implementations, the client virtual reality device 125 may include a time of flight image sensor operably coupled with the processor 3005. In some embodiments, the user interface 3040 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 3005 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 3010 may contain processor executable program instruction modules configurable by the processor 3005 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 3005 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 3010 may contain processor executable program instruction modules configurable by the processor 3005 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted embodiment, the processor 3005 is communicatively and operably coupled with the multimedia interface 3045. In the illustrated embodiment, the multimedia interface 3045 includes interfaces adapted to input and output of audio, video, and image data. In some embodiments, the multimedia interface 3045 may include one or more still image camera or video camera. In various designs, the multimedia interface 3045 may include one or more microphone. In some implementations, the multimedia interface 3045 may include a wireless communication means configured to operably and communicatively couple the multimedia interface 3045 with a multimedia data source or sink external to the client virtual reality device 125. In various designs, the multimedia interface 3045 may include interfaces adapted to send, receive, or process encoded audio or video. In various embodiments, the multimedia interface 3045 may include one or more video, image, or audio encoder. In various designs, the multimedia interface 3045 may include one or more video, image, or audio decoder. In various implementations, the multimedia interface 3045 may include interfaces adapted to send, receive, or process one or more multimedia stream. In various implementations, the multimedia interface 3045 may include a GPU. In some embodiments, the multimedia interface 3045 may be omitted. Useful examples of the illustrated client virtual reality device 125 include, but are not limited to, personal computers, servers, tablet PCs, smartphones, or other computing devices. In some embodiments, multiple client virtual reality device 125 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 29 description. In some embodiments, an exemplary client virtual reality device 125 design may be realized in a distributed implementation. In an illustrative example, some client virtual reality device 125 designs may be partitioned between a client device, such as, for example, a phone, and, a more powerful server system, as depicted, for example, in FIG. 29. In various designs, a client virtual reality device 125 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some features. However, in some embodiments, an exemplary client virtual reality device 125 may be configured to operate on a device with less processing power, such as, for example, various gaming consoles, which may not have sufficient processor power, or a suitable CPU architecture, to adequately support client virtual reality device 125. Various embodiment designs configured to operate on a such a device with reduced processor power may work in conjunction with a more powerful server system.

Figure 31:
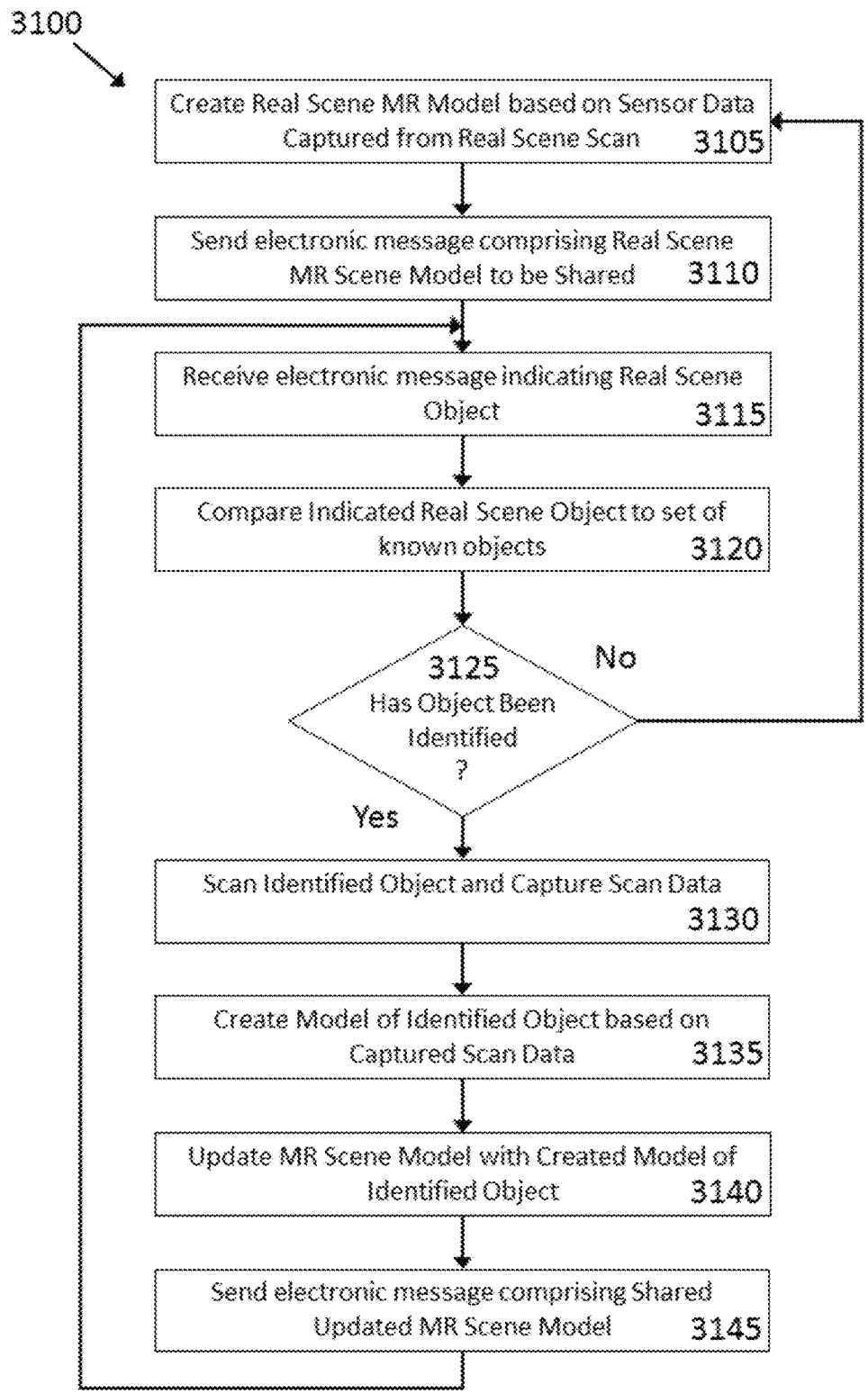
FIG. 31 depicts an exemplary process flow of an embodiment UCE (User Collaboration Engine).

FIG. 31 depicts an exemplary process flow of an embodiment UCE (User Collaboration Engine). The method depicted in FIG. 31 is given from the perspective of the UCE 3025 implemented via processor-executable program instructions executing on the client virtual reality device 125 processor 3005, depicted in FIG. 30. In various embodiments, the method depicted in FIG. 31 may also be understood as from the perspective of a UCE (User Collaboration Engine) implemented via processor-executable program instructions executing on a processor configured in an exemplary remote client virtual reality device 140, depicted in at least FIG. 1 and FIG. 29. In the illustrated embodiment, the UCE 3025 executes as program instructions on the processor 3005 configured in the UCE 3025 host client virtual reality device 125, depicted in at least FIG. 1 and FIG. 29. In some embodiments, the UCE 3025 may execute as a cloud service communicatively and operatively coupled with system services, hardware resources, or software elements local to and/or external to the UCE 3025 host client virtual reality device 125. The depicted method 3100 begins at step 3105 with the processor 3005 creating a real scene MR model to be shared based on sensor data captured from a real scene scan. Then, the method continues at step 3110 with the processor 3005 sending an electronic message comprising the real scene MR scene model to be shared. Then, the method continues at step 3115 with the processor 3005 receiving an electronic message indicating a real scene object to be identified. Then, the method continues at step 3120 with the processor 3005 comparing the indicated real scene object to a set of known objects. Then, the method continues at step 3125 with the processor 3005 performing a test to determine if the indicated object has been identified, based on the comparison performed by the processor 3005 at step 3125. Upon a determination by the processor 3005 at step 3125 that the indicated object has not been identified, the method continues at step 3105 with the processor 3005 creating a real scene MR model to be shared based on sensor data captured from a real scene scan. Upon a determination by the processor 3005 at step 3125 that the indicated object has been identified, the method continues at step 3130 with the processor 3005 scanning the identified object and capturing the scan data. Then, the method continues at step 3135 with the processor 3005 creating a model of the identified object based on the captured scan data. Then, the method continues at step 3140 with the processor updating the MR scene model with the created model of the identified object. Then, the method continues at step 3145 with the processor 3005 sending an electronic message comprising the shared updated MR scene model, and the method continues at step 3115 with the processor 3005 receiving an electronic message indicating a real scene object to be identified.

Although various embodiments have been described with reference to the Figures, other embodiments are possible. In an illustrative example, an Environment Manager allows users to change the display mode of the environment. The current behavior of the Environment Manager UI panel is that each press on the "Change" button will toggle the current display mode to the next available one. The number of available display option changes depending on how many assets are provided to be displayed as environment. In the Admin Console, at most one mesh and one point cloud can be set as environment. If the user has access to Mixed reality features and is authorized to use the MeshScanningTool, they will also be able to register a temporary mesh to the environment as a separate display mode (ie. it will not replace the display of any mesh that is assigned through the admin console). In some embodiments, the list of environment display modes may include:
  None
  Mesh
  Point cloud with precise points
  Point cloud with filled points
  Scanned Mesh In various embodiments, an Environment Manager offers users flexibility in how they want the scene environment to be presented. Since the environment directly correlates with a user's immersion, it makes sense for the user to configure the best presentation of the environment under any situation.

In some implementations, a Wristwatch provides a way to display ToolViews. The Wristwatch allocates buttons for a defined list of tools. When that button is pressed, the ToolViews are toggled visible/not visible. The Wristwatch tracks a user's hand and can be maximized/minimized. For example, the Wristwatch is a quick way to access all of the functionality available to the user. It tracks the user's wrist so that the user and the Wristwatch are never separated.

In an illustrative example, some Tools have associated Tool Panels. These panels contain buttons that provide additional functionality for a Tool. For example, the Handwriting Tool uses a Tool Panel to let the user change the color and size of their brush stroke. The Dashboard is the frame on which the Tool Panels appear. The Dashboard allows a user to scroll through all the Tool Panels. The Dashboard can be minimized. The Dashboard is dismissed if the same Tool Panel is Displayed (i.e. it works as a toggle) and is close to the user (i.e. being far away will summon the panel, not close it). The Dashboard will move to a user when a panel is selected if it is too far away. In some embodiments, a Tool Panel will set the Dashboard visible when needed. The Dashboard may be a centralized UI container. Keeping only one panel active in the scene reduces clutter. A Dashboard could also be attached to objects to act as a menu.

In an illustrative example, a mesh scanning tool may permit users to reconstruct 3D meshes of their real environment using the two cameras located at the front of the Vive Pro headset. In some examples, a Mesh Scanning Tool Panel contains options to Start a Scan, Stop and Discard a Scan, and Stop and Save a Scan. Once a scan has started, the user can visualize a green mesh wireframe drawn on top of their live camera feed, which serves as a real-time preview of the reconstructed mesh. Once the user is satisfied with the scan, the user can press Stop and Save a Scan to save the mesh locally as well as uploading it to the platform. Note that in MR mode, the user will never be able to visualize the mesh that they have scanned, but the other non-MR users will be able to see the scanned mesh immediately after the mesh gets uploaded from the MR user's session.

In various designs, an exemplary Mesh Scanning Tool may only be available to use in MR mode. In some embodiments, his tool may use Vive Pro's SRWorks SDK in order to access its 3D mesh reconstruction module. Once a mesh is generated, it will then be registered as a "scanned mesh" for the current scene's environment, which counts as an independent environment display mode. In some embodiments, users will be able to use this tool while they are immersed in MR. In some embodiments, the real-time mesh scanning tool demonstrates another possibility of generating a VR scene's environment. This is comparable to the real environment mesh scanning capability on the iOS application. The real-time scanned meshes can also be used as data input for many of the platform's computer vision algorithms which attempt to produce precise alignment between the virtual scanned mesh environment and the real world environment.

In various scenarios exemplary of various embodiments' design, when an AR/MR user starts their session, they are at some arbitrary positional/rotational offset to the VR Environment. For example, the MR/AR user may need to calibrate themselves to the VR environment, so that virtual objects appear in the correct place in the real world. In such a scenario, the VR user may first place the target calibration points at agreed upon locations in the VR Scene. For MR/AR, the user places transient, source points at that same points in the MR/AR world. MR/AR users can trigger the calibration to bring their local world into line with the VR world. MR users may place points with their hands, whereas AR users may position an iPhone at each calibration point. In various designs, a Calibration Tool may be available on the platforms, but the function may depend on the platform. For example, the IOSAvatar allows other users to see where an AR user is in the Scene. Some implementations may include a UI designed for the Calibrator. In some embodiments, a full affine transformation could be calculated using 4 points, so we no longer have to make assumptions about gravity.

In an illustrative example, when an AR/MR user starts their session, they are at some arbitrary positional/rotational offset to the VR Environment. For example, the MR/AR user may need to calibrate themselves to the VR environment, so that virtual objects appear in the correct place in the real world. The VR user may first place the target calibration points at agreed upon locations in the VR Scene. For MR/AR, the user may place transient, source points at the same points in the MR/AR world.

In some embodiments, the points that the VR and MR users place are ARCalibrationPoints. ARCalibrationPoints are UsableObjects with metadata required to calculate the transformation. That metadata contains a point number—as the order of the points matters—and a label value of "Target" (VR) or "TransientSource" (MR). Users can use the ARC alibrationPointPlacerTool to create these points.

In various implementations, the MRCalibrationTool uses a Registration object to calculate the transformation. Given two or more equivalent points, we can calculate a transformation to apply to the parent of the MR/AR user that adjusts their play area to the VR world. We can assume the environment in VR is aligned with gravity pointing in the negative y-direction. In an illustrative example, we adjust the MR/AR user, and not the VR world, because: only one transformation needs to be applied, as opposed to transforming every other object in the scene, and if the VR scene is adjusted to an MR/AR user, if a second MR/AR user joins the scene, they will lose calibration.

In various designs, the Registration class is an abstract class. Its constructor takes two lists, one for the source (MR/AR points) and one for the destination points (VR). It provides an abstract method called Apply(Transform), which will apply the calculated transformation to the passed transform.

In some embodiments, GravityAssumedRegistration is a Registration object that provides the following implementation:
  1. We are given two sets of points S and T, where len(S) and len(T) are equal and both greater than or equal to 2. The point $S_n$ is equivalent to $T_n$; that is, they represent the same point in their environment, real or virtual.

2. Calculate the midpoint of the source and target points. The translation is the vector $T_{midpoint}-S_{midpoint}$.

Apply this translation to each source point. Calculate the angle between each source point $S_n$ and $T_n$. The rotation in the y-plane is the average of the calculated angles.

In an illustrative example, an ApexImageAsset is an ImageAsset that contains information about how the image was captured, such as the camera pose and field of view. An ApexImageArchetype is an ImageArchetype that uses camera information to pose the image within the 3D scene. The position or rotation of the camera pose cannot be changed. The actual projection of the image part of the ApexImage can be move along the z-axis relative to the camera pose. The further away from the camera pose the ApexImage is, the larger the scale.

A user can control the distance of the ApexImage in various ways, including: (1) Grab the frame. Moving further from the Apex (in its z-axis) will move the image further from the Apex and increase the scale; and, (2) Grab the Apex. In a similar interaction to the Hoverboard, the distance between the Apex and the controller acts as the velocity of the ApexImage. While grabbed, moving the controller away from the image will move it close to the Apex. Moving the controller towards the image will move the image away from the Apex. In various implementations, an ApexImage maintains its position and rotation. In an illustrative example, an embodiment ApexImage may be designed for images where pose is important to the understanding of the image. In various designs, the scale/z-position of an embodiment ApexImage may be manipulated without changing the properties of the image (i.e. it is zoom-invariant).

In some embodiments, an Image Camera allows users to take photographs of the virtual world and create Image Assets. In an illustrative example, Using the Image Camera will capture an image, create an Image Asset and spawn an Apex Image Archetype. The Apex of the image is the camera pose when the image was taken. In various designs, an Image Camera may be used to create images of the virtual world for export. This can be used like a screenshot—to capture work done in VR and attach it to a document. For example, adding user-written labels to images may allow for easier identification.

In an illustrative example, The ApexImageArchetype is linked to an ApexImageAsset. The image plane with a picture frame is placed some distance d away along the z-axis relative to the Apex. d is determined by the user via controllers. Using the FOV (with orientation) and the Apex transform, we calculate the scale of the image in the following way:

$$s = 2*u*d*\arctan\left(\frac{\alpha}{2}\right)$$

where:

s is the distance from the top to bottom or left to right of the image, depending on the FOV orientation.

u is an empirically found scale factor. u was found to be 1.2f. It is likely some scaling is accidentally taking place, and this factor is undoing that scaling. Finding the cause of this offset is detailed in the Issue Tracker.

d is the distance from the Apex to the Image.

α is the field of view, in radians.

The distance s is set as the width/height, and then the height/width is set using the aspect ratio.

In some embodiments, ApexImageArchetypes will create zero to many ApexImageDistanceControllers upon its creation, and link/be linked to these controllers. The controllers are separate UsableObjects as they need to use the interaction system (OnTouch, OnGrab etc.) independently of the ApexImage and of each other.

In an illustrative example, an ApexImageDistanceController is an abstract UsableObject. It manages the interaction events, UI widget and duplication controls for an ApexImage. It requires subclasses to implement ApplyDistance(bool writeToDatabase) and OnResetToPoint( ) The ApexImageApexController can be grabbed at the Apex. ApplyDistance will apply the z-distance between the controller and the Apex as a 'velocity' to the ApexImage. The ApexImageFrameController can be grabbed at the frame. ApplyDistance will move the ApexImage to the controller's z-position relative to the Apex Various embodiments may include an Image Capture Tool. In an illustrative example, to properly set up the Image Capture Tool for the MR user, the user must first enter the Dressing Room and identify the Vive Tracker that will track the physical pose of the iOS device. After the Vive Tracker is set up, the user may exit the Dressing Room and enter MR.

In some examples, in addition to setting up the Vive Tracker, on the iOS image capture client, the user must also log in with the same account as the account logged in on the MR client session. Then, on the iOS image capture client, the user must also enter the same scene as the one that the MR client has joined. Note that the MR client must have already joined the scene before the iOS image capture client can enter the scene. Once the iOS image capture client successfully joins the networked session, the iOS image capture tool is ready to be used in the MR client session.

In an example illustrative of various embodiment Image Capture Tool designs, ControlDeviceLocator maintains references to the Vive Tracker that has been assigned for the IOS Image Capture Tool in the Dressing room. ViveServiceLocator maintains the connectivity states of Vive Trackers. IOSServiceLocator maintains reference to the singleton component IOS_NativeImageCapture, which only exists on the iOS image capture client. IOSServiceLocator also maintains reference to IOS_NativeImgCap_NetworkAgent, which exists in every session regardless of platform. IOS_NativeImageCapture is responsible for accessing the current camera frame from the iOS device and saving single frames as images in ".png" format. IOS_NativeImgCap_NetworkAgent is responsible for transmission of network messages between the PC client that is runs the MR mode and the iOS Image capture client that runs on an iOS mobile device. The IOS_Vive_ImageCaptureToolView will show its view only when it is visible and the tool is ready to be used. The tool view will be notified whenever its matching iOS image capture client has entered or exited the same network session. When the tool is ready to use and its user triggers the use action on the tool, the tool view will first create a new ApexImage asset and archetype with the most current pose of the Vive Tracker, then send an RPC to the iOS image capture client through the IOS_NativeImgCap_NetworkAgent. After the image has been captured and uploaded to the platform, the tool view will be notified that its asset is ready to download. The tool view will then attempt to update the states of the newly created apex image asset and archetype for them to be loaded and visible across the network session. The iOS Image Capture client currently filters out all NetworkableObject related network messages after it joins a network session. This is an intended behavior, as it prevents unnecessary visual information to be shown on the iOS Image Capture client.

In an illustrative example, an Enactment is a recreation of a scene in-motion. It may be thought of as a 3D video. Enactments can be used for instructional demonstration or to visualize working theories of a sequence of events. Enactments may have zero to many Tracks. There are two types of Tracks: Recording Tracks and Complete Tracks. Recording Tracks represent a UsableObject that the Enactment has selected to record. Complete Tracks represent an Actor and the associated data sequence; it is a Recording Track that has finished recording and been saved. An Actor is a duplicate of the recorded UsableObject, for the Enactment to use for replaying.

In various designs, an Enactment Manager may be a Tool that allows users to see all Enactments in a Scene. The user can choose an Enactment from the list, or create a new Enactment. This will bring up the TimelinePanel for that Enactment. In some designs, an Enactment may be Published from the Enactment Manager. This will mean it can no longer be edited by any users. The original, editable Enactment will be preserved. The Enactment Manager has the constraints for a tool. No Enactments need exist for the Manager to be present; the Manager can create Enactments. The Enactment Manager displays all Enactments in an easy-to-access place. Enactments can be totally hidden, so the manager is the only way (currently) to display the Enactment again.

In some embodiments, the TimelineToolPanel is a Tool Panel that displays every Track in an Enactment. It is similar to a timeline seen in video editing software. For example, users can scrub through the Timeline using the Cursor. Moving the Cursor to some time will show every Actor in their positions at that time. This gives a preview of the Enactment. This is analogous to scrubbing through a video and seeing a preview.

In an illustrative example, tracks can be discarded from the Timeline. Tracks can be split into two independent Tracks. Two tracks that belonged at some point to the same Track can be spliced back together. Tracks can be grouped together. Any operation applied to one Track in a group will be applied to all other Tracks in that group as well. The start time of a Track can be changed in the Timeline, by sliding the Track along the Timeline. Operations applied to Tracks can be undone. The Timescale of a Track can be changed (i.e. the Track can be replayed at a faster/slower speed).

In an example illustrative of various embodiments' design and usage, a Timeline also allows users to access Selection, Real-Time Recording, Keyframe Recording, Replaying and Display for the Enactment. The Enactment Manager opens a Timeline for a specific Enactment. The editing functionality is only available if the Enactment is not Published. The Timeline Panel acts as an overview and editor for the Enactment from inside VR.

In some examples, a Selection mode allows a user to add objects to an Enactment. A Selector will appear in a user's hand. A user can point the Selector at a UsableObject and use the Selector. If that UsableObject is not part of the Enactment, it is added to be recorded. If that UsableObject is in the Enactment already, it is removed.

In an illustrative example, select also provides a helper button, which adds the current user's Avatar to the Enactment. Otherwise, the user would have to point the Selector at themselves, which can be awkward. When an Avatar is added, that user's voice may also be recorded as part of the Enactment. The Selection mode is accessed from the Timeline, as long as the Enactment isn't Published. Selection provides an easy way to add objects to the Enactment. The Selector means users don't have to move to the objects they want to add.

In an illustrative example, Real Time Recording permits the user to begin the recording. All Recording Tracks will begin sampling their associated UsableObject. Movement and actions performed on/by the object will be recorded. In some examples, objects that are ready to be recorded are highlighted in amber. Objects that are being recorded are highlighted in red.

In some embodiments, user's voices will be recorded if their Avatars were added to the recording. The user can pause/resume the recording. The user can end the recording at any time. When the recording is ended, the Enactment will create Complete Tracks from the Recording Tracks. This will create Actors for each UsableObject and save the data sequence. In various examples, users can adjust the recording frame rate. In some designs, complete Tracks can be optionally replayed during this time. In some designs, the Real Time Record mode is accessed from the Timeline, as long as the Enactment isn't Published. Recording allows users to add new Tracks to an Enactment. Real-Time Recording allows users to act out a scene with their bodies/voice/props. Complete Tracks can be replayed so that new recorded Tracks match existing Tracks.

In an illustrative example, Replay permits a user to start replaying the Enactment. In various implementations, all (or some selected subset of) the Complete Tracks will replay. The Cursor will move across the Timeline to show progression. The Enactment will stop when all Complete Tracks have finished replaying, the user can pause/resume, stop, fastforward, rewind and skip ahead/back. The Replaying mode is accessed from the Timeline. Replaying allows users to view the Enactment. The full controls over the Replay allow for precise control, for editing or for analysis.

In an example illustrative of some embodiment implementations' design and usage, there are three Display Modes for the Enactment: Always, When Selected and When Replaying. Always will mean the Actors are always visible; When Selected means only when the Timeline for this Enactment is visible; When Replaying means only when the Enactment is replaying. In some designs, the Display panel may permit a user to toggle between these modes. The Display mode may be accessed from the Timeline. The different Display modes reduce clutter in the scene. A scene with many Enactments will soon start to look too busy to be useful. When Replaying is best for Published Enactments; When Selected is best for editing and recording; Always may be best for planning (or debugging).

In various exemplary scenarios, a user might want to show a video of an Enactment. This might be the case when the user has a large audience or no access to a VR headset. A user could use the VideoCameraTool independently of the Enactment to achieve this. Alternatively, a user may press "Add Camera Track" in the Timeline. A VideoCameraTool will appear in the scene. This camera is part of the Enactment. An associated CameraTrack will appear in the Timeline.

A user can define a path, using Keyframes, for the VideoCameraTool to follow for the course of the Enactment. These keyframes can be manipulated in world and in the Timeline just as any other Keyframe Track. In various embodiments, the camera can be set to record Only Actors, Actors and the Environment, or All Scene Objects. Additionally, when the camera is added to the Enactment, a Surveillance Screen will appear next to the Timeline. This will show the camera's video preview at its current state. Changing the camera's Keyframes or scrubbing through the Timeline—ie anything that changes the camera's state—will change the Surveillance Screen.

In some embodiments, more cameras may be added. In an illustrative example, for each camera that is added, another CameraTrack appears in the Timeline and another Surveillance Screen appears near the Timeline, and videos from one or more cameras can be exported at any time.

In an illustrative example of various embodiments' design and usage, an Enactment Minimap may be brought up from the Timeline. This Minimap shows Only Actors, Actors and the Environment, or All Scene Objects. A user can use this Minimap to get an overview of the Enactment they are creating. Any state changes in the scene will be reflected in the Minimap. Other Enactment-associated objects reflected in the Minimap include: Enactment Cameras, Actor's Translucent Paths, and, The Creating User.

An important challenge electric utilities will face in the foreseeable future is a workforce that is rapidly retiring and the resulting loss of institutional knowledge. This issue becomes more prominent given that the infrastructure itself is also aging. It will also create a vulnerability in the electric grid, especially during widespread power outages where recovery efforts rely on a team of well-trained and experienced personnel. Disasters like Hurricane Maria in Puerto Rico highlight how brittle infrastructure can be, as well as the strong dependency on knowledgeable workforce to successfully recuperate. The recovery time for this particular case is far from acceptable. During these critical situations, even if we had unlimited budget, it would be wastefully inefficient to have the small number of available experts physically travel to several locations to support recovery.

Over time, this issue will be exacerbated as the shortage of experienced personnel will continue to accentuate. According to the U.S. Department of Labor, as much as 50% of the country's electric utility workforce is expected to retire in the next five to 10 years. These workers acquired their skills over many years of observation and practice. They have learned by watching experienced people perform tasks and by practicing such task themselves. But when they leave, that critical experience and know-how will walk out the door and will not be easy to replace.

In addition, the makeup of the workforce is changing. Today's utilities are no longer likely to have staff that largely consist of employees with 30-plus years of experience. Increasingly, utilities are more likely to have a large percentage of new employees with little hands-on experience. One of the key challenges for the electric utility industry, therefore, is the "transitioning workforce." Putting good procedures in place and using human performance tools and skills that are consistent across the board is a good way to help less-experienced staff get up to speed quickly in order to match the experience that was available in the past.

The industry "pain point" relates to the costs and difficulties associated with supply and demand of the experienced workforce, there are fewer people than what is needed across an increasing number of locations. Physically transporting a limited population of expert individuals is not a viable alternative. The pain is alleviated by utilizing the most powerful communication technology ever created—virtual, augmented and mixed reality (VR/AR/MR)—and giving it to the existing expert population to supervise and train a younger less experienced workforce.

In an illustrative example of various invention embodiments in accordance with the present disclosure, an MR/VR remote collaboration system may enable technicians in the field to summon an expert by opening a sort of "wormhole" that connects two disparate physical locations into a shared virtual environment where both expert and novice technicians can collaborate and provide guidance and instructions on the task at hand—like being next to each other, side by side. Some embodiment designs may be referred to as Hypertunnel.

Various embodiment implementations may enable a small number of experienced-personnel to guide, train and supervise the electric utility workforce of the future. It will allow one person to remotely guide and instruct multiple technicians and crews across widespread locations by virtually moving from one remote location to another in a matter of seconds.

In an illustrative example, a novice technician arrives at a substation, and while facing an electric panel through his MR googles, he invokes the help of an expert and the MR googles scan the electric panel at the substation. A "hypertunnel" to an expert VR room appears next to the technician at the substation. In the expert's VR room, a replica of the substation and the electric panel in front of the user is displayed. The expert user is teleported into the VR substation, in front of the VR panel, at the same relative position as the novice technician factually is in front of the real panel at the remote location. The 3D model of the VR panel is replaced by a detailed CAD model and other relevant information. The expert user then performs simulated VR actions on the VR panel to show the specific tasks and hand motions that the novice user would need to perform at the real panel at the remote location. The expert user's actions and instructions are recorded in VR, transmitted in real time and reproduced in MR by the technician at the substation. The technician will feel like being next to the expert and would be able to observe like if it were happening right next to him. The technician could take control over playback/replay as needed. The expert user would be able to alternate between multiple VR instances of different remote locations, allowing to easily teleport from one VR scene to another, and even continue multiple concurrent threads of support.

In various exemplary scenarios illustrative of prior art usage, Wearable AR devices are now being used in manufacturing and industrial settings and can boost workers' productivity on an array of tasks the first time they're used, even without prior training. These technologies increase productivity by making workers more skilled and efficient and have the potential to yield both more economic growth and better jobs.

For example, a GE Renewable Energy factory in the US, where technicians use an AR solution to get step-by-step instructions when building wind turbines. Also, Boeing has used AR to assist in wiring tasks, allowing technicians to utilize both hands on the task at hand, leading to improved efficiencies and better ergonomics.

Current mobile solutions support collaboration and drive in better data capture and compliance but in themselves do not solve the skills 'not in the correct place' problem. Maintenance staff could of course contact senior engineers via audio or video conferencing technologies to ask questions. However, there is no way of seeing or demonstrating how a task should be executed.

The approach of most current AR systems is suboptimal, because they superimpose information and data elements on top of the technician's current view of the objects of interest. In many cases, such an approach could cause more harm than good by distracting and interfering with the line of sight and the focused attention that a technician might require. "Don't mess around with my workspace" was an intriguing and insightful comment by a potential user. We believe we can get better results by opening a MR window next to the technician, and let the technician look to the expert next to him/her, observe and imitate, without blocking or cluttering the direct view of the panel in front of them.

Providing an immersive shared virtual environment, where the sense of presence is utilized and leveraged to the fullest, will foster effective collaboration and knowledge transfer between expert and novice utility workers. In specific cases, such as disaster recovery efforts, these kinds of solutions will allow to increase the efficiency, effectiveness and scalability of scarce resources, and accelerate the restoration of the essential power to communities in need.

In addition, VR's potential for training has always being recognized. We anticipate this solution to evolve beyond a real-time synchronous remote collaboration tool. A future solution could leverage the multiple instances of real-life scenarios that were digitized, as well as the user interactions that were facilitated, to eventually populate a selective library of cases. These cases could be leveraged to produce a training and simulation environment that can be replicated and recreated on demand. Technicians could enter a VR simulation—like if they were entering a remote substation—and open a "hyper tunnel" to a simulated session with a simulated expert guide. Instructions, actions and user's hand interactions could be packaged in the appropriate way to be delivered based on trainee progress throughout a simulated training program.

In various scenarios, upskilling technologies, a partnership between humans and smart machines, can augment workers' abilities, resulting in dramatically improved performance, greater safety, and higher worker satisfaction. One of the best examples of this type of partnership is the industrial use of augmented reality (AR) smart glasses in manufacturing, warehouse management and field service environments that overlay computer-generated video, graphics, or text information onto physical objects—for example, step-by-step repair instructions hovering over a machine part, visually guiding a worker through the job.

In an example illustrative of the advantages that may result from various embodiments' usage, there may be large economic benefits from these capabilities for both the utilities and the consumers due to the increased effectiveness of the workforce, the efficiency of inspections of repairs and the resulting increased availability of networks. For example:

Supervision:
  Remote experts to be quickly and cost-effectively "teleported" to the work scene, be placed at multiple works scenes as needed, and assess as much relevant information as possible, by perceiving the work scene as close as possible to being there.
  Enhanced supervisory capabilities (e.g., better tracking of user actions, etc.) for the actions performed in the work scene.
  The system will enable experts to better observe, monitor and report on users as they perform the specific tasks and required procedures.
  Successful completion of the required tasks will be tracked and reported, logs and scorecards will be available to satisfy their respective requirements.

Collaboration:
  Enabling multiple users at various locations to collaborate by sharing their expertise, field of view and annotations on the real objects or virtual replicas.
  The solution ensures that disparate users are virtually presented with the same work scene and share a common collaborative space—if needed, multiple expert users, from multiple specialties and located at multiple locations, will be given the same access to the virtual work scene as soon
as it is processed/available.

Training:
  Effective training and monitoring of the largely inexperienced workforce that is anticipated to be the majority in the utilities industry.
  Increased capabilities for novice users to learn actions, sequences and procedures around the work scene, and to become more proficient in specific techniques.
  Increased capabilities for expert users to communicate with multiple novice users in a more compelling manner, mitigating the friction and helping overcome the barriers for collaborating in the same (virtual) works scene.

Economic:
  Faster recovery and reduced downtime.
  Improved guidance and supervision results in reduced technician error cost.
  Reduction on travel time and cost contributes to overall operational cost.

Societal:
  Society benefits by enhancing the service and maintenance capabilities of the electrical workforce, which will lead to improved service quality, reduce operational costs and eventually, enhanced outcomes for the quality of life.
  Adoption of new technologies foster entrepreneurial environment that drives small business to generate employment and sustain the future economy.

Various embodiments may provide a VR system to support and supervise novice remote workers via collaboration with experts at a central location. The prototype will incorporate a combination of MR technology to support field work (by a novice user), and VR technology to support supervisory work (by an expert user). The two users will be allowed to collaborate, communicate, and record actions required to perform a given task or solve a particular problem.

In an illustrative example, a novice user performing an electric panel procedure may ask for support from an expert user. In some examples, the AR system may then capture/scan the panel being worked on and broadcast the data. In some examples, the expert user may be presented with the data captured (images, 360 videos, 3D scan, etc.) in a VR system at the expert user's location (HQ, home, etc.). In various embodiments, the expert user may either verify that the panel has been correctly identified or selects a specific panel model from a library of available 3D models by providing model number, or by searching among a set of models available. In some implementations, the expert user may simulate hand actions on the VR panel and places VR annotations (e.g. pointers, arrows, label, etc.) around the VR panel. In an illustrative example, the expert user's actions may be recorded in VR along with voice instructions synchronized to required sequence of actions to accomplish a task. In some embodiments, the novice user may receive the recording as a sequence of actions and instructions performed on the VR panel, and played back in MR from his/her point of view. In various examples, the novice user may place the sequence actions and instructions performed on the VR panel in a desired location around his/her workspace. In an illustrative example, supervisors may continue to observe the novice user's actions on the real panel (remote observation), provide additional guidance if needed, as well as evaluate performance as desired.

In an example illustrative of the design of various embodiments in accordance with the present disclosure, some embodiment implementations may include various technical capabilities. In an illustrative example:

C1: Scan and digitize a remote work scene, so it can be transmitted

E1: Scanning Engine (SE)

Depending on the sensors available on the Mixed Reality Headset (MRH), 3D models of the scene, focusing on the objects of interest may be obtained using photogrammetry or RGB-D fusion.

C2: Recreate the work scene in VR at the central location

E2: Rendering Engine (RE)

The 3D model of the scene may be rendered as a triangular mesh connecting reliably reconstructed 3D points. The mesh may be texture-mapped using the acquired imagery and continuously updated C3: Identify and match a particular object from the work scene against a set of known objects E3: Object Matching Engine (OME)

Considering that the objects that will be encountered in the work scene likely come from set of known equipment and generic items, their 3D models can be retrieved from a database of CAD models using one or a few images to recognize them.

C4: Simulate user actions and capture annotations on the virtual work scene

C5: Record user actions and annotations and synchronize verbal recording so it can be transmitted.

C6: Recreate a subset of the virtual scene in MR at the remote location, and reproduce recorded user actions, annotations and voice instructions E4: Immersion Engine (IE)

The expert and the technician should be able to collaborate seamlessly. The expert may simulate actions and will place virtual annotations on the 3D models manipulated in VR. These actions, annotations and audio instructions may be transmitted in real-time to the remote location and may also be recorded and used as reference material for future training purposes. At the remote location, the actions, annotation and audio may be reproduced in MR. The technician may be able to place the virtual replicas of the equipment he operates on at convenient locations relative to the world coordinate frame or his/her own coordinate frame so that they appear stationary in his/her field of view.

C7: Capability to stream and update the VR room at the central location with continue real-time data captured remotely.

E5: Monitoring Engine (ME)

The VR room at the central location may be updated as more imagery is acquired at the remote location. The expert may be able to observe the technician to provide additional feedback and verify the correctness of the repair or inspection.

Various embodiments may include software for the underlying VR/AR environments and the required user interface for the relevant use cases, while leveraging commercially available hardware and software, like photogrammetry, 3D scanners (such as Leap Motion, Occipital, etc.) and immersive VR displays and input devices (like HTC Vive, and Acer Windows Mixed Reality).

In some embodiments, a Scanning Engine (SE) may support two sensing modalities: a regular video camera mounted on the technician's helmet and a consumer-grade depth camera, such as the Occipital Inc. Structure Sensor or the Intel RealSense Camera SR300, mounted similarly. The goal in both cases is to generate a 3D representation of the scene that can be transmitted to the central location. The availability of a 3D model would enable the expert to manipulate it in the VRE, attach annotations and simulate the necessary operations to the technician more effectively than using a 2D representation for the same purposes. (For example, the expert cannot rotate a video stream to indicate to the technician an operation that has to be made on the side of a panel.)

Regardless of the sensor type, we wish to obtain a texture-mapped, photorealistic mesh that can be transmitted to the central location with minimal lag. The mesh is a form of abstraction of the remote location and the objects of interest, and, in some cases, it may be desirable to simplify the geometry and approximate it with larger, planar faces connecting the most reliably reconstructed points.

Various embodiments may include a Rendering Engine (RE) permitting multiple users to immerse in real-size scale in the 3D data (point cloud or mesh) captured and processed by the 3D scanners. For example, by leveraging commercially available VR hardware platforms (like the HTC Vive) and development environments (like Unity3D), scenes may be presented in both point clouds and meshes in room-size scale using the HTC Vive hardware platform. In an illustrative example, basic navigation and manipulation capability is provided within the VR scene, so the user can walk around and teleport to desired target areas within the scene. Users also can grab and manipulate duplicate copies of 3D objects that have been scanned and process independently (separate objects from the scene itself).

Some embodiments may include an Object Matching Engine (OME) based on well-tested computer vision technologies, specifically, a visual vocabulary generated from images of relevant scenes and equipment, a fast matching scheme using inverted files and geometric verification to confirm the detection of the object of interest and estimate its pose with respect to the sensor. In an illustrative example, such an object matching pipeline is applicable to both sensing modalities without change since it relies only on RGB information to detect interest points and construct the visual vocabulary.

In various examples, a visual vocabulary may be extracted from a set of training images acquired in scenes relevant to electric utility work without any annotation. (In fact, even if the training images are from a different domain, the loss of accuracy would be minimal.)

In addition to the above large set of unlabeled images, some embodiments may include a database of images of components that we wish to recognize in the scene. These may be labeled with the component name and model number as needed.

After an object in the scene has been recognized using this approach, its CAD model will be retrieved from the database and presented to the expert and the technician along with any visual or oral documentation associated with it. Both the expert and the technician will be able to manipulate the CAD model and add annotations to it. In addition to specific components of interest, such as panels and transformers, OME may also recognize generic items.

Some embodiments may include an Immersion Engine (IE) to annotate, communicate and collaborate within virtual environments to facilitate knowledge transfer between multiple users.

Various embodiments may include a Monitoring Engine (ME) to provide the capability for a VR environment at a central location to serve as monitoring channel. For example, a "hypertunnel" could be opened both ways. An expert user could open a hypertunnel into the technician work scene. In an illustrative example, expert users and supervisors may observe the actions of a technician in the field and observe the results of such actions on the working environment (i.e. electric panel.)

In various embodiments, an exemplary ME may detect and capture the essential pieces of information that change over time in the working environment, such as recognizing and tracking the technician hands actions and the continued evaluation and processing of the work scene, in particular the state of the electric panel. The information about the continuous changes may be digitally streamed to the central location and be used to update the replica VR scene in front of the expert user. This engine may mirror the ability to capture and transmitting the hand actions of the expert user in VR. Similar to allowing technicians in the field to control the playback of expert actions, this monitoring engine may be recording the technician's actions in MR. Thetechnician's actions may be transmitted, archived and maintained for potential future review and evaluation.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments. elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

According to an embodiment of the present invention, the system and method may be accomplished through the use of one or more computing devices. As depicted, for example, at least in FIG. 1, FIG. 29, and FIG. 30, one of ordinary skill in the art would appreciate that an exemplary system appropriate for use with embodiments in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In various embodiments, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a sequence of computational instructions or program instructions. It will be appreciated that a programmable apparatus (i.e., computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A process to provide immersive collaboration, comprising:
   configuring a real scene virtual reality environment (VRE) operable from a real scene and a remote VRE operable remote from the real scene with a mixed reality (MR) scene model determined as a function of sensor data captured from the real scene;
   receiving an electronic message comprising an indication of an object to be identified in the real scene;
   creating an MR scene in each of the real scene VRE and remote VRE based on augmenting the MR scene model with an object model identified from the real scene as a function of an object representation matched against a set of known objects;
   augmenting the remote MR scene with the object model determined as a function of the three-dimensional position and orientation in the MR scene of the object represented by the object model, wherein a representation of the object model is placed in the MR scene at a location in the MR scene based on the object position relative to the real scene, and wherein the object position relative to the real scene is determined as a function of data captured from the real scene and world coordinates associated with the real scene;
   creating a real scene calibration point associated with a feature identified in the real scene;
   creating an MR scene calibration point associated with a feature identified in the MR scene;
   spatially associating the feature identified in the real scene with the feature identified in the MR scene;
   calibrating the remote MR scene to correspond in three-dimensional space defined by world coordinates associated with the real scene MR scene model by:
      matching the real scene calibration point with the MR scene calibration point;
      transforming the MR scene based on a 3D transform calculated as a function of the real scene calibration point and the MR scene calibration point; and
      automatically providing immersive collaboration based on recreating a subset of the real scene in the remote VRE and updating the real scene VRE with changes to the remote VRE.

2. The process of claim 1, wherein the MR scene model further comprises a model determined as a function of captured sensor data.

3. The process of claim 1, further comprising:
   configuring at least one of the real scene VRE or the remote VRE with a recorded enactment including simulation of the object model selected as a function of the electronic message indicating the selected object.

4. The process of claim 1, further comprising:
   recreating a subset of the remote VRE in the real scene VRE, and updating the remote VRE with changes to the real scene VRE.

5. The process of claim 1, further comprising:
   recording an enactment simulating the MR scene model as a function of time.

6. The process of claim 5, further comprising:
   updating the MR scene model at a specified rate based on user input.

7. The process of claim 1, wherein the three-dimensional position and orientation of the object model in the MR scene is captured from another sensor tracking the three-dimensional position and orientation of the sensor capturing the data.

8. A non-transitory computer-readable medium comprising instructions that when executed by one or more processing devices causes the processing devices to:
   configure a real scene virtual reality environment (VRE) operable from a real scene and a remote VRE operable remote from the real scene with a mixed reality (MR) scene model determined as a function of sensor data captured from the real scene;
   receive an electronic message comprising an indication of an object to be identified in the real scene;
   create an MR scene in each of the real scene VRE and remote VRE based on augmenting the MR scene model with an object model identified from the real scene as a function of an object representation matched against a set of known objects;
   augment the remote MR scene with the object model determined as a function of the three- dimensional position and orientation in the MR scene of the object represented by the object model, wherein a representation of the object model is placed in the MR scene at a location in the MR scene based on the object position relative to the real scene, and wherein the object position relative to the real scene is determined as a function of data captured from the real scene and world coordinates associated with the real scene;
   create a real scene calibration point associated with a feature identified in the real scene;
   create an MR scene calibration point associated with a feature identified in the MR scene;
   spatially associate the feature identified in the real scene with the feature identified in the MR scene;
   calibrate the remote MR scene to correspond in three-dimensional space defined by world coordinates associated with the real scene MR scene model by:
      match the real scene calibration point with the MR scene calibration point;
      transform the MR scene based on a 3D transform calculated as a function of the real scene calibration point and the MR scene calibration point; and
      automatically providing immersive collaboration based on recreating a subset of the real scene in the remote VRE and updating the real scene VRE with changes to the remote VRE.

9. The medium of claim 8, wherein the MR scene model further comprises a model determined as a function of captured sensor data.

10. The medium of claim 8, wherein execution of the instruction by the one or more processing devices causes the one or more processing devices to:
configure at least one of the real scene VRE or the remote VRE with a recorded enactment including simulation of the object model selected as a function of the electronic message indicating the selected object.

11. The medium of claim 8, wherein execution of the instruction by the one or more processing devices causes the one or more processing devices to:
recreate a subset of the remote VRE in the real scene VRE, and updating the remote VRE with changes to the real scene VRE.

12. The medium of claim 8, wherein execution of the instruction by the one or more processing devices causes the one or more processing devices to:
record an enactment simulating the MR scene model as a function of time.

13. The medium of claim 12, wherein execution of the instruction by the one or more processing devices causes the one or more processing devices to:
updating the MR scene model at a specified rate based on user input.

14. The medium of claim 8, wherein the three-dimensional position and orientation of the object model in the MR scene is captured from another sensor tracking the three-dimensional position and orientation of the sensor capturing the data.

15. A system for immersive collaboration, comprising:
a client virtual reality device operable to render a real scene virtual reality environment (VRE);
a remote client virtual reality device operable to render a remote VRE; and
a server in communication with the client virtual reality device and the remote client virtual reality device, the server programmed to:
configure the real scene VRE operable from a real scene and the remote VRE operable remote from the real scene with a mixed reality (MR) scene model determined as a function of sensor data captured from the real scene;
receive an electronic message comprising an indication of an object to be identified in the real scene;
create an MR scene in each of the real scene VRE and remote VRE based on augmenting the MR scene model with an object model identified from the real scene as a function of an object representation matched against a set of known objects;
augment the remote MR scene with the object model determined as a function of the three-dimensional position and orientation in the MR scene of the object represented by the object model, wherein a representation of the object model is placed in the MR scene at a location in the MR scene based on the object position relative to the real scene, and wherein the object position relative to the real scene is determined as a function of data captured from the real scene and world coordinates associated with the real scene;
create a real scene calibration point associated with a feature identified in the real scene;
create an MR scene calibration point associated with a feature identified in the MR scene;
spatially associating the feature identified in the real scene with the feature identified in the MR scene;
calibrating the remote MR scene to correspond in three-dimensional space defined by world coordinates associated with the real scene MR scene model by:
matching the real scene calibration point with the MR scene calibration point; and,
transforming the MR scene based on a 3D transform calculated as a function of the real scene calibration point and the MR scene calibration point; and
automatically providing immersive collaboration based on recreating a subset of the real scene in the remote VRE and updating the real scene VRE with changes to the remote VRE.

16. The system of claim 15, wherein the MR scene model further comprises a model determined as a function of captured sensor data.

17. The system of claim 15, wherein server is programmed to:
configure at least one of the real scene VRE or the remote VRE with a recorded enactment including simulation of the object model selected as a function of the electronic message indicating the selected object.

18. The system of claim 15, wherein the server is programmed to:
recreate a subset of the remote VRE in the real scene VRE, and updating the remote VRE with changes to the real scene VRE.

19. The system of claim 15, wherein server is programmed to:
at least one of: (i) record an enactment simulating the MR scene model as a function of time or (ii) update the MR scene model at a specified rate based on user input.

20. The system of claim 15, wherein the three-dimensional position and orientation of the object model in the MR scene is captured from another sensor tracking the three-dimensional position and orientation of the sensor capturing the data.

* * * * *